United States Patent
Nakada

(10) Patent No.: US 9,518,520 B2
(45) Date of Patent: Dec. 13, 2016

(54) CONTROL DEVICE OF INTERNAL COMBUSTION ENGINE

(75) Inventor: Hayato Nakada, Minamitsuru-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 14/000,823

(22) PCT Filed: Jul. 11, 2011

(86) PCT No.: PCT/JP2011/065797
§ 371 (c)(1),
(2), (4) Date: Aug. 21, 2013

(87) PCT Pub. No.: WO2013/008295
PCT Pub. Date: Jan. 17, 2013

(65) Prior Publication Data
US 2014/0114485 A1    Apr. 24, 2014

(51) Int. Cl.
*F02D 41/14*     (2006.01)
*G05B 15/00*    (2006.01)
(Continued)

(52) U.S. Cl.
CPC ........... *F02D 41/1401* (2013.01); *F02B 37/24* (2013.01); *F02D 41/0007* (2013.01);
(Continued)

(58) Field of Classification Search
CPC  F02D 41/0072; F02D 41/0047; F02D 41/005; F02D 41/1401; F02D 2041/1412; G05B 15/00
(Continued)

(56) References Cited

U.S. PATENT DOCUMENTS 8,948,997 B2 *   2/2015   Nakada ............... F02D 41/0007
                                                        701/102
2005/0192681 A1   9/2005   Matsunaga et al.
(Continued)

FOREIGN PATENT DOCUMENTS

JP    A-2005-276169    10/2005
JP    A-2009-024550    2/2009
JP    B2-5196039      5/2013

OTHER PUBLICATIONS

Nov. 14, 2014 Notice of Allowance issued in U.S. Appl. No. 13/519,052.

*Primary Examiner* — Mahmoud Gimie
(74) *Attorney, Agent, or Firm* — Oliff PLC

(57) ABSTRACT

The invention relates to a control device applied to an engine including a controlled object and for controlling the operation state of the controlled object such that the controlled output from the controlled object corresponds to the target controlled output. In the invention, when the reference engine state parameter is maintained constant during the predetermined time period and it is predicted that the reference engine state parameter changes at the predetermined time period having elapsed, the primary or secondary predicted controlled output which satisfies the output control condition at the predetermined time period having elapsed assuming that the reference engine state parameter does not change during the predetermined time period is calculated as a look-ahead predicted controlled output and then, the target controlled output setting logic for performing the functions of the target controlled output setting architecture is corrected on the basis of the look-ahead predicted controlled output.

6 Claims, 26 Drawing Sheets

(51) Int. Cl.
*F02D 41/00* (2006.01)
*F02B 37/24* (2006.01)
*F02B 29/04* (2006.01)

(52) U.S. Cl.
CPC ..... *F02D 41/0047* (2013.01); *F02D 41/0072* (2013.01); *F02M 26/05* (2016.02); *G05B 15/00* (2013.01); *F02B 29/0406* (2013.01); *F02D 2041/1412* (2013.01); *F02D 2200/0406* (2013.01); *F02M 26/06* (2016.02); *F02M 26/24* (2016.02); *Y02T 10/144* (2013.01); *Y02T 10/47* (2013.01)

(58) Field of Classification Search
USPC ............ 701/102, 103, 104, 108; 123/568.11, 123/559.1, 564; 60/278, 280, 605.1, 605.2
See application file for complete search history.

(56) References Cited

U.S. PATENT DOCUMENTS

2006/0137347 A1 6/2006 Stewart et al.
2012/0277975 A1 11/2012 Nakada

\* cited by examiner (A)

(B)

(A)

(B)

(A)

(B)

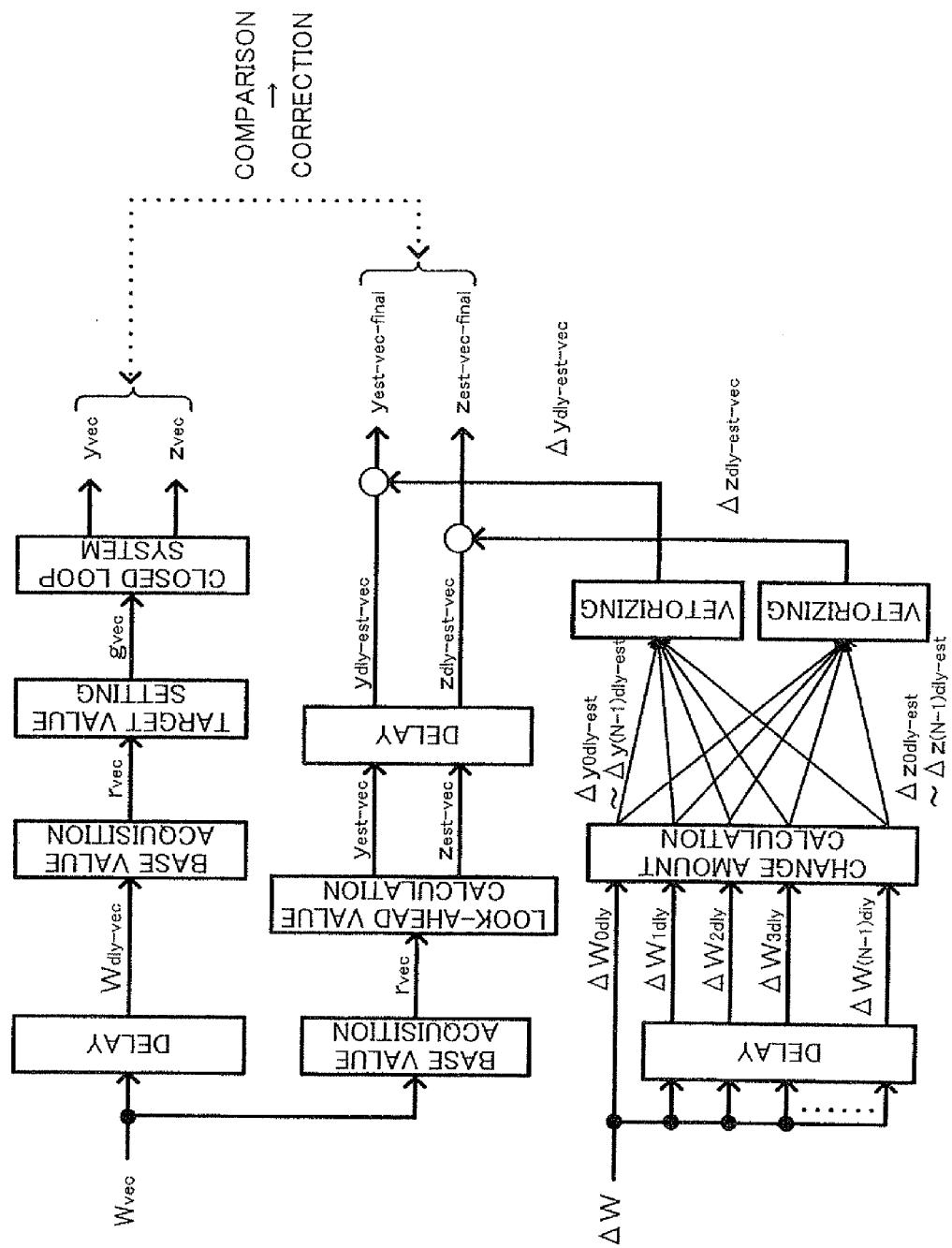

CONTROL DEVICE OF INTERNAL COMBUSTION ENGINE

TECHNICAL FIELD

The invention relates to a control device of an internal combustion engine.

BACKGROUND ART

A Patent Document 1 describes a temperature control device for controlling a temperature of a heating plate which a semiconductor wafer is placed. In this device, the plate is heated by a heater and as a result, the wafer placed on the plate is heated. This device controls the heating operation of the heater such that the plate temperature becomes a target temperature.

In the device of the Document 1, when the plate is subject to a disturbance, the plate temperature may become higher or lower than the target temperature (hereinafter, this target temperature may be referred to as —initial target temperature—).

If the target plate temperature is temporarily decreased just before the plate temperature becomes higher than the initial target temperature, the heat amount given from the heater to the plate decreases and thereby, it is restricted that the plate temperature becomes higher than the initial target temperature.

On the other hand, if the target plate temperature is temporarily increased just before the plate temperature becomes lower than the initial target temperature, the heat amount given from the heater to the plate increases and thereby, it is restricted that the plate temperature becomes lower than the initial target temperature.

Therefore, if the target plate temperature is changed in opposite phase manner relative to the plate temperature change, which may occur in case that the target plate temperature is maintained at the initial target temperature when the plated is subject to the disturbance, the plate temperature is maintained at the initial target temperature even when the plate is subject to the disturbance.

In the device of the Document 1, a disturbance is forcibly given to the plate in the state where the plate temperature is controlled at the initial target temperature and the plate temperature change pattern at this time is measured.

A temperature change pattern at the phase opposite to that of the measured temperature change pattern is acquired as a target temperature change pattern for the plate subject to the disturbance (i.e. the disturbance forcibly given to the plate in order to measure the plate temperature change pattern).

When the plate is subject to the same disturbance as the aforementioned disturbance, the target plate temperature is changed according to the acquired target pattern to maintain the plate temperature at the initial target temperature.

That is, the Document 1 teaches that the temperature change pattern of the plate subject to the disturbance is predicted to maintain the plate temperature at the initial target temperature by changing the target plate temperature according to the predicted pattern.

PRIOR ART DOCUMENTS

Patent Documents

[Patent Document 1] Unexamined JP Patent Publication No. 2005-276169

DISCLOSURE OF THE INVENTION

Problem to be solved by Invention

In order to control an operation state of a controlled object of an internal combustion engine such that a controlled output of the object (e.g. a supercharing pressure controlled by a supercharger or a recirculated exhaust gas amount controlled by an exhaust gas recirculation device) corresponds to a target output thereof, the target output is corrected such that the controlled output or a control input to the object (e.g. a manipulation amount input to the supercharger or the exhaust gas recirculation device) satisfies a constraint condition imposed thereto, this corrected target output is set as a final target controlled output and the object is controlled according to the set final output.

In this case, the judgement whether the output or input satisfies the imposed condition is performed on the basis of a predicted value of the future output or input.

A logic structured considering an operation property or controlled output property of the object (hereinafter, this logic may be referred to as —target controlled output setting logic—) is used for the setting of the target output, including the calculation of the predicted value of the future output or input or the correction of the initial target controlled output.

This target setting logic is structured on the basis of the control object having an intended operation property.

Therefore, when the operation property or controlled output property of the object changes due to the long usage thereof, the predicted value of the future output or input calculated by the target setting logic may not be accurate.

In this case, it is preferred that the target setting logic is corrected depending on the current operation property or controlled output property of the object.

There is a concept that the predicted value of the output or input after a predetermined time period calculated by the target setting logic is used for the correction of the logic.

In case that the initial target controlled output (i.e. the target controlled output before the correction thereof so as to satisfy the aforementioned constraint condition) is set on the basis of a parameter relating to an engine state (hereinafter, this parameter may be referred to as —engine state parameter—), the target setting logic is structured to calculate the predicted value of the future output or input, using the engine state parameter.

On the other hand, when the parameter changes during the aforementioned predetermined time period, the target output changes and thereby, the output or input after the aforementioned time period changes.

Thus, when the predicted value of the output or input after the aforementioned time period is calculated using the target setting logic, the change of the engine state parameter during the aforementioned predetermined time period should be considered.

However, the burden of the calculation of the predicted value of the future output or input considering the change of the parameter is large.

That is, in the case that the initial target output is set on the basis of the engine state parameter, the change of the parameter during the predetermined time period should be considered in the calculation of the predicted value of the output or input after the predetermined time period used for the correction of the target setting logic and however, the burden of the calculation of the predicted value of the future output or input considering the change of the engine state parameter is large and thus, the burden of the correction of the target setting logic is large.

The object of the invention of this application is to correct the target controlled output setting logic with a small calculation burden.

Means for Solving Problem

The invention of this application relates to a control device applied to an internal combustion engine comprising a controlled object and for controlling an operation state of the object such that the controlled output from the object corresponds to a target controlled output.

The device of the invention comprises a target controlled output setting architecture.

In the case that the controlled output used as a base for the setting of the target controlled output is referred to as a base controlled output, a parameter relating to an engine state is referred to as engine state parameter and an engine state parameter referred for the setting of the base controlled output is referred to as a reference engine state parameter, the architecture of the invention comprises:

a function for calculating as a primary predicted controlled output, a predicted value of the controlled output when an operation state of the object is controlled using as a target controlled output the base controlled output set on the basis of the reference engine state parameter;

a function for setting as the target controlled output the base controlled output when the primary predicted controlled output satisfies an output constraint condition relating to the primary predicted controlled output and on the other hand, correcting the baser controlled output to calculate a primary corrected base controlled output when the primary predicted controlled output does not satisfy the output constraint condition and then calculating as a secondary predicted controlled output, a predicted value of the controlled output in the case that the operation state of the object is controlled using the primary corrected base controlled output as the target controlled output;

a function for setting the primary corrected base controlled output as the target controlled output when the secondary predicted controlled output is calculated and then satisfies the output constraint condition and on the other hand, correcting the primary corrected base controlled output to calculate a new primary corrected base controlled output when the secondary predicted controlled output does not satisfy the output constraint condition and then calculating as the target controlled output, a predicted value of the controlled output in the case that the operation state of the object is controlled using the calculated new primary corrected base controlled output as the target controlled output; and a function for repeatedly performing the calculation of the new primary base controlled output by correcting the primary corrected base controlled output and the calculation of the new secondary predicted controlled output when the operation state of the object is controlled using the new primary corrected base controlled output as the target controlled output until the new secondary predicted controlled output satisfies the output control condition in the case what the new secondary predicted controlled output is calculated.

When it is predicted that the reference parameter changes during the predetermined time period in which the reference parameter is contained constant, the device of the invention calculates, as the look-ahead predicted controlled output, the primary or secondary predicted controlled output which satisfies the output constraint condition at the predetermined time period having elapsed assuming that the reference parameter does not change during the predetermined time period and then corrects a target controlled output setting logic for performing the functions of the architecture on the basis of the look-ahead predicted controlled output.

The target controlled output setting logic of the invention may be any logic as far as it performs the aforementioned functions and as this logic, for example, the target value setting logic of the embodiments explained below may be employed.

The aforementioned invention has an advantage that the look-ahead predicted controlled output necessary for the correction of the target controlled output setting logic can be calculated with small calculation burden and thus, the target controlled output setting logic can be corrected with a small calculation burden.

That is, in the case of calculating the predicted value of the controlled output after the predetermined time period from the present time, the value is calculated using the reference engine state parameter.

In this case, when the reference engine state parameter may change during the predetermined time period, the target controlled output setting architecture must calculate the predicted value of the controlled output under the condition that the reference engine state parameter changes for the predetermined time period.

In this case, the burden required for the calculation of the predicted value of the controlled output is larger than that when the predicted value of the controlled output is calculated under the condition where the reference engine state parameter does not change during the predetermined time period.

According to the aforementioned invention, when it is predicted that the reference parameter changes during the predetermined time period in which the reference parameter is maintained constant (hereinafter, this may be referred to as —when the parameter does not change—), the predicted value of the controlled output (i.e. the look-ahead predicted controlled output) at the predetermined time period having elapsed is calculated.

In this case, the predicted value of the controlled output is calculated assuming that the reference parameter does not change during the predetermined time period.

Then, the correction of the target controlled output setting logic is performed using the calculated predicted controlled output.

Therefore, the aforementioned invention has an advantage that the look-ahead predicted controlled output necessary for the correction of the target setting logic can be calculated with a small calculation burden and thus, the target setting logic can be corrected with a small calculation burden.

In the aforementioned invention, when the reference engine state parameter changes for the predetermined time period, it is preferred that the look-ahead predicted controlled output is corrected depending on the change amount of the reference engine state parameter during the predetermined time period such that the look-ahead predicted controlled output corresponds to the predicted controlled output at the predetermined time period having elapsed in the case that the reference engine state parameter changes during the predetermined time period.

This has an advantage that the look-ahead predicted controlled output necessary for the correction of the target controlled output setting logic can be calculated with a small calculation burden and thus, the logic can be corrected with a small calculation burden even when the reference engine state parameter changes though it is predicted that the parameter does not change during the predetermined time period.

That is, in the case that the parameter changes during the predetermined time period even when it is predicted that the parameter changes during the predetermined time period in which the reference parameter is maintained constant, the burden of calculating of the predicted controlled output assuming that the reference engine state parameter does not change during the predetermined time period and then correcting the calculated predicted controlled output depending on the change of the reference engine state parameter when the parameter changes during the predetermined time period is smaller than that of calculating the predicted controlled output at the predetermined time period having elapsed initially assuming that the reference engine state parameter changes during the predetermined time period.

According to the aforementioned invention, when no parameter change is predicted, the predicted controlled output (i.e. the look-ahead predicted controlled output) is calculated assuming that the reference engine state parameter does not change during the predetermined time period.

In the case that the parameter changes during the predetermined time period, the calculated predicted controlled output is corrected depending on the change of the parameter.

Thus, the aforementioned invention has an advantage that the look-ahead predicted controlled output necessary for the correction of the target controlled output setting logic can be calculated with a small calculation burden and thus, the logic can be corrected with a small calculation burden even when the parameter changes though the parameter does not change during the predetermined time period.

Further, according to the aforementioned invention, when no parameter change is predicted, the predicted controlled output calculated assuming that the parameter does not change during the predetermined time period (i.e. the look-ahead predicted controlled output) is used directly for the correction of the target controlled output setting logic if the parameter does not change during the predetermined time period.

When no parameter change is predicted, there is a high possibility that the parameter does not change during the predetermined time period and naturally the predicted controlled output calculated assuming that the parameter does not change during the predetermined time period is often used directly for the correction of the logic.

For this reason, totally, the aforementioned invention has an advantage that the look-ahead predicted controlled output necessary for the correction of the logic can be calculated with a small calculation burden and thus, the logic can be corrected with a small calculation burden even when the parameter changes though it is predicted that the parameter does not change during the predetermined time period.

Further, the aforementioned invention has a characteristic that the look-ahead predicted controlled output is used for the correction of the logic and as far as the invention has this characteristic, the aforementioned advantage can be obtained and therefore, the manner of the correction of the logic on the basis of the look-ahead predicted controlled output in the invention may be any manner.

In this regard, for example, in the aforementioned invention, the manner of the correction of the logic so as to decrease the deviation between the look-ahead predicted controlled output and the actual controlled output at the predetermined time period having elapsed may be employed.

Further, in the aforementioned invention, as the functions performed by the target controlled output setting logic, the target controlled output setting architecture may have:

a function for calculating as a primary predicted control input, a predicted value of a control input which is input to the control object when the base controlled output set on the basis of the reference engine state parameter is set as the target controlled output;

a function for setting the base controlled output as the target controlled output when the primary predicted control input satisfies an input constraint condition relating to the primary predicted control input and on the other hand, correcting the base controlled output to calculate a primary corrected base controlled output when the primary predicted control input does not satisfies the input constraint condition and then calculating as a secondary predicted control input, a predicted control input in the case that the primary corrected base controlled output is set as the target controlled output;

a function for setting the primary corrected base controlled output as the target controlled output when the secondary predicted control input is calculated and then satisfies the input constraint condition and on the other hand, correcting the primary corrected base controlled output to calculate a new primary corrected base controlled output when the secondary predicted control input does not satisfies the input constraint condition and then calculating as a new secondary predicted control input, a predicted control input in the case that the calculated new primary corrected base controlled output is set as the target controlled output; and a function for repeatedly performing the calculation of the new primary corrected base controlled output by the correction of the primary corrected base controlled output until the new secondary predicted control input satisfies the input control condition in the case that the new secondary predicted control input is calculated and the calculation of the new secondary predicted control input in the case that the new primary corrected base controlled output is set as the target controlled output;

wherein when it is predicted that the parameter changes during the predetermined time period in which the reference parameter is maintained constant, the primary or secondary predicted control input which satisfies the input constraint condition at the predetermined time period having elapsed assuming that the parameter does not change during the predetermined time period may be calculated as the look-ahead predicted control input and the target controlled output setting logic may be corrected on the basis of the look-ahead predicted control input.

This has an advantage that even when the look-ahead predicted control input is necessary for the correction of the logic, the look-ahead predicted control input can be calculated with a small calculation burden and thus, the logic can be corrected with a small calculation burden.

That is, as explained above, relating to the case that the predicted controlled output after the predetermined time period from the present time, the calculation burden necessary for the calculation of the predicted control input assuming that the reference engine state parameter changes during the predetermined time period is larger that assuming that the parameter does not change during the predetermined time period.

According to the aforementioned invention, the predetermined control input at the predetermined time period having elapsed (i.e. the look-ahead predicted control input) is calculated when no parameter change is predicted.

In this case, the predicted control input is calculated assuming that the reference engine state parameter does not change during the predetermined time period.

Then, the target controlled output setting logic is corrected using the calculated predicted control input.

Therefore, the aforementioned invention has an advantage that the look-ahead predicted control input necessary for the correction of the target controlled output setting logic can be calculated with a small calculation burden and thus, the logic can be corrected with a small calculation burden.

In the aforementioned invention, when the reference engine parameter change during the predetermined time period, it is preferred that the look-ahead predicted control input is corrected depending on the change amount of the parameter during the predetermined time period such that the look-ahead predicted control input corresponds to the predicted control input at the predetermined time period having elapsed in the case that the parameter changes during the predetermined time period.

This has an advantage that the look-ahead predicted control input necessary for the correction of the target controlled output setting logic can be calculated with a small calculation burden and thus, the logic can be corrected with a small calculation burden even when the reference engine state parameter changes though it is predicted that the parameter does not change during the predetermined time period.

That is, as explained above relating to the case that the predicted future controlled output after the predetermined time period from the present time when the parameter changes during the predetermined time period even when it is predicted that the reference parameter changes during the predetermined time period in which the reference parameter is maintained constant, the calculation burden of calculating the predicted control input assuming the parameter does not change during the predetermined time period and correcting the calculated predicted control input depending on the change of the parameter if the parameter changes during the predetermined time period is smaller than that of calculating the predicted control input at the predetermined time period having elapsed assuming the parameter changes during the predetermined time period.

According to the aforementioned invention, when no parameter change is predicted, the predicted control input (i.e. the look-ahead control input) is calculated assuming that the parameter does not change during the predetermined time period.

Then, when the parameter changes during the predetermined time period, the already-calculated predicted control input is corrected depending on the parameter change.

Thus, the aforementioned invention has an advantage that the look-ahead predicted controlled output necessary for the correction of the target controlled output setting logic can be calculated with a small calculation burden and thus, the logic can be corrected with a small calculation burden even when the parameter changes though it is predicted that the parameter does not change during the predetermined time period.

Further, according to the aforementioned invention, the predicted control input calculated assuming that the parameter does not change during the predetermined time period when no parameter change is predicted (i.e. the look-ahead predicted control input) is used directly for the correction of the target controlled output setting logic if the parameter does not change during the predetermined time period.

Then, when no parameter change is predicted, there is a high possibility that the parameter does not change during the predetermined time period and therefore the predicted control input calculated assuming that the parameter does not change during the predetermined time period should be naturally often used directly for the correction of the target controlled output setting logic.

For this reason, totally, the aforementioned invention has an advantage that the look-ahead predicted controlled output necessary for the correction of the logic can be calculated with a small calculation burden and thus, the logic can be corrected with a small calculation with a small calculation burden even when the parameter changes though it is predicted that the parameter does not change during the predetermined time period.

Further, the aforementioned invention has a characteristic that the look-ahead predicted control input is used for the correction of the logic and as far as the invention has this characteristic, the aforementioned advantage can be obtained and therefore, the manner of the correction of the logic on the basis of the look-ahead predicted control input in the invention may be any manner.

For example, as the correction manner, in the aforementioned invention, a manner for correcting the logic such that the deviation between the actual control input at the predetermined time period having elapsed and the look-ahead predicted control input decreases, may be employed.

Further, as explained above, the aforementioned invention has a characteristic that the look-ahead predicted controlled output or input is used for the correction of the logic and as far as the invention has this characteristic, the aforementioned advantage can be obtained and therefore, the controlled object and the controlled output in the invention may be any object and any output, respectively.

In this regard, in the aforementioned invention, in the case that the engine comprises a supercharger for supercharging a gas suctioned into a combustion chamber and the supercharger has means for controlling a supercharging pressure of the gas suctioned into the combustion chamber, for example, the supercharging pressure control means of the supercharger may be employed as the controlled object and the supercharging pressure controlled by the supercharging pressure control means of the supercharger may be employed as the controlled output.

Otherwise, in the aforementioned invention, in the case that the engine comprises an exhaust gas recirculation device for introducing, into an intake passage, an exhaust gas discharged from the combustion chamber and the device has means for controlling the exhaust gas recirculation amount of the exhaust gas introduced into the intake passage, the exhaust gas recirculation amount control means of the device may be employed as the controlled object and the exhaust gas recirculation amount controlled by this means may be employed as the controlled output.

Otherwise, in the case that the engine comprises a throttle valve for controlling an amount of a gas suctioned into the combustion chamber, the throttle valve may be employed as the controlled object and the gas amount controlled by the throttle valve may be employed as the controlled output.

Further, as explained above, the aforementioned invention has a characteristic that the look-ahead predicted controlled output or input is used for the correction of the target controlled output setting logic and as far as the invention has this characteristic, the aforementioned advantage can be obtained and therefore, the controlled object and the controlled output in the invention may be any object and any output, respectively.

In this regard, in the case that the engine comprises a supercharger for supercharging a gas suctioned into a combustion chamber and the supercharger has means for controlling a supercharging pressure of the gas suctioned into the combustion chamber, in the invention, for example, the supercharging pressure control means of the supercharger may be employed as the controlled object and a manipulation amount input to this means may be employed as the control input.

Otherwise, in the aforementioned invention, in the case that the engine comprises an exhaust gas recirculation device for introducing into an intake passage an exhaust gas discharged from a combustion chamber and the device has exhaust gas recirculation amount control means for controlling an exhaust gas recirculation amount of the exhaust gas introduced into the intake passage, the exhaust gas recirculation amount control means of the device may be employed as the controlled object and a manipulation amount input to this means may be employed as the control input.

Otherwise, in the case that the engine comprises a throttle valve for controlling an amount of a gas suctioned into a combustion chamber, the throttle valve may be employed as the controlled object and a manipulation amount input to this valve may be employed as the control input.

Further, the another invention of this application relates to a control device to be applied to an internal combustion engine comprising a controlled object, which device controlling an operation state of the object such that the controlled output of the object corresponds to a target controlled output.

This device of the invention comprises a target controlled output setting architecture.

Referring to the controlled output used as a base for setting a target controlled output as a base controlled output, referring to a parameter relating to a state of the engine as an engine state parameter and referring to the parameter referred for setting the base controlled output as a reference engine state parameter, the architecture of the invention comprises:

a function for calculating as a primary predicted control input, a predicted control input to the object assuming that the base controlled output set on the basis of the parameter is set as the target controlled output;

a function for setting the aforementioned base controlled output as the target controlled output when the primary predicted control input satisfies an input constraint condition relating thereto and on the other hand, correcting the base controlled output to calculate a primary corrected base controlled output when the primary predicted control input does not satisfies the input constraint condition and then calculating as a secondary predicted control input, a predicted control input in the case that the primary corrected base controlled output is set as the target controlled output;

a function for setting the primary corrected base controlled output as the target controlled output when the secondary predicted control input is calculated and then satisfies the input constraint condition and on the other hand, correcting the primary corrected base controlled output to calculate a new primary base controlled output when the secondary predicted control input does not satisfy the input constraint condition and then calculating as a new secondary predicted control input, a predicted control input in the case that the calculated new primary corrected base controlled output is set as the target controlled output; and a function for repeatedly performing the calculation of the new primary corrected base controlled output by correcting the primary corrected base controlled output and the calculation of the new secondary predicted control input in the case that the new primary corrected base controlled output is set as the target controlled output until the new secondary predicted control input satisfy the input constraint condition when the new secondary predicted control input is calculated.

In the device of the invention, when it is predicted that the parameter changes during the predetermined time period in which the parameter is maintained constant, the primary or secondary predicted control input which satisfies the input constraint condition at the predetermined time period having elapsed is calculated as the look-ahead predicted control input assuming that the parameter does not change during the predetermined time period.

The target controlled output setting logic of the invention may be any logic as far as it performs the aforementioned functions and as this logic, for example, the target value setting logic of embodiments described below may be employed.

For the same reasons as the aforementioned reason, the aforementioned invention has an advantage that the look-ahead predicted control input necessary for the correction of the target controlled output setting logic can be calculated with a calculation burden and thus, the logic can be corrected with a small calculation burden.

In the aforementioned invention, when the parameter changes during the predetermined time period, it is preferred that the look-ahead predicted control input is corrected depending on the change amount of the parameter during the predetermined time period such that the look-ahead predicted control input corresponds to the predicted control input at the predetermined time period having elapsed in the case that the parameter changes during the predetermined time period.

For the same reason as the aforementioned reason, this has an advantage that even when the parameter changes though it is predicted that the parameter does not change during the predetermined time period, the look-ahead predicted control input necessary for the correction of the target controlled output setting logic can be calculated with a small calculation burden and thus, the logic can be corrected with a small calculation burden.

Further, the aforementioned invention has a characteristic that the look-ahead predicted control input is used for the correction of the logic and as far as the invention has this characteristic, the aforementioned advantage can be obtained and therefore, the manner of the correction of the logic on the basis of the look-ahead predicted control input in the invention may be any manner.

For example, the manner for correcting the logic such that the deviation between the actual control input at the predetermined time period having elapsed and the look-ahead predicted control input decreases may be employed in the aforementioned invention.

Further, as described above, the aforementioned invention has a characteristic that the look-ahead predicted controlled output or input is used for the correction of the logic and as far as the invention has this characteristic, the aforementioned advantage can be obtained and therefore, the controlled object and the control input in the invention may be any object and any input, respectively.

In this regard, in the case that the engine comprises a supercharger for supercharging a gas suctioned into a combustion chamber and the supercharger has means for controlling a supercharging pressure of the gas suctioned into the combustion chamber in the aforementioned invention, for example, the supercharging pressure control means of the supercharger may be employed as the controlled object and a manipulation amount input to this means may be employed as the control input.

Otherwise, in the aforementioned invention, in the case that the engine comprises an exhaust gas recirculation device for introducing into an intake passage an exhaust gas discharged from a combustion chamber and the device has means for controlling an exhaust gas recirculation amount of the exhaust gas introduced into the intake passage, the exhaust gas recirculation amount control means of the device may be employed as the controlled object and a manipulation amount input to this means may be employed as the control input.

Otherwise, in the case that the engine comprises a throttle valve for controlling an amount of a gas suctioned into a combustion chamber, the throttle valve may be employed as the controlled object and a manipulation amount input to this valve may be employed as the control input.

Further, as explained above, the aforementioned invention has a characteristic that the look-ahead predicted controlled output or input is used for the correction of the logic and as far as the invention has this characteristic, the aforementioned advantage can be obtained and therefore, the manner of the prediction of the parameter change during the predetermined time period in which the parameter is maintained constant in the invention may be any manner.

In this regard, in the case that the engine comprises a fuel injector and the control device of the invention has a function for setting a target amount of a fuel injected from the injector and then controlling an operation of the injector such that the fuel of the target amount is injected from the injector and a function for performing a fuel injection amount delay control using the set target amount for the control of the operation of the injector at the predetermined time period having elapsed from the setting time in the aforementioned invention, for example, any prediction manner may be employed as that for predicting that the parameter changes during the predetermined time period in which the parameter is maintained constant under the condition where the fuel injection amount delay control is performed.

Further, as explained above, the aforementioned invention has a characteristic that the look-ahead predicted controlled output or input is used for the correction of the logic and as far as the invention has this characteristic, the aforementioned advantage can be obtained and therefore, the reference engine state parameter in the invention may be any parameter.

In this regard, for example, an engine speed may be employed as the reference engine state parameter in the invention.

Further, in the case that the engine comprises a fuel injector in the aforementioned invention, an amount of a fuel injected from the fuel injector can be employed as the reference engine state parameter.

A further another invention of this application relates to a control device applied to an internal combustion engine comprising first and second controlled objects, a first controlled output from the first controlled object and a second controlled output from the second controlled object influencing each other, the device controlling operation states of the first and second controlled objects such that the first and second controlled outputs correspond to target first and second controlled outputs, respectively.

The device of the invention has a target controlled output setting architecture.

Referring to the controlled output used as a base for setting the target first controlled output as a base first controlled output, referring to the controlled output used as a base for setting the target second controlled output as a base second controlled output, referring to the parameter relating to the state of the engine as an engine state parameter, referring to the engine state parameter referred for setting the base first controlled output as a first reference engine state parameter and referring to the engine state parameter referred for setting the base second controlled output as a second reference engine state parameter, The architecture of the invention has:

a function for calculating as a primary predicted first controlled output, the predicted first controlled output in the case that the operation state of the first controlled object is controlled under the condition where the base first controlled output set on the basis of the first reference engine state parameter is set as the target first controlled output while calculating as a primary predicted second controlled output, the predicted second controlled output in the case that the operation state of the second controlled object is controlled under the condition where the base second controlled output set on the basis of the second reference engine state parameter is set as the target second controlled output;

a function for setting the base first controlled output as the target first controlled output when the primary predicted first controlled output satisfies a first output constraint condition relating thereto and on the other hand, correcting the base first controlled output to calculate a primary corrected base first controlled output when the primary predicted first controlled output does not satisfy the first output constraint condition and then, calculating as a second predicted first controlled output, the predicted first controlled output in the case that the operation state of the first controlled object is controlled under the condition where the primary corrected base first controlled output is set as the target first controlled output, while setting the base second controlled output as the target second controlled output when the primary predicted second controlled output satisfies a second output constraint condition relating thereto and on the other hand, correcting the base second controlled output to calculate a primary corrected base second controlled output when the primary predicted second controlled output satisfies the second output constraint condition and then, calculating as a secondary predicted second controlled output, the predicted second controlled output in the case that the operation state of the second controlled object is controlled under the condition where the primary corrected base second controlled output is set as the target second controlled output;

a function for setting the primary corrected base first controlled output as the target first controlled output when the secondary predicted first controlled output is calculated and then satisfies the first output constraint condition and on the other hand, correcting the primary corrected base first controlled output to calculate a new primary corrected base first controlled output when the secondary predicted first controlled output satisfies the first output constraint condition and then calculating as a new secondary predicted first controlled output, the predicted controlled output in the case that the operation state of the first controlled object is controlled under the condition where the calculated new primary corrected base first controlled output is set as the target first controlled output, while setting the primary corrected base second controlled output as the target second controlled output when the secondary predicted second controlled output is calculated and then satisfies the second output constraint condition and on the other hand, correcting the primary corrected base second controlled output to calculate a new primary corrected base second controlled output when the secondary predicted second controlled output does not satisfy the second output constraint condition and then calculating as a new secondary predicted second controlled output, the predicted second controlled output in the case that the operation state of the second controlled object under the condition where the calculated new primary corrected base second controlled output is set as the target second controlled output; and a function for repeatedly performing the calculation of the new primary corrected base first controlled output by correcting the primary corrected base first controlled output and the calculation of the new secondary predicted first controlled output in the case that the operation state of the first controlled object under the condition where the new primary corrected base first controlled output is set as the target first controlled output until the new secondary predicted first controlled output satisfies the first output constraint condition when the new secondary predicted first controlled output is calculated, while repeatedly performing the calculation of the new primary corrected base second controlled output by correcting the primary corrected base second controlled output and the calculation of the new secondary predicted second controlled output in the case that the operation state of the second control object is controlled under the condition where the new primary corrected base second controlled output is set as the target second controlled output until the new secondary predicted second controlled output is calculated and then satisfies the second output constraint condition.

Referring to one of the first and second reference engine state parameters as a particular reference engine state parameter, when it is predicted that the particular parameter changes during the predetermined time period in which the particular parameter is maintained constant, the device of the invention calculates, as the look-ahead predicted first controlled output, the primary or secondary predicted first controlled output which satisfies the first output constraint condition at the predetermined time period having elapsed assuming that the particular parameter does not change during the predetermined time period, while calculates, as the look-ahead predicted second controlled output, the primary or secondary predicted second controlled output which satisfies the second output constraint condition at the predetermined time period having elapsed assuming that the particular parameter does not change and then corrects a target controlled output setting logic for performing the functions of the architecture on the basis of the look-ahead predicted first and second controlled outputs.

The target controlled output setting logic in the invention may be any logic as far as it performs the aforementioned functions and as this logic, for example, the target value setting logic of the embodiments explained below may be employed.

For the same reason as that explained above, the aforementioned invention has an advantage that the look-ahead predicted first and second controlled outputs necessary for the correction of the logic can be calculated with a small calculation burden and thus, the logic can be corrected with a small calculation burden.

In particular, in the aforementioned invention, the first and second controlled outputs influence each other and therefore, if the look-ahead predicted first and second controlled outputs are calculated assuming that the reference parameter changes during the time period in which it is predicted that the reference parameter does not change, the change of the reference parameter as well as the influence of the second controlled output to the first controlled output and the influence of the first controlled output to the second controlled output should be considered in the calculation.

According to this, the burden of the calculation of the look-ahead predicted first and second controlled outputs increases considerably.

For this reason, the aforementioned invention, which has an advantage that the look-ahead predicted first and second controlled outputs can be calculated with a small calculation burden and thus, the logic can be corrected with a small calculation burden, is considerably useful.

In the aforementioned invention, when the particular parameter changes during the predetermined time period, it is preferred that the look-ahead predicted first controlled output is corrected depending on the change amount of the particular parameter during the predetermined time period such that the look-ahead predicted first controlled output corresponds to the predicted first controlled output at the predetermined time period having elapsed in the case that the particular parameter changes during the predetermined time period, while the look-ahead predicted second controlled output is corrected depending on the change amount of the particular parameter during the predetermined time period such that the look-ahead predicted second controlled output corresponds to the predicted second controlled output at the predetermined time period having elapsed in the case that the particular parameter changes during the predetermined time period.

For the same reason as that explained above, this has an advantage that even when the reference parameter changes during the time period in which it is predicted that the reference parameter does not change, the look-ahead predicted first and second controlled outputs necessary for the correction of the logic can be calculated with a small calculation burden and thus, the logic can be corrected with a small calculation burden.

Further, the aforementioned invention has a characteristic that the look-ahead predicted first and second controlled outputs are used for the correction of the logic and as far as the invention has this advantage, the aforementioned advantage can be obtained and therefore, the manner of the correction of the logic of the invention on the basis of the look-ahead predicted first and second controlled outputs in the invention may be any manner.

For example, the manner for correcting the logic such that the deviation between the actual first controlled output at the predetermined time period having elapsed and the look-ahead predicted first controlled output decreases and the deviation between the actual second controlled output at the predetermined time period having elapsed and the look-ahead predicted second controlled output decreases can be employed as the correction manner of the invention.

Further, as the functions performed by the logic of the invention, the architecture has:

a function for calculating as the primary predicted first control input, the predicted first control input to the first controlled object in the case that the base first controlled output set on the basis of the first reference engine state parameter is set as the target first controlled output, while calculating as the primary predicted second control input, the predicted second control input to the second controlled object in the case that the base second controlled output set on the basis of the second reference parameter is set as the target second controlled output;

a function for setting the base first controlled output as the target first controlled output when the primary predicted first control input satisfies a first input constraint condition relating thereto and on the other hand, correcting the base first controlled output to calculate a primary corrected base first controlled output when the primary predicted first control input does not satisfies the first input constraint condition and then calculating as a secondary predicted first control input, the predicted first control input in the case that the primary corrected base first controlled output is set as the target first controlled output, while setting the base second controlled output as the target second controlled output when the primary predicted second controlled output satisfies a second input constraint condition relating thereto and on the other hand, correcting the base second controlled output to calculate a primary corrected base second controlled output when the primary predicted second controlled output does not satisfy the second input constraint condition and then calculating as a secondary predicted second control input, the predicted second control input in the case that the primary corrected base second controlled output is set as the target second controlled output;

a function for setting the primary corrected base first controlled output as the target first controlled output when the secondary predicted first control input is calculated and then satisfies the first input constraint condition and on the other hand, correcting the primary corrected base first controlled output to calculate a new primary corrected base first controlled output and then calculating as a new secondary predicted first control input, the predicted first control input in the case that the calculated new primary corrected base first controlled output is set as the target first controlled output, while setting the primary corrected base second controlled output as the target second controlled output when the secondary predicted second control input is calculated and then satisfies the second input constraint condition and on the other hand, correcting the primary corrected base second controlled output to calculate a new primary corrected base second controlled output when the secondary predicted second control input does not satisfy the second input constraint condition and then calculating as a new secondary predicted second control input, the predicted second control input in the case that the calculated new primary corrected base second controlled output is set as the target second controlled output; and a function for repeatedly performing the calculation of the new primary corrected base first controlled output by correcting the primary corrected base first controlled output and the calculation of the new secondary predicted first control input in the case that the new primary corrected base first controlled output is set as the target first controlled output until the new secondary predicted first control input satisfies the first input constraint condition in the case that the new secondary predicted first control input is calculated, while repeatedly performing the calculation of the new primary corrected base second controlled output by correcting the primary corrected base second controlled output and the calculation of the new secondary predicted second control input in the case that the new primary corrected base second controlled output is set as the target second controlled output until the new secondary predicted second control input satisfies the second input constraint condition in the new secondary predicted second control input is calculated, wherein referring to one of the first and second reference parameter as a particular reference engine state parameter, when it is predicted that the particular parameter changes during the predetermined time period under the condition where the particular parameter is maintained constant, the primary or secondary predicted first control input, which satisfies the first input constraint condition at the predetermined time period having elapsed assuming that the particular parameter does not change during the predetermined time period, may be calculated as a look-ahead predicted first control input, while the primary or secondary predicted second control input, which satisfies the second input constraint condition at the predetermined time period having elapsed assuming that the particular parameter does not change, may be calculated as a look-ahead predicted second control input and then the logic may be corrected on the basis of the look-ahead predicted first and second control inputs.

For the same reason as that explained above, this has an advantage that the look-ahead predicted first and second inputs necessary for the correction of the logic can be calculated with a small calculation burden and thus, the logic can be corrected with a small calculation burden.

In particular, in the aforementioned invention, the first and second controlled outputs influence each other and therefore, the first control input and the second controlled output, which influence the first controlled output, influence each other, while the second control input and the first controlled output, which influence the second controlled output, influence each other and therefore, if the look-ahead predicted first and second control inputs are calculated assuming that the reference parameter changes during the time period in which it is predicted that the reference parameter does not change, the change of the reference parameter as well as the influence of the second control input to the first controlled output and the influence of the first control input to the second controlled output should be considered in the calculation.

According to this, the burden of calculation of the look-ahead predicted first and second control inputs increases considerably.

For this reason, the aforementioned invention, which has the advantage that the look-ahead predicted first and second control inputs can be calculated with a small calculation burden and thus, the logic can be corrected with a small calculation burden, is considerably useful.

Further, in the aforementioned invention, when the particular parameter changes during the predetermined time period, it is preferred that the look-ahead predicted first control input is corrected depending on the change amount of the particular parameter during the predetermined time period such that the look-ahead predicted first control input corresponds to the predicted first control input at the predetermined time period having elapsed in the case that the particular parameter changes during the aforementioned period, while the look-ahead predicted second control input is corrected depending on the change amount of the particular parameter during the predetermined time period such that the look-ahead predicted second control input corresponds to the predicted second control input at the aforementioned period having elapsed in the case that the particular parameter changes during the aforementioned period.

For the same reason as that explained above, this has an advantage that even when the reference parameter changes during the time period in which it is predicted that the reference parameter does not change, the look-ahead predicted first and second control inputs necessary for the correction of the logic can be calculated with a small calculation burden and thus, the logic can be corrected with a small calculation burden.

Further, the aforementioned invention has a characteristic that the look-ahead predicted first and second control inputs are used for the correction of the logic and as far as the invention has this characteristic, the aforementioned advantage can be obtained and therefore, the manner of the correction of the logic on the basis of the look-ahead predicted first and second control inputs in the invention may be any manner.

For example, in the aforementioned invention, the manner for correcting the logic such that the deviation between the actual first control input at the predetermined time period having elapsed and the look-ahead predicted first control input decreases and the deviation between the actual second control input at the predetermined time period having elapsed and the look-ahead predicted second control input decreases may be employed.

Further, as explained above, the aforementioned invention has a characteristic that the look-ahead predicted first and second controlled outputs or the look-ahead predicted first and second control inputs are used for the correction of the logic and as far as the invention has this characteristic, the aforementioned advantage can be obtained and therefore, the controlled object and the controlled output in the invention may be any object and any output, respectively.

For example, in the aforementioned invention, in the case that the engine comprises a supercharger for supercharging a gas suctioned into a combustion chamber and the supercharger has means for controlling a supercharging pressure of the gas suctioned into the combustion chamber, the supercharging pressure control means of the supercharger may be employed as the first controlled object and the supercharging pressure controlled by the means may be employed as the first controlled output.

Further, in the aforementioned invention, in the case that the engine comprises an exhaust gas recirculation device for introducing, into an intake passage, an exhaust gas discharged from a combustion chamber and the device has means for controlling an exhaust gas recirculation amount of the exhaust gas introduced into the intake passage, the exhaust gas recirculation amount control means of the device may be employed as the second controlled object and the exhaust gas recirculation amount controlled by the aforementioned means may be employed as the second controlled output.

Otherwise, in the aforementioned invention, in the case that the engine comprises a throttle valve for controlling an amount of a gas suctioned into a combustion chamber, the throttle valve may be employed as the second controlled object and the gas amount controlled by the throttle valve may be employed as the second controlled output.

Otherwise, in the aforementioned invention, in the case that the engine comprises an exhaust gas recirculation device for introducing, into an intake passage, an exhaust gas discharged from a combustion chamber and a throttle valve for controlling an amount of a gas suctioned into the combustion chamber and the device has means for controlling an exhaust gas recirculation amount of the exhaust gas introduced into the intake passage, the exhaust gas recirculation amount control means of the device may be employed as the first controlled object, the exhaust gas recirculation amount controlled by the aforementioned means may be employed as the first controlled output, the throttle valve may be employed as the second controlled object and the gas amount controlled by the throttle valve may be employed as the second controlled output.

Further, as explained above, the aforementioned invention has a characteristic that the look-ahead predicted first and second controlled outputs or the look-ahead predicted first and second control inputs are used for the correction of the logic and as far as the invention has this characteristic, the aforementioned advantage can be obtained and therefore, the controlled object and the control input in the invention may be any object and any input, respectively.

For example, in the aforementioned invention, in the case that the engine comprises a supercharger for supercharging a gas suctioned into a combustion chamber and the supercharger has means for controlling a supercharging pressure of the gas suctioned into the combustion chamber, the supercharging pressure control means of the supercharger may be employed as the first controlled object and a manipulation amount input to this means may be employed as the first control input.

Further, in the aforementioned invention, in the case that the engine comprises an exhaust gas recirculation device for introducing, into an intake passage, an exhaust gas discharged from a combustion chamber and this device has means for controlling an exhaust gas recirculation amount of the exhaust gas introduced into the intake passage, the exhaust gas recirculation amount control means of the device may be employed as the second controlled object and a manipulation amount input this means may be employed as the second control input.

Otherwise, in the aforementioned invention, in the case that the engine comprises a throttle valve for controlling an amount of a gas suctioned into a combustion chamber, the throttle valve may be employed as the second controlled object and a manipulation amount input to the throttle valve may be employed as the second control input.

Otherwise, in the aforementioned invention, in the case that the engine comprises an exhaust gas recirculation device for introducing, into an intake passage, an exhaust gas discharged from a combustion chamber and a throttle valve for controlling an amount of the gas suctioned into the combustion chamber and the exhaust gas recirculation device has means for controlling an exhaust gas recirculation amount of the exhaust gas introduced into the intake passage, the exhaust gas recirculation amount control means of the device may be employed as the first controlled object, a manipulation amount input to this means may be employed as the first control input, the throttle valve may be employed as the second controlled object and a manipulation amount input to the throttle valve may be employed as the second controlled output.

Further, the further another invention of this application relates to a control device applied to an internal combustion engine comprising first and second controlled objects, a first controlled output from the first controlled object and a second controlled output from the second controlled object influencing each other, the control device controlling operation states of the first and second controlled objects such that the first controlled output corresponds to a target first controlled output and the second controlled output corresponds to a target second controlled output.

The control device of the invention comprises a target controlled output setting architecture.

Referring to a controlled output used as a base for setting the target first controlled output as a base first controlled output, referring to a controlled output used as a base for setting the target second controlled output as a base second controlled output, referring to a parameter relating to the engine state as an engine state parameter, referring to the parameter referred for setting the base first controlled output as a first reference engine state parameter and referring to the parameter referred for setting the base second controlled output as a second reference engine state parameter, The architecture has:

a function for calculating as a primary predicted first control input, the predicted first control input to the first controlled object in the case that the base first controlled output set on the basis of the first reference engine state parameter is set as the target first controlled output, while calculating as a primary predicted second control input, the predicted second control input to the second controlled object in the case that the base second controlled output set on the basis of the second reference engine state parameter is set as the target second controlled output;

a function for setting the base first controlled output as the target first controlled output when the primary predicted first control input satisfies a first input constraint condition relating thereto and on the other hand, correcting the base first controlled output to calculate a primary corrected base first controlled output when the primary predicted first control input does not satisfy the first input constraint condition and then calculating as a secondary predicted first control input, the predicted first control input in the case that the primary corrected base first controlled output is set as the target first controlled output, while setting the base second controlled output as the target second controlled output when the primary predicted second controlled output satisfies a second input constraint condition relating thereto and on the other hand, correcting the base second controlled output to calculate a primary corrected base second controlled output when the primary predicted second controlled output does not satisfy the second input constraint condition and then calculating as the secondary predicted second control input, the predicted second control input in the case that the primary corrected base second controlled output is set as the target second controlled output;

a function for setting the primary corrected base first controlled output as the target first controlled output when the secondary predicted first control input is calculated and then satisfies the first input constraint condition and on the other hand, correcting the primary corrected base first controlled output to calculate a new primary base first controlled output when the secondary predicted first control input does not satisfy the first input constraint condition and then calculating as a new secondary predicted first control input, the predicted first control input in the case that the calculated new primary corrected base first controlled output is set as the target first controlled output, while setting the primary corrected base second controlled output as the target second controlled output when the secondary predicted control input is calculated and then satisfies the second input constraint condition and on the other hand, correcting the primary corrected base second controlled output to calculate a new primary corrected base second controlled output when the secondary predicted second control input does not satisfy the second input constraint condition and then calculating as a new secondary predicted second control input, the predicted second control input in the case that the calculated new primary corrected base second controlled output is set as the target second controlled output; and a function for repeatedly performing the calculation of the new primary corrected base first controlled output by correcting the primary corrected base first controlled output and the calculation of the new secondary predicted first control input in the case that the new primary corrected base first controlled output is set as the target first controlled output until the new secondary predicted first control input satisfies the first input constraint condition in the case that the new secondary predicted first control input is calculated, while repeatedly performing the calculation of the new primary corrected base second controlled output by correcting the primary corrected base second controlled output and the calculation of the new secondary predicted second control input in the case that the new primary corrected base second controlled output is set as the target second controlled output until the new secondary predicted second control input satisfies the secondary input constraint condition in the case that the new secondary predicted second control input is calculated.

Referring to one of the first and second reference engine state parameters as a particular reference engine state parameter, in the control device of the invention, when it is predicted that the particular parameter changes during the predetermined time period under the condition where the particular parameter is maintained constant, the primary or secondary predicted first control input, which satisfies the first input constraint condition at the predetermined time period having elapsed assuming that the particular parameter does not change during the predetermined time period, is calculated as the look-ahead predicted first control input, while the primary or secondary predicted second control input, which satisfies the second input constraint condition at the predetermined time period having elapsed assuming that the particular parameter does not change and the target controlled output setting logic for performing the functions of the architecture is corrected on the basis of the look-ahead predicted first and second control input.

The target controlled output setting logic in the invention may be any logic as far as it performs the aforementioned functions and as this logic, for example, the target value setting logic of the embodiments explained below may be employed.

For the same reason as that explained above, the aforementioned invention has an advantage that the look-ahead predicted first and second control inputs necessary for the correction of the logic can be calculated with a small calculation burden and thus, the logic can be corrected with a small calculation burden.

Further, for the same reason as that explained above, the aforementioned invention is considerably useful in the case the first and second controlled outputs influence each other.

In the aforementioned invention, when the particular parameter changes during the predetermined time period, it is preferred that the look-ahead predicted first control input is corrected depending on the change amount of the particular parameter during the predetermined time period such that the look-ahead predicted first control input corresponds to the predicted first control input at the predetermined time period having elapsed in the case that the particular parameter changes during the predetermined time period, while the look-ahead predicted second control input is corrected depending on the change amount of the particular parameter during the predetermined time period such that the look-ahead predicted second control input corresponds to the predicted second control input at the predetermined time period having elapsed in the case that the particular parameter changes during the predetermined time period.

For the same reason as that explained above, this has an advantage that even when the reference parameter changes during the time period in which it is predicted that the reference parameter does not change, the look-ahead predicted first and second control inputs necessary for the correction of the logic can be calculated with a small calculation burden and thus, the logic can be corrected with a small calculation burden.

Further, the aforementioned invention has a characteristic that the look-ahead predicted first and second control inputs used for the correction of the logic and as far as the invention has this characteristic, the aforementioned advantage can be obtained and therefore, the manner of the correction of the logic on the basis of the look-ahead predicted first and second control inputs in the invention may be any manner.

For example, in the aforementioned invention, the manner of the correction of the logic such that the deviation between the actual first control input at the predetermined time period having elapsed and the look-ahead predicted first control input decreases and the deviation between the actual second control input at the predetermined time period having elapsed and the look-ahead predicted second control input decrease may be employed.

Further, as explained above, the aforementioned invention has a characteristic that the look-ahead predicted first and second controlled outputs or the look-ahead predicted first and second control inputs are used for the correction of the logic and as far as the invention has this characteristic and therefore, the controlled object and the control input in the invention may be any object and any input, respectively.

For example, in the invention, in the case that the engine comprises a supercharger for supercharging a gas suctioned into a combustion chamber and the supercharger has means for controlling a supercharging pressure of the gas suctioned into the combustion chamber, the supercharging pressure control means of the supercharger may be employed as the first controlled object and a manipulation amount input to this means may be employed as the first control input.

Further, in the aforementioned invention, in the case that the engine comprises an exhaust gas recirculation device for introducing, into an intake passage, an exhaust gas discharged from a combustion chamber and this device has means for controlling an exhaust gas recirculation amount of the gas introduced into the intake passage, the exhaust gas recirculation amount control means of the device may be employed as the second controlled object and a manipulation amount input to this means may be employed as the second control input.

Otherwise, in the aforementioned invention, in the case that the engine comprises a throttle valve for controlling an amount of a gas suctioned into a combustion chamber, the throttle valve may be employed as the second controlled object and a manipulation amount input to the throttle valve may be employed as the second control input.

Further, in the aforementioned invention, in the case that the engine comprises an exhaust gas recirculation device for introducing, into an intake passage, an exhaust gas discharged from a combustion chamber and a throttle valve for controlling an amount of a gas suctioned into the combustion chamber and the exhaust gas recirculation device has means for controlling an exhaust gas recirculation amount of the exhaust gas introduced into the intake passage, the exhaust gas recirculation amount control means of the device may be employed as the first controlled object, a manipulation amount input to this means may be employed as the first controlled input, the throttle valve may be employed as the second controlled object and a manipulation amount input to the throttle valve may be employed as the second control input.

Further, as explained above, the aforementioned invention has a characteristic that the look-ahead predicted first and second controlled outputs or the look-ahead predicted first and second control inputs are used for the correction of the logic and as far as the invention has this characteristic, the aforementioned advantage can be obtained and therefore, the manner of the prediction of the reference parameter change during the predetermined time period under the condition where the reference parameter is maintained constant during the predetermined time parameter may be any manner.

For example, in the aforementioned invention, in the case that the engine comprises a fuel injector and the control device has:

a function for setting a target fuel injection amount of a fuel injected from the injector and then, controlling an operation of the injector such that the fuel of the set target fuel injection amount is injected from the injector; and a function for performing a fuel injection amount delay control using the set target fuel injection amount for the control of the operation of the injector at the predetermined time period having elapsed from the setting time, a manner of the prediction of the particular parameter change at the predetermined time period having elapsed under the condition where the particular parameter is maintained constant during the predetermined time period when the fuel injection amount delay is performed may be employed.

Further, as explained above, the aforementioned invention has a characteristic that the look-ahead predicted first and second controlled outputs or the look-ahead predicted first and second control inputs are used for the correction of the logic and as far as the invention has this characteristic, the advantage can be obtained and therefore, the reference parameter in the aforementioned invention may be any parameter.

For example, in the aforementioned invention, an engine speed may be employed as the first reference engine state parameter.

Further, in the aforementioned invention, in the case that the engine comprises a fuel injector, an amount of a fuel injected from the injector may be employed as the first reference engine state parameter.

Further, in the aforementioned invention, the first and second reference engine state parameters may be the same as each other.

Further, in the aforementioned invention, a logic using a reference governor may be employed as the target controlled output setting logic.

5(B) shows an example of a routine for performing a setting of a target throttle valve opening degree of the first embodiment.

Figure 6:
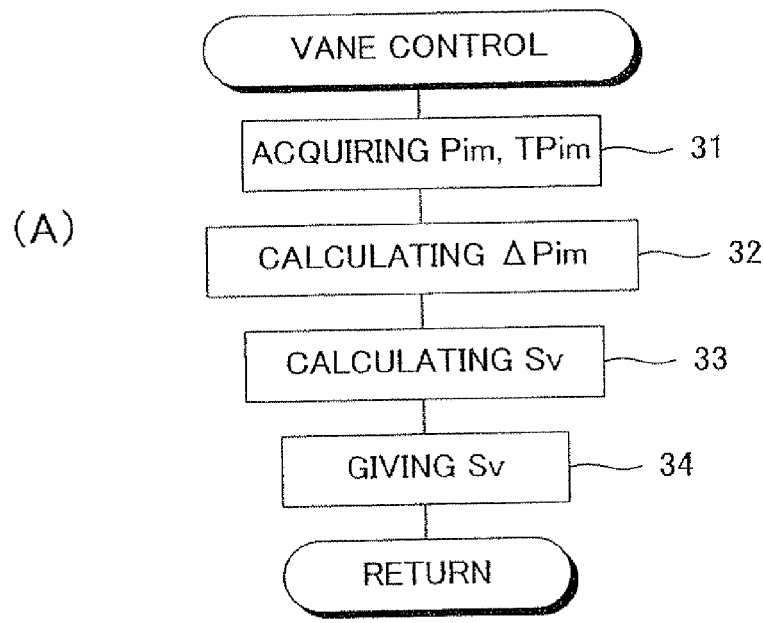
Figure 6:
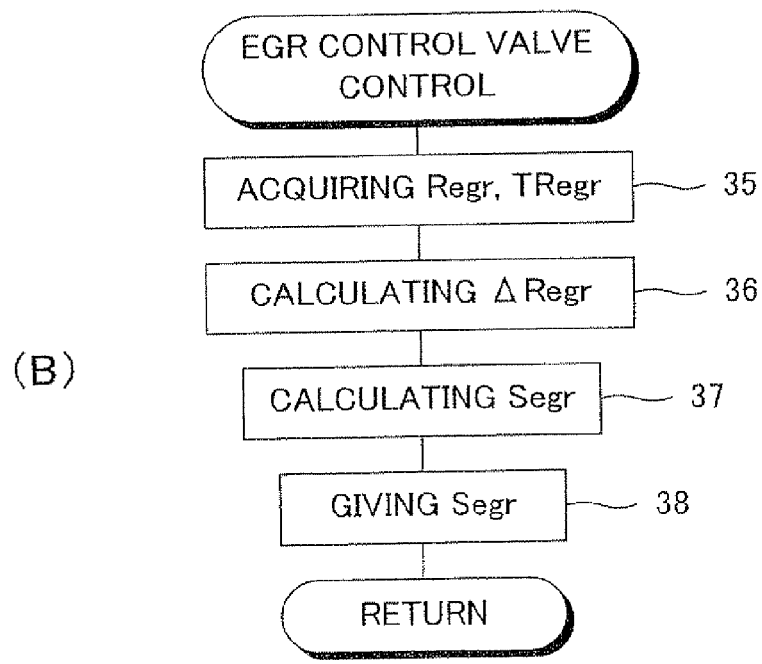

FIG. 6(A) shows an example of a routine for performing a control of vanes of the first embodiment and FIG. 6(B) shows an example of a routine for performing a control of an EGR control valve of the first embodiment.

Figure 7:
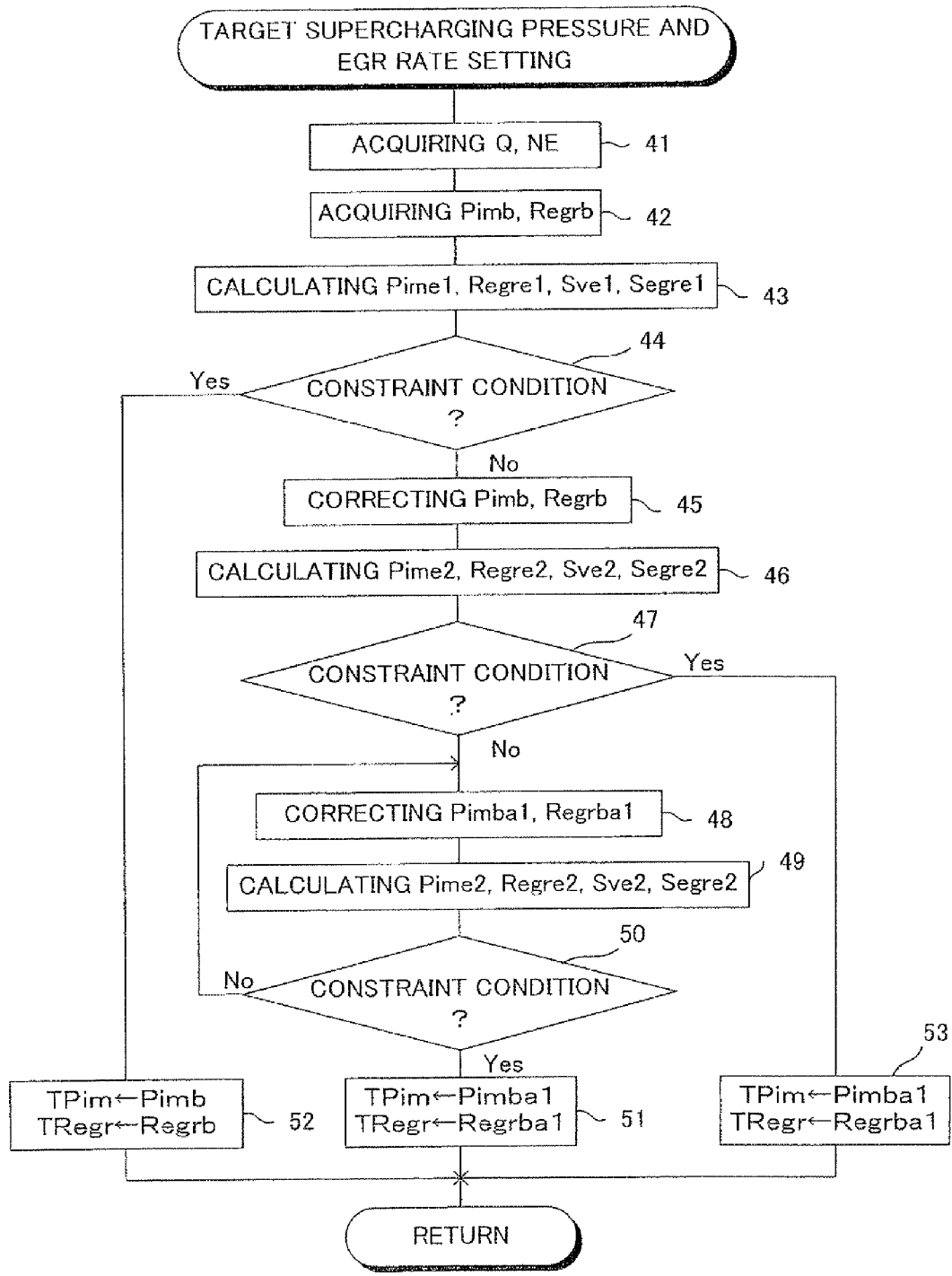

FIG. 7 shows an example of a routine for performing a setting of a target supercharging pressure and a target EGR rate of the first embodiment.

Figure 8:
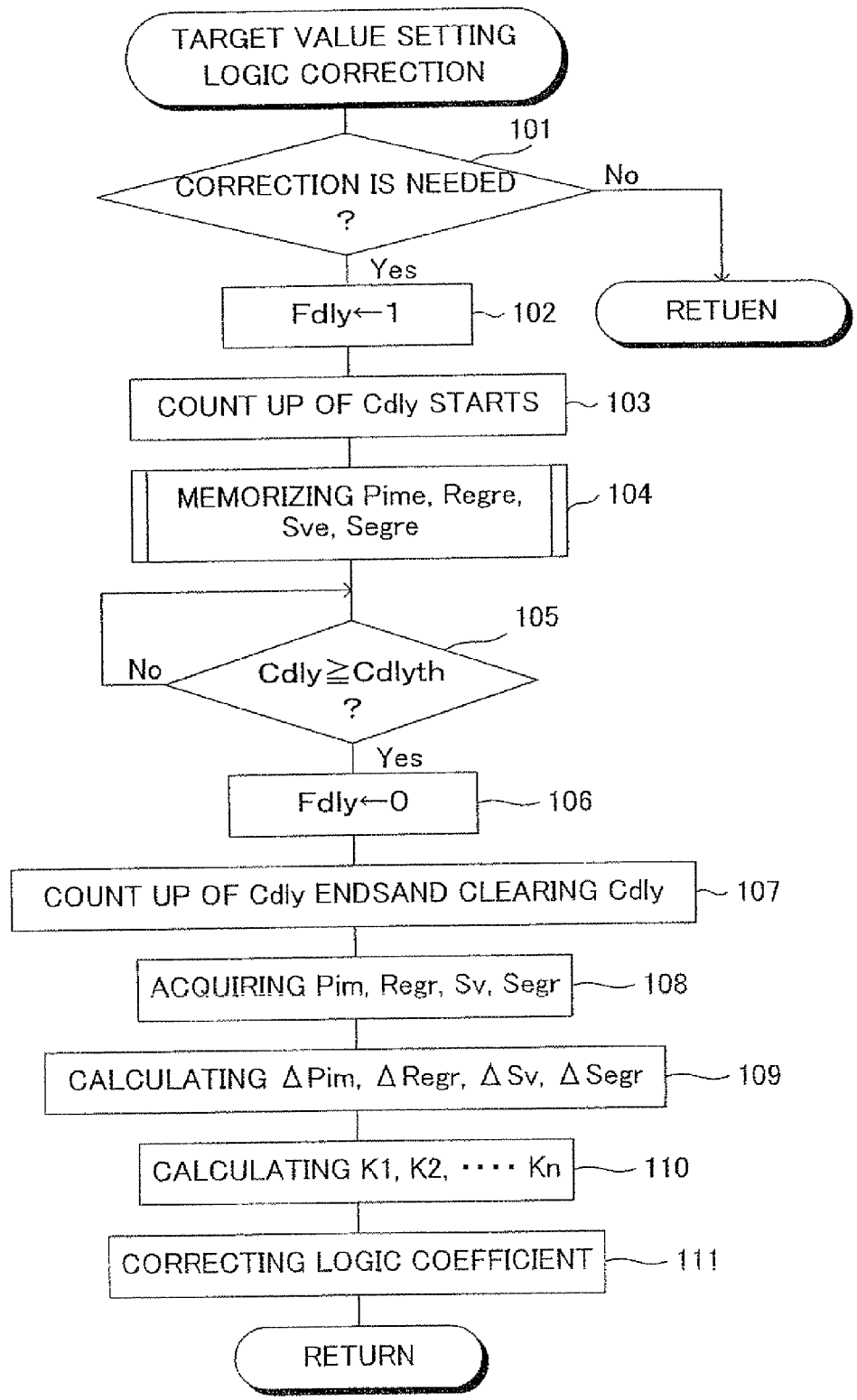

FIG. 8 shows a part of an example of a routine for performing a correction of a target value setting logic of the first embodiment.

Figure 9:
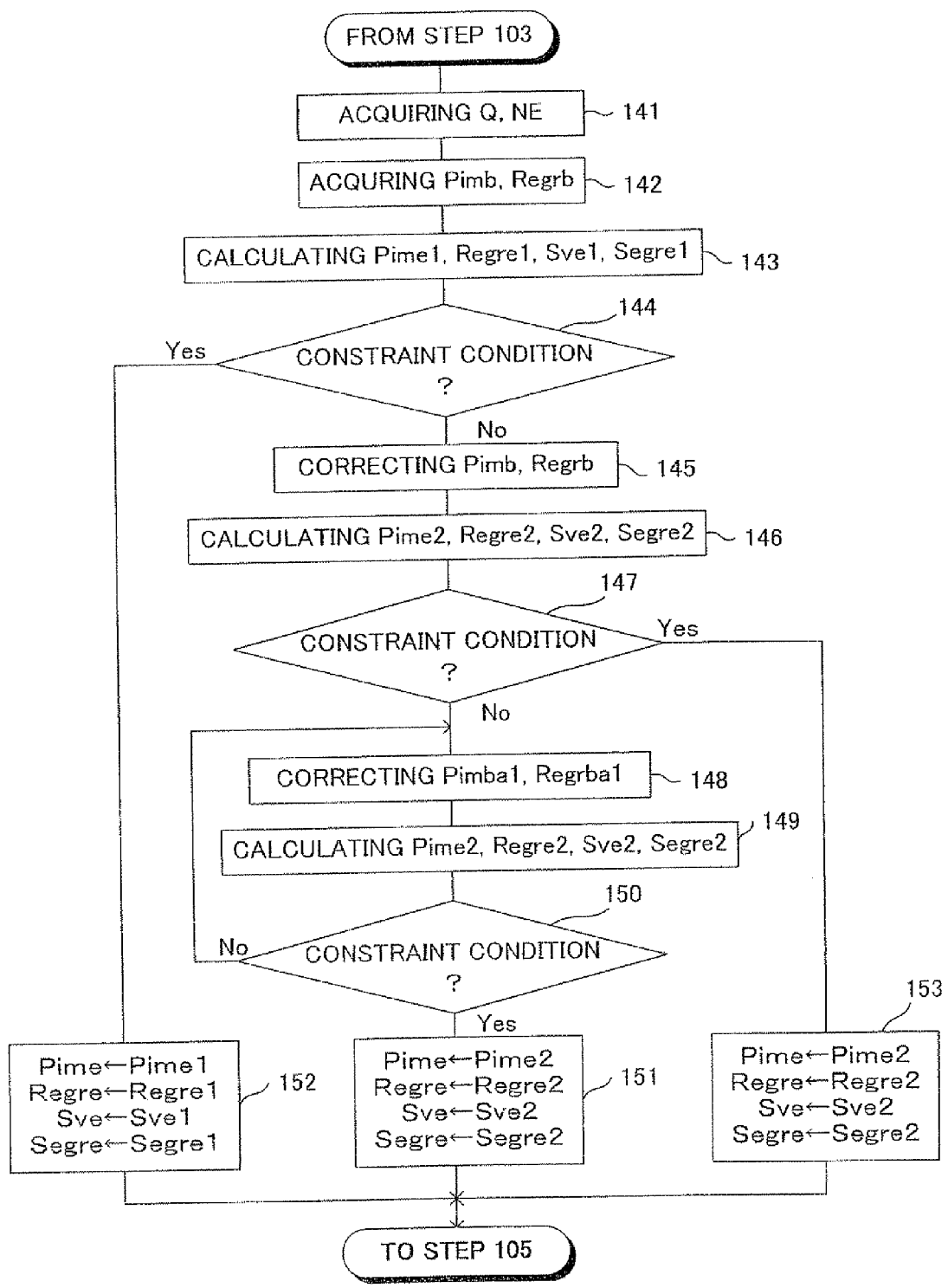

FIG. 9 shows a part of an example of a routine for performing a correction of a target value setting logic of the first embodiment.

Figure 10:
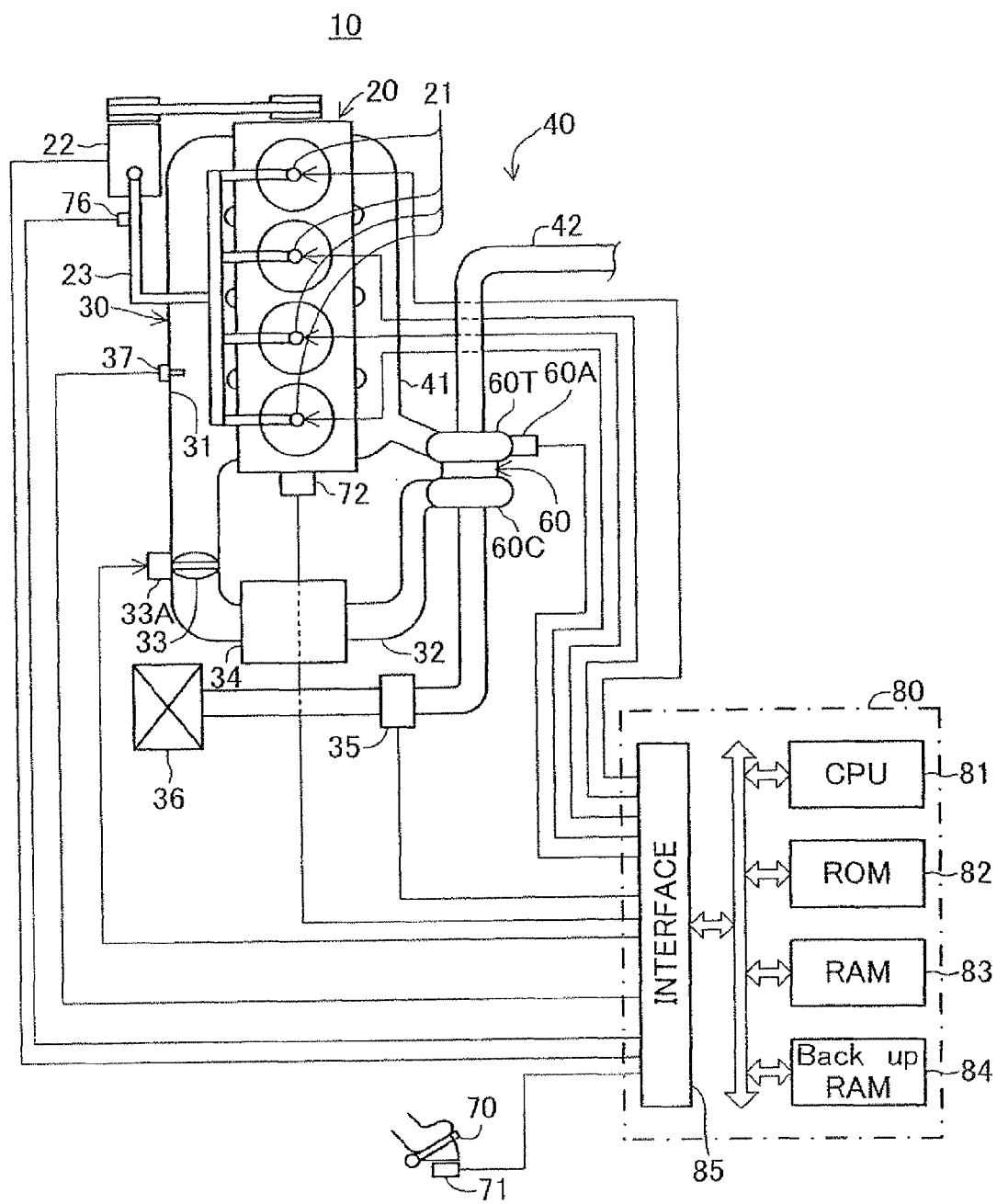

FIG. 10 shows an internal combustion engine which the control device of the invention is applied.

Figure 11:
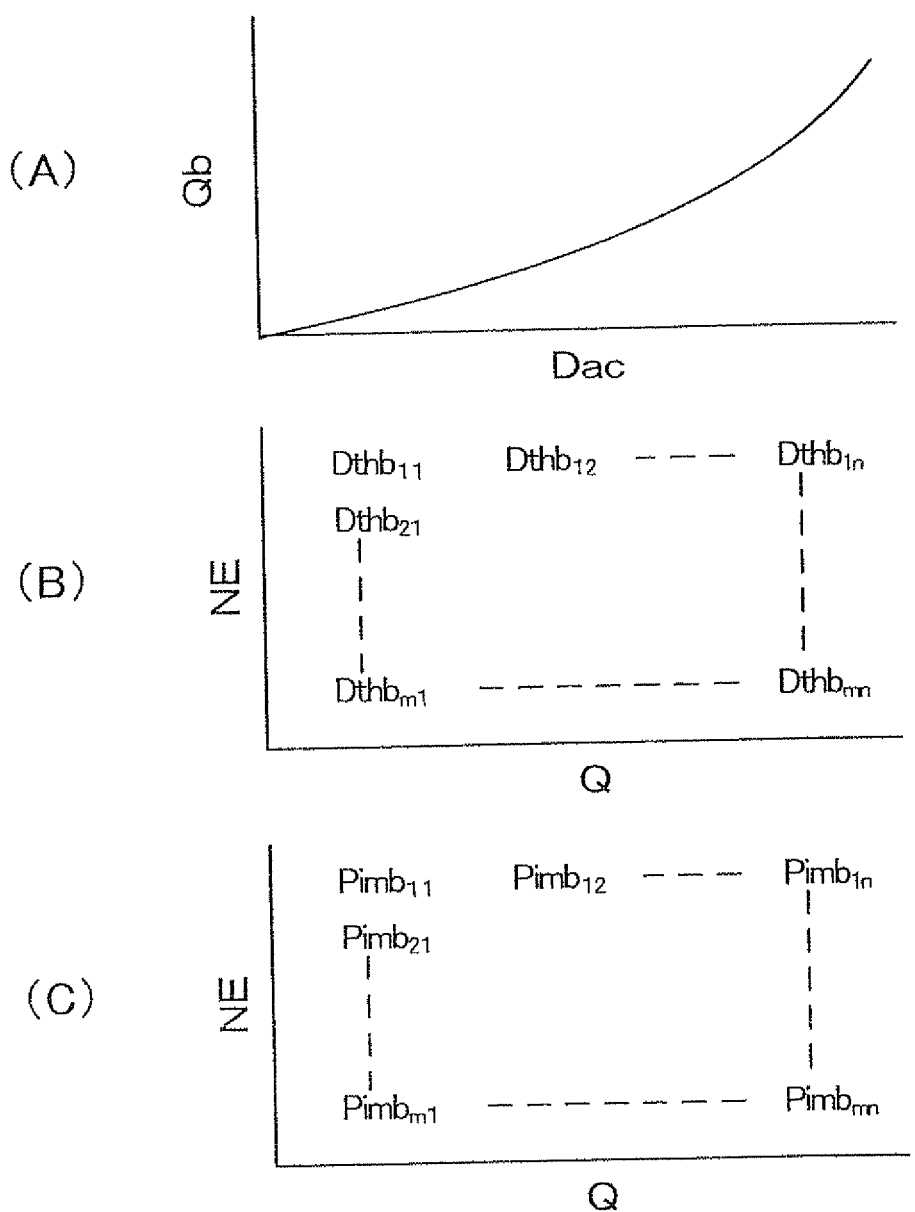

FIG. 11(A) shows a map used for acquiring a base fuel injection amount, FIG. 11(B) shows a map used for acquiring a base throttle valve opening degree and FIG. 11(C) shows a map used for acquiring a base supercharging pressure.

Figure 12:
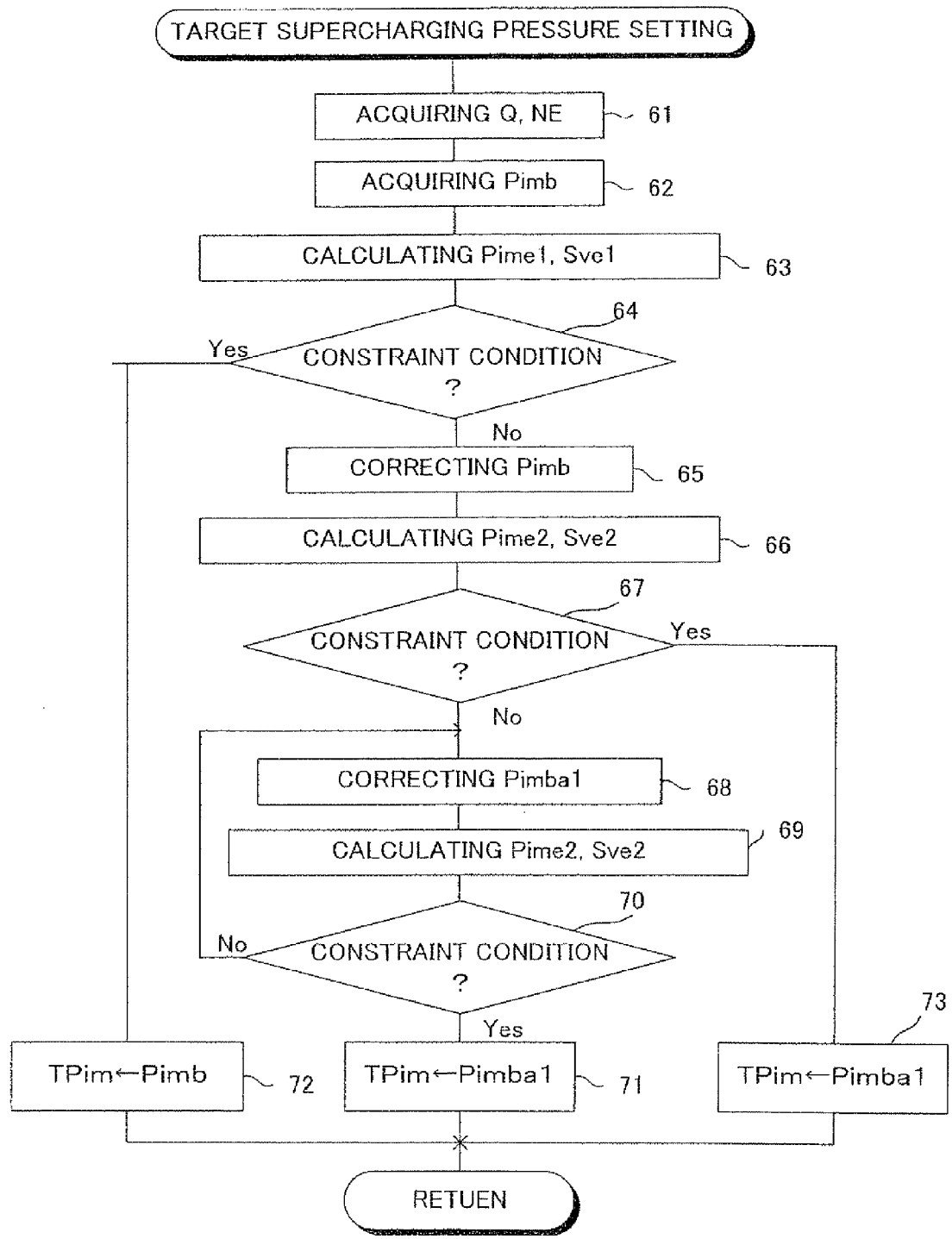

FIG. 12 shows an example of a routine for performing a setting of a target supercharging pressure of the second embodiment.

Figure 13:
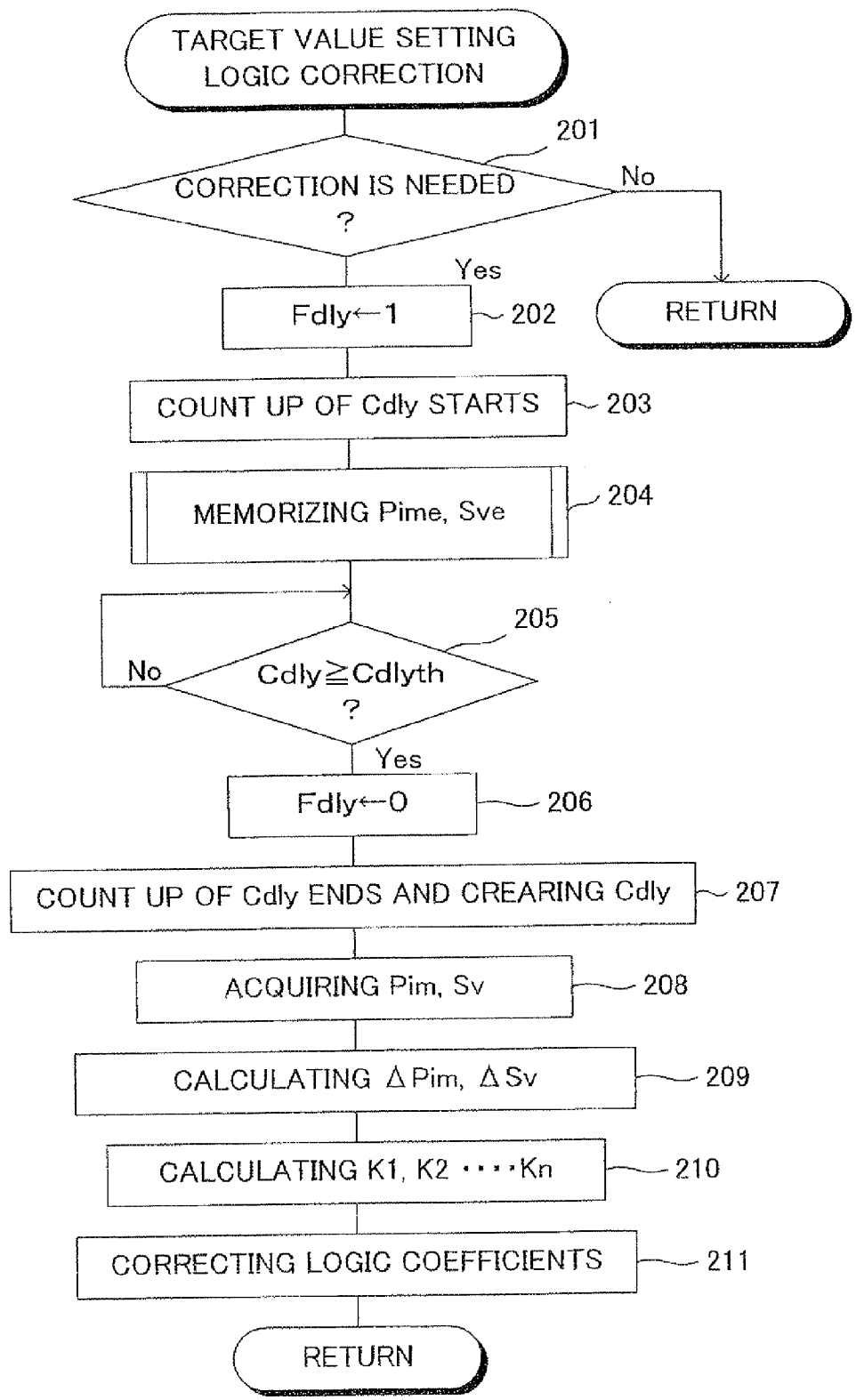

FIG. 13 shows a part of an example of a routine for performing a correction of a target value setting logic of the second embodiment.

Figure 14:
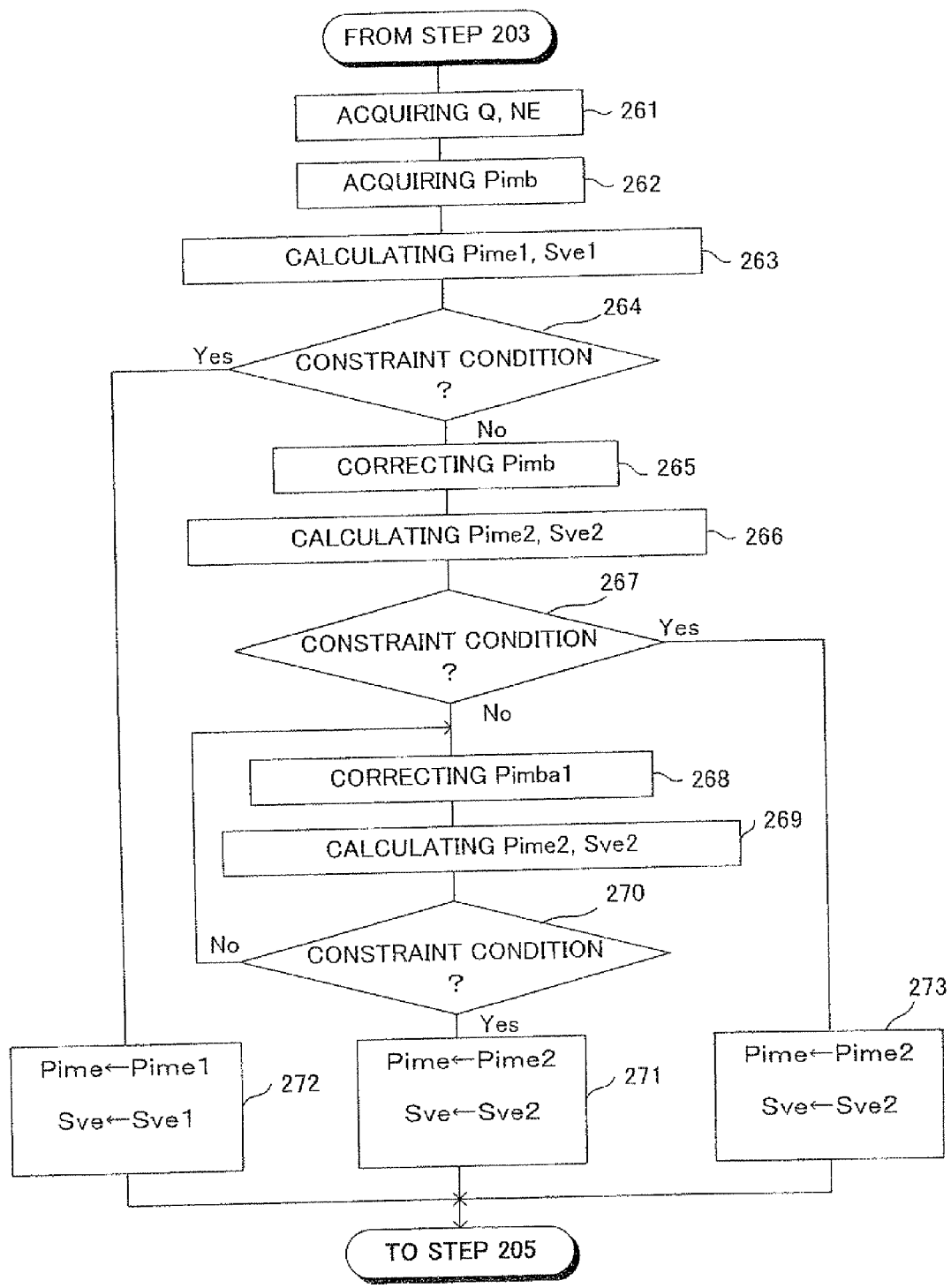

FIG. 14 shows a part of an example of a routine for performing a correction of a target value setting logic of the second embodiment.

Figure 15:
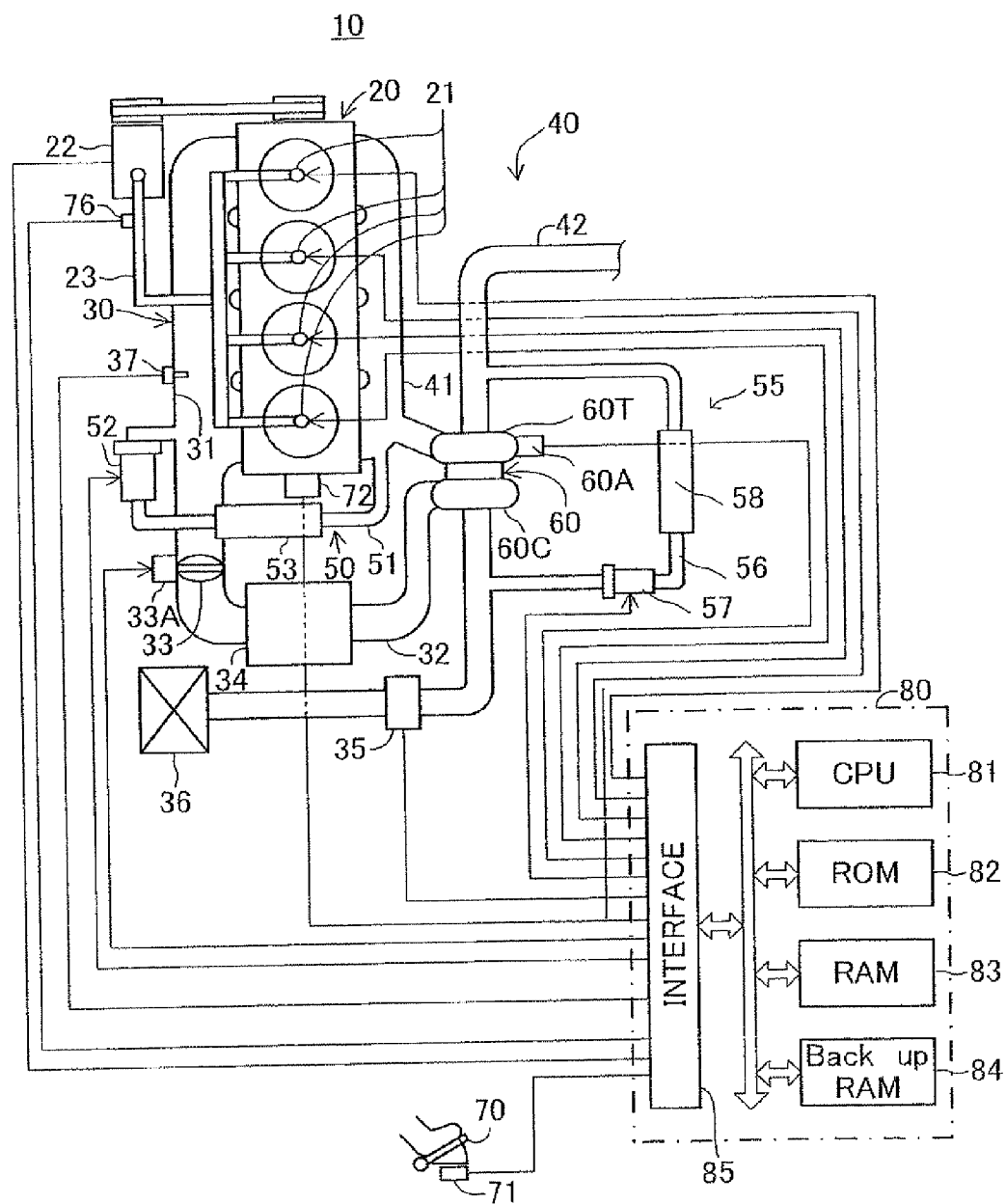

FIG. 15 shows an internal combustion engine which the control device of the invention can be applied.

Figure 16:
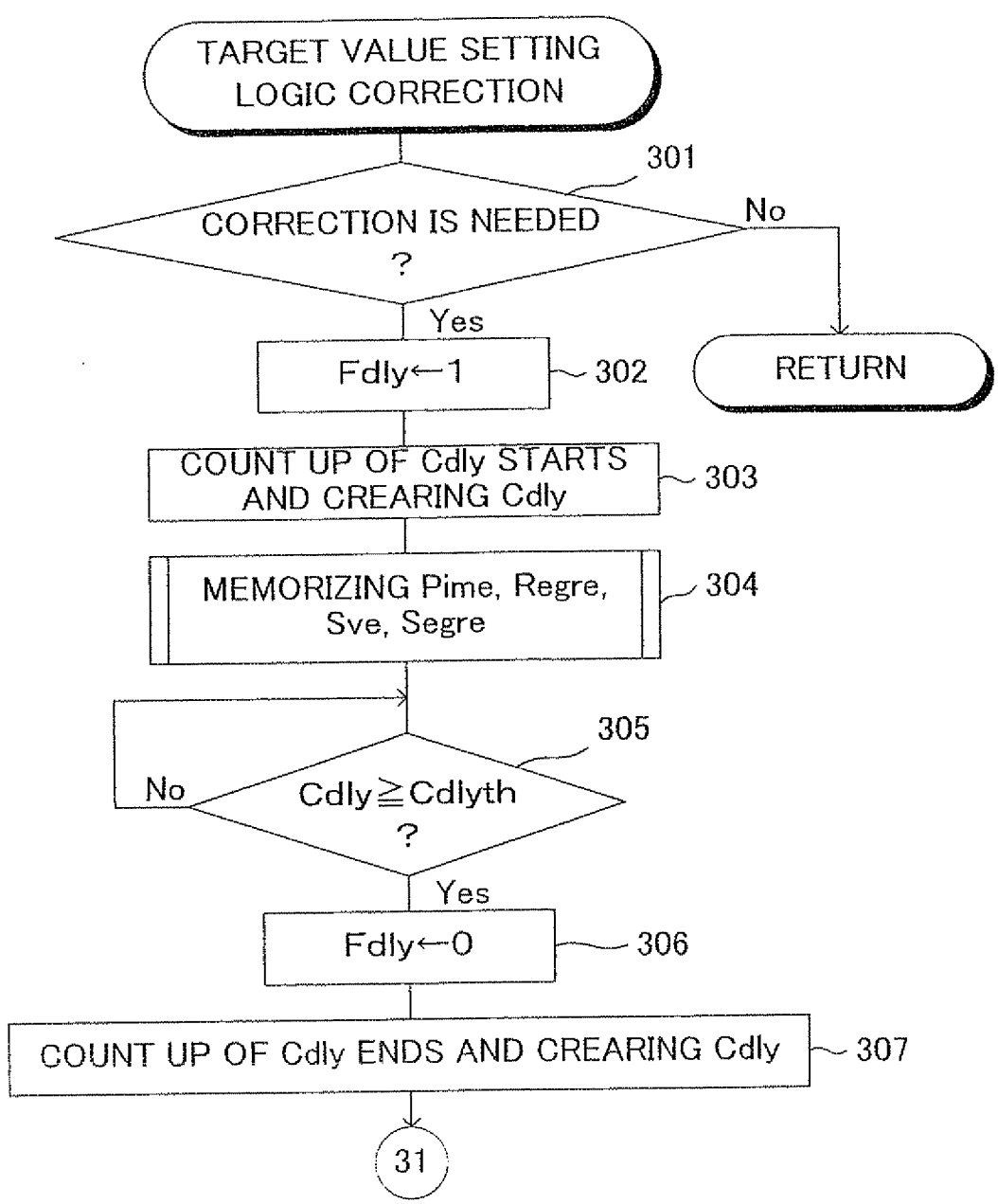

FIG. 16 shows a part of an example of a routine for performing a correction of a target value setting logic of the third embodiment.

Figure 17:
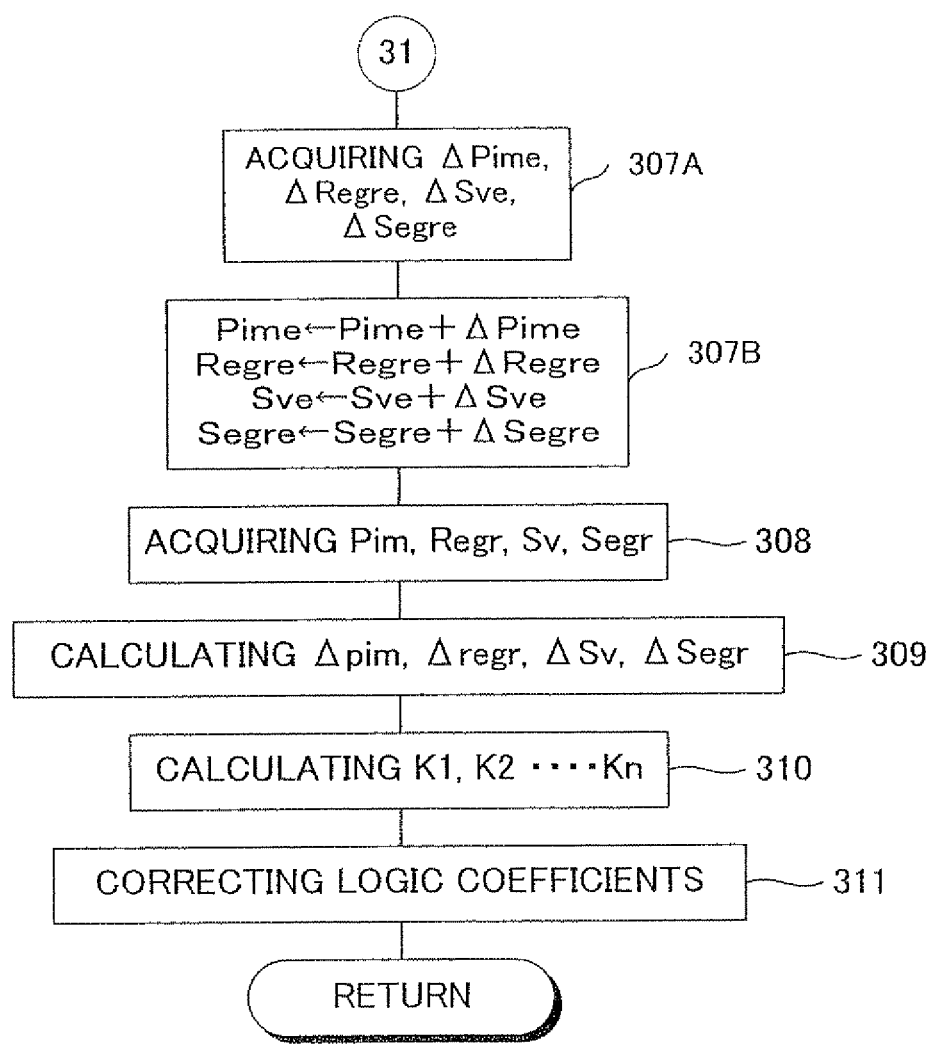

FIG. 17 shows a part of an example of a routine for performing a correction of a target value setting logic of the third embodiment.

Figure 18:
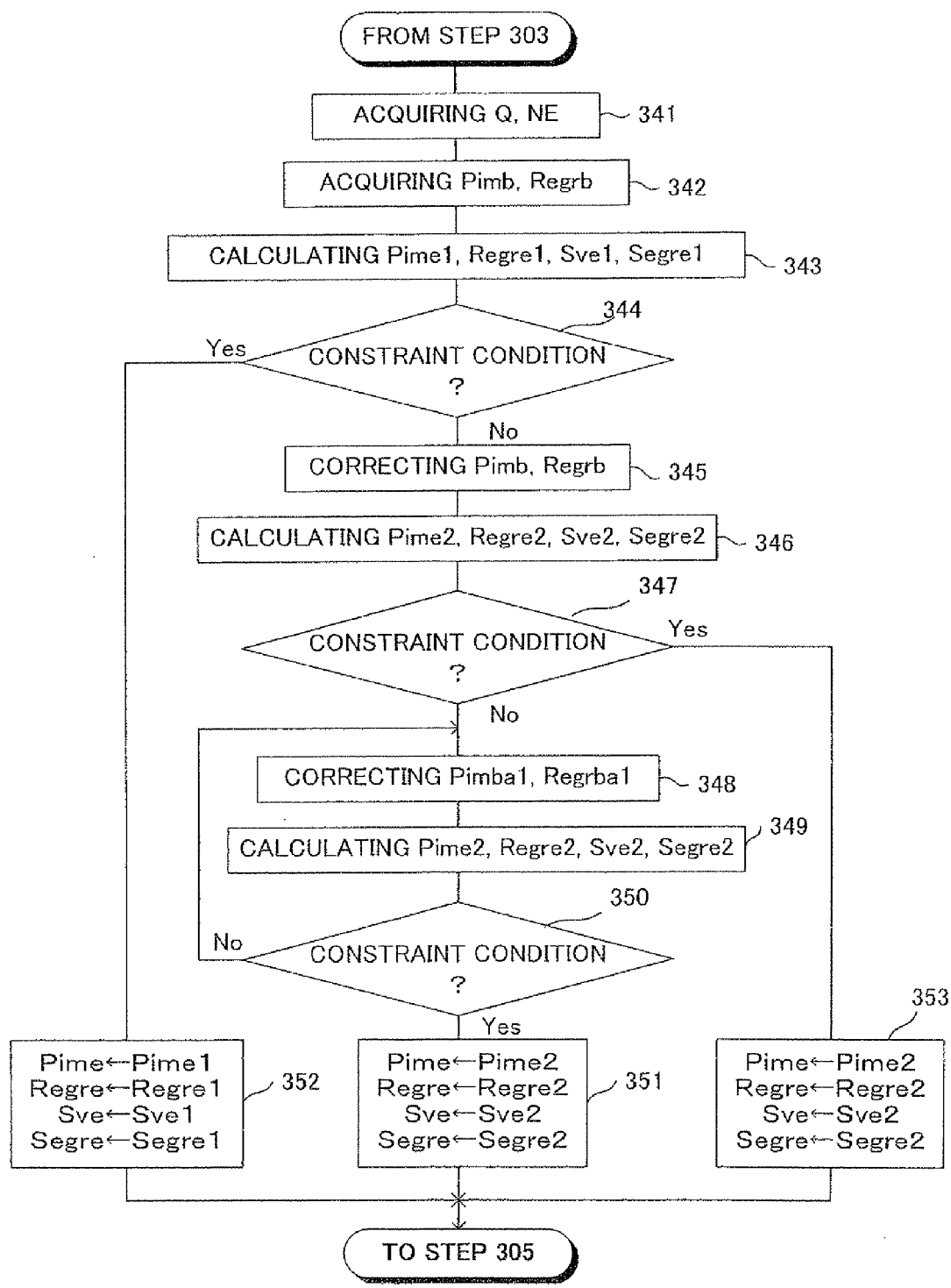

FIG. 18 shows a part of an example of a routine for performing a correction of a target value setting logic of the third embodiment.

Figure 19:
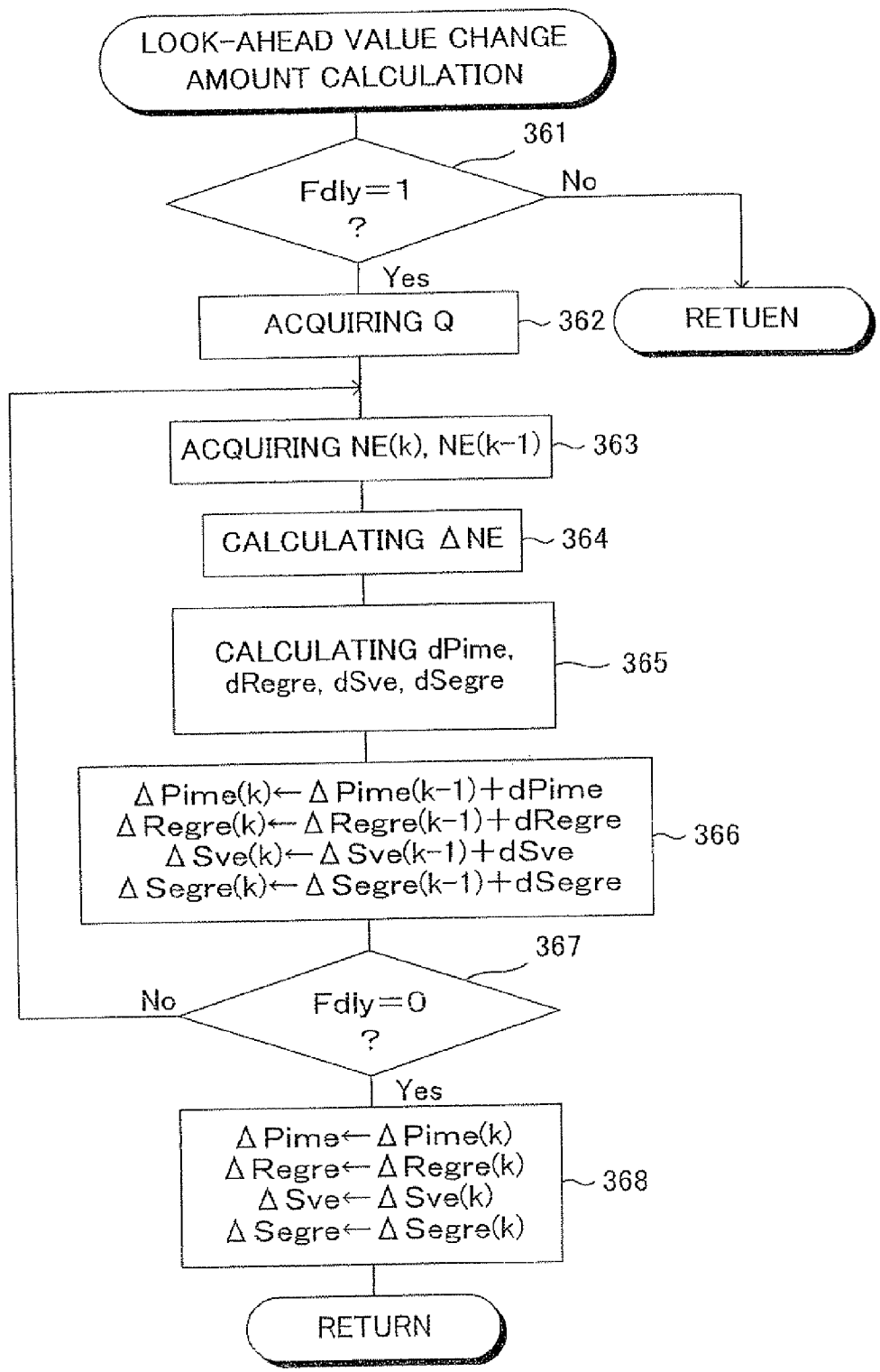

FIG. 19 shows an example of a routine for performing a calculation of a look-ahead change amount of third embodiment.

Figure 20:
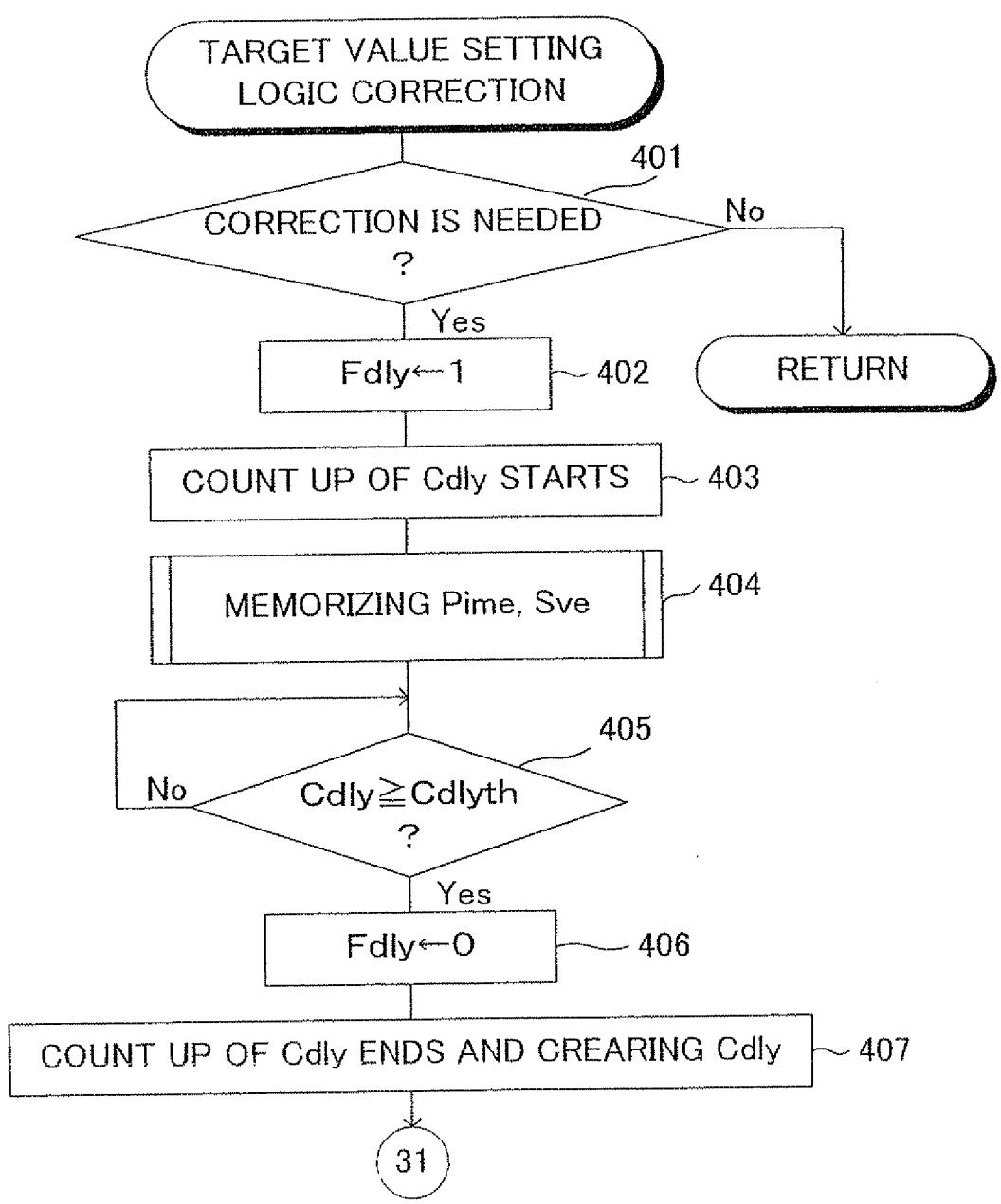

FIG. 20 shows a part of a routine for performing a correction of a target value setting logic of the fourth embodiment.

Figure 21:
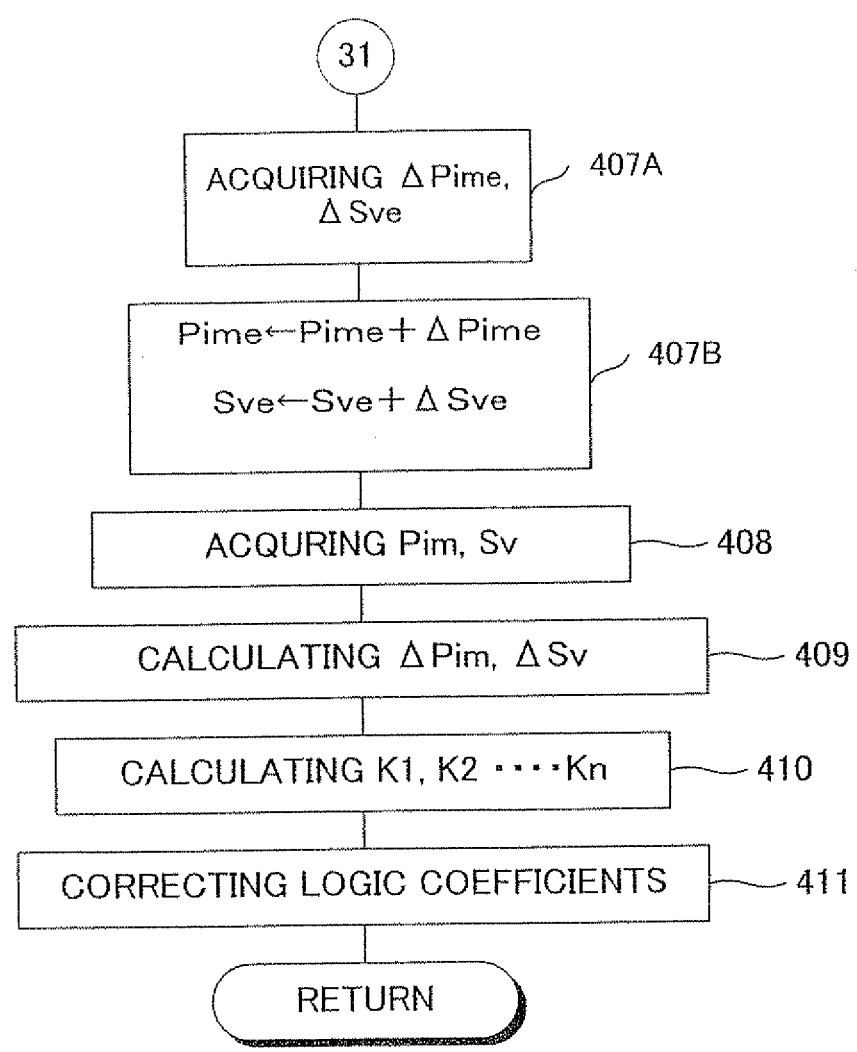

FIG. 21 shows a part of a routine for performing a correction of a target value setting logic of the fourth embodiment.

Figure 22:
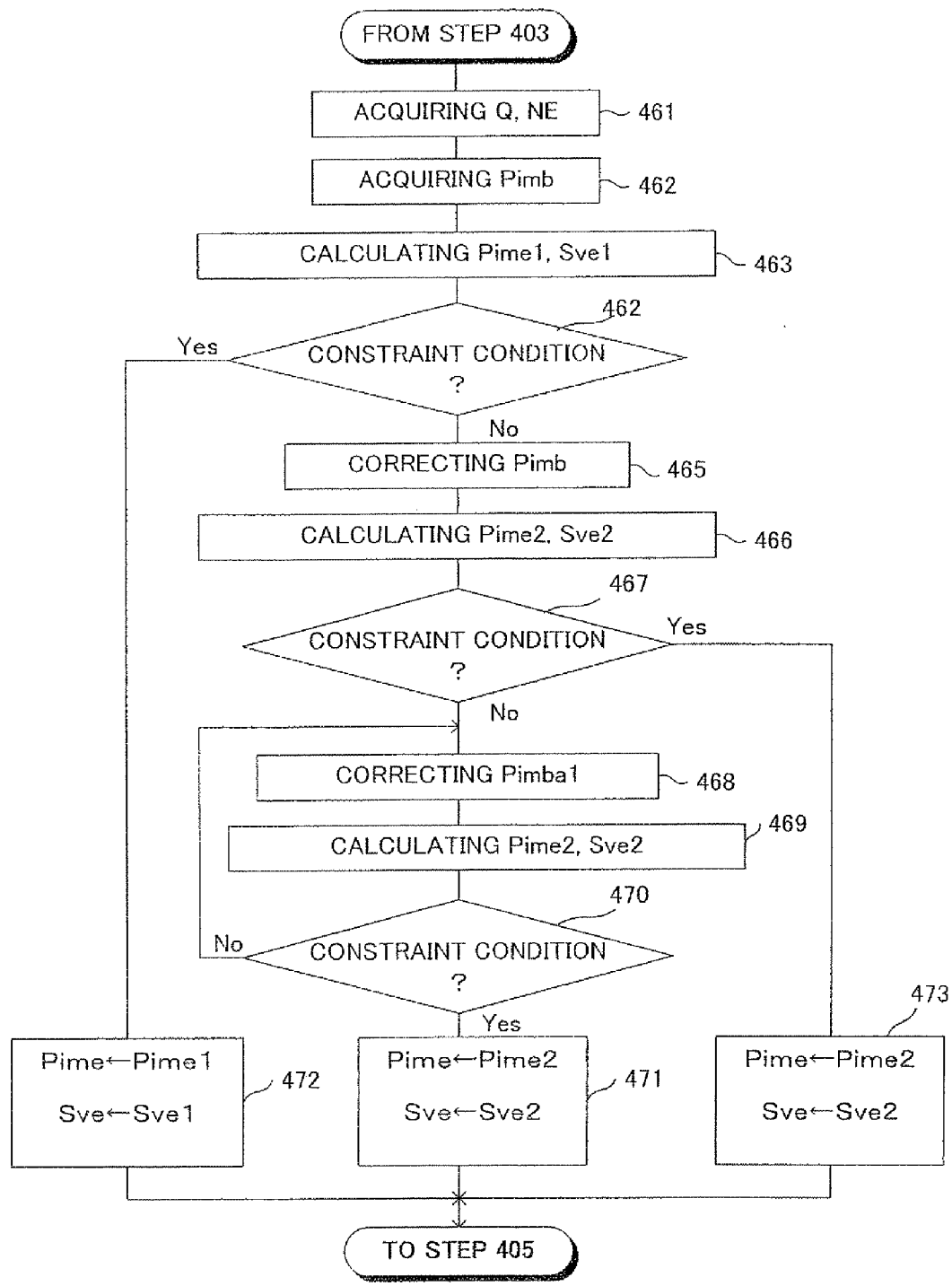

FIG. 22 shows a part of a routine for performing a correction of a target value setting logic of the fourth embodiment.

Figure 23:
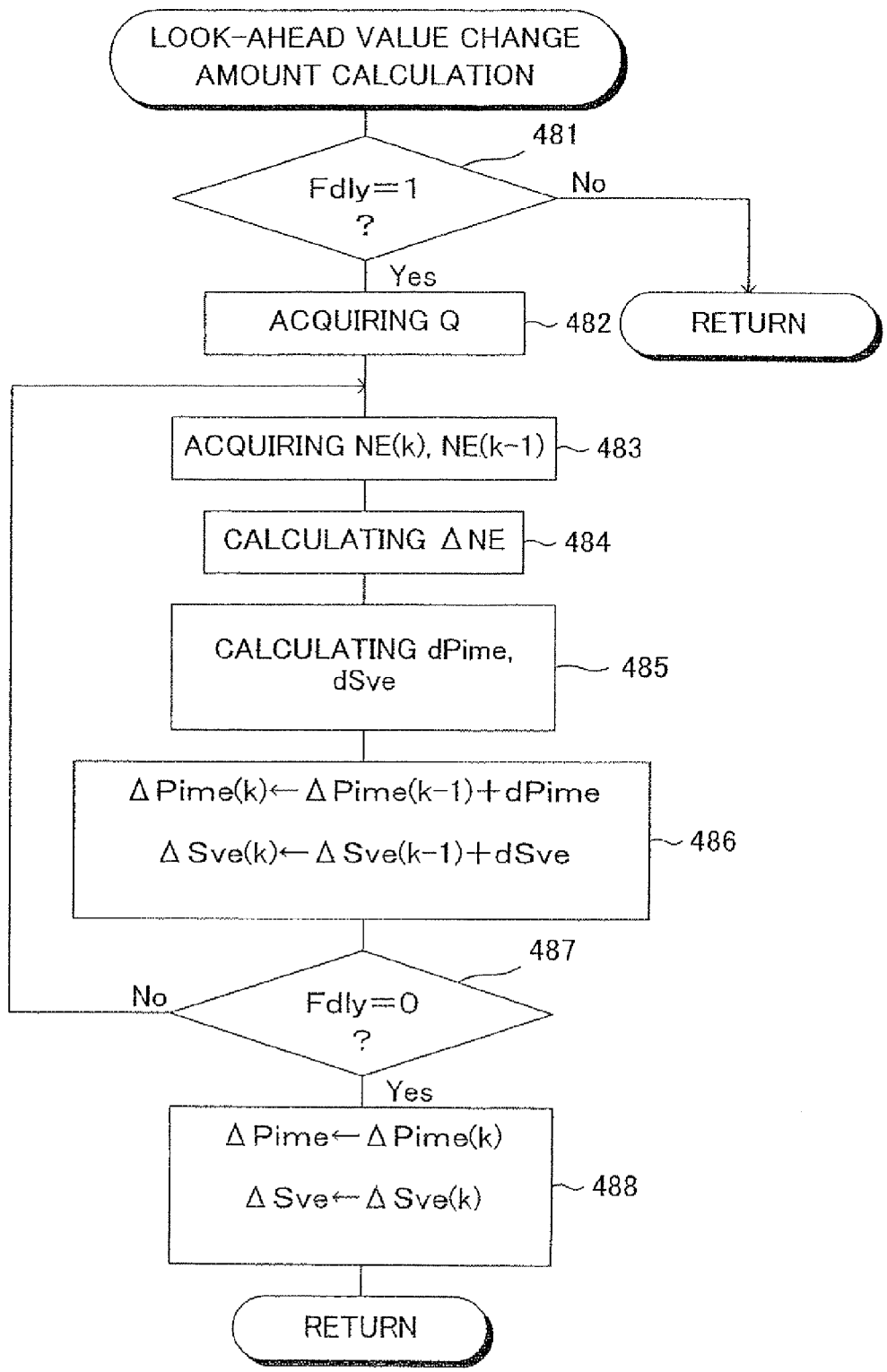

FIG. 23 shows an example of a routine for performing a calculation of a look-ahead change amount of the fourth embodiment.

Figure 24:
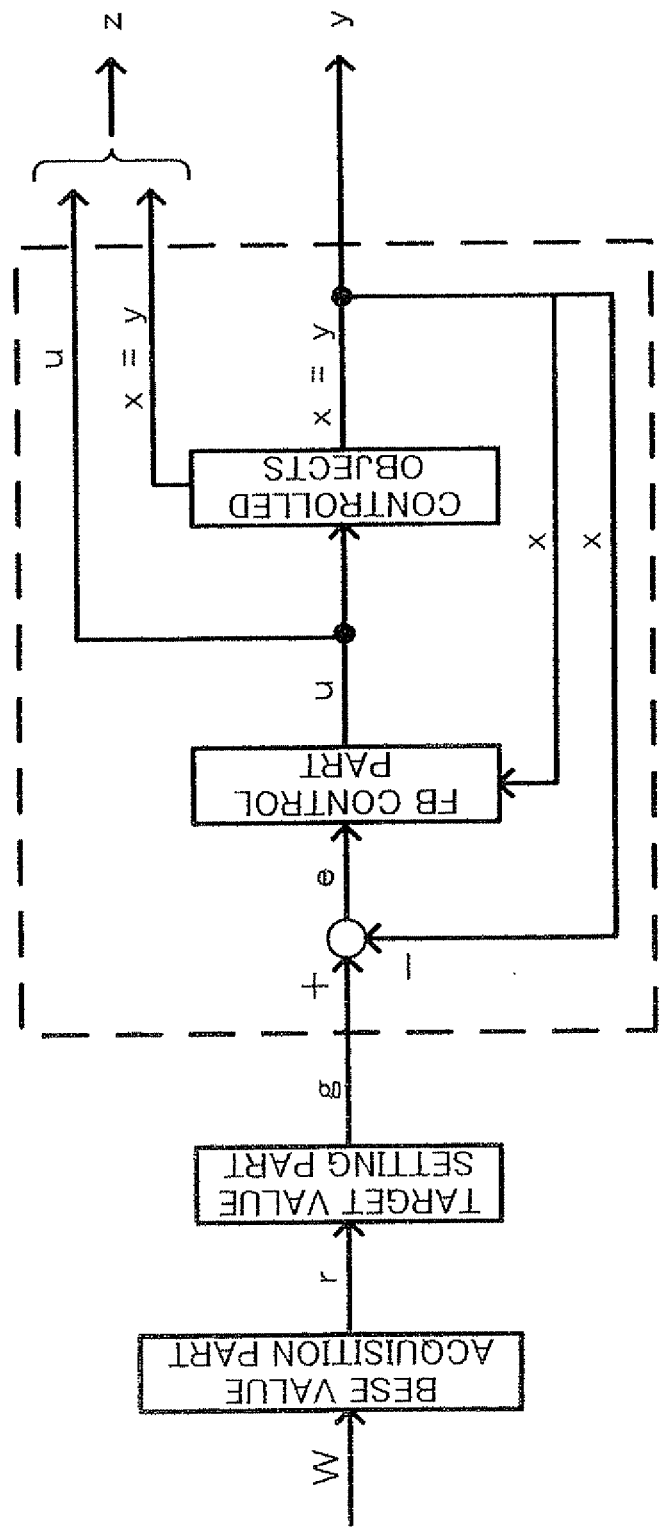

FIG. 24 shows a target value following control structure as the base of the specific target value setting logic of the first embodiment.

Figure 25:
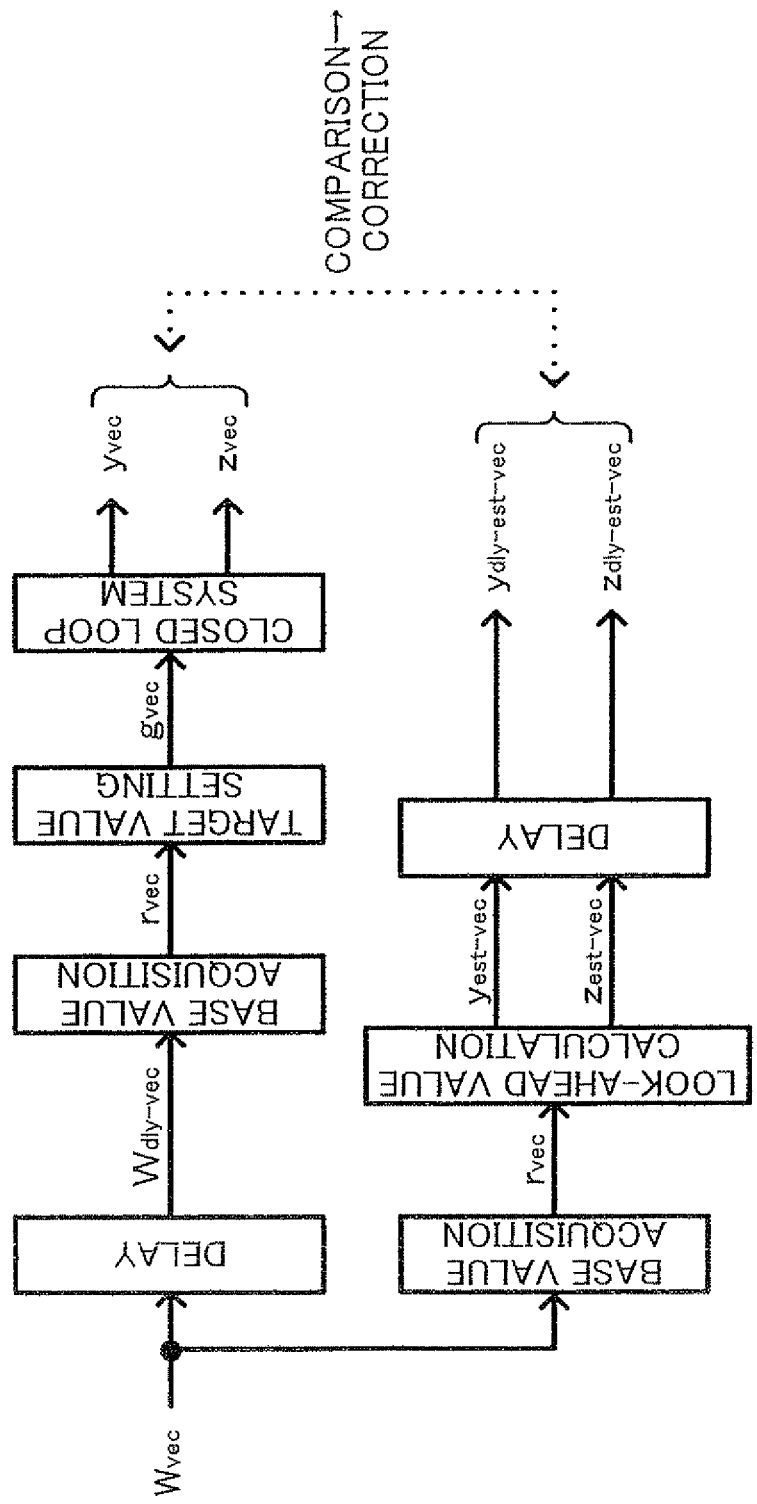

FIG. 25 shows a flow of a correction of a coefficient matrix of the target value setting logic of the first embodiment.

FIG. 26 shows a flow of a correction of a coefficient matrix of the target value setting logic of the third embodiment.

MODE FOR CARRYING OUT THE INVENTION

An embodiment of a control device of an internal combustion engine of the invention (hereinafter, this embodiment may be referred to as —first embodiment—) will be explained. In the following explanation, "engine operation" means —operation of the engine— and "engine speed" means —rotation speed of the engine—.

Figure 1:
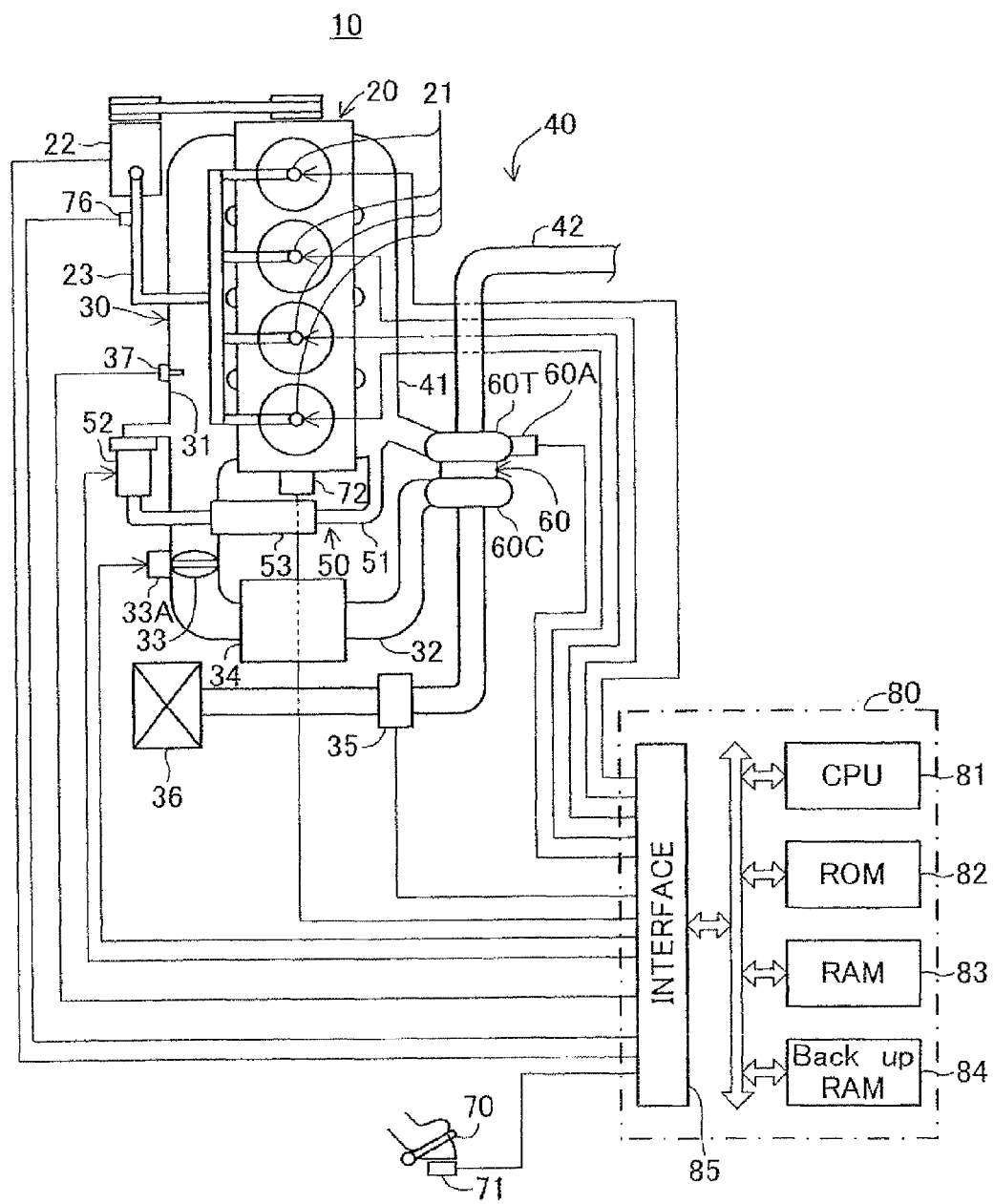
FIG. 1 shows an internal combustion engine which a control device of the invention is applied.

The engine which the control device of the first embodiment is applied is shown in FIG. 1. The engine of FIG. 1 is a compression self-ignition type internal combustion engine (i.e. so-called diesel engine 9.

In FIG. 1, 10 denotes the engine, 20 denotes a body of the engine 10, 21 denotes fuel injectors, 22 denotes a fuel pump, 23 denotes a fuel supply passage, 30 denotes an intake passage, 31 denotes an intake manifold, 32 denotes an intake pipe, 33 denote a throttle valve, 34 denotes an intercooler, 35 denotes an air flow meter, 36 denotes an air cleaner, 37 denotes a supercharging pressure sensor, 40 denotes an exhaust passage, 41 denotes an exhaust manifold, 42 denotes an exhaust pipe, 43 denotes an air-fuel ratio sensor, 50 denote an exhaust gas recirculation device (hereinafter, may be referred to as —EGR device—), 60 denotes a supercharger, 70 denotes an acceleration pedal, 71 denotes an acceleration pedal depression amount sensor, 72 denotes a crank position sensor 80 denotes an electronic control unit.

The intake passage 30 is constituted by the intake manifold and pipe 31 and 32. The exhaust passage 40 is constituted by the exhaust manifold and pipe 41 and 42.

The electronic control unit 80 includes a microcomputer. The unit 80 has a CPU (microprocessor) 81, a ROM (read only memory) 82, a RAM (random access memory) 83, a back-up RAM 84 and an interface 85. The CPU 81, the ROM 82, the RAM 83, the back-up RAM 84 and the interface 85 are connected to each other by a bidirectional bus.

The injectors 21 are arranged on the body 20 of the engine. The pump 22 is connected to the injectors 21 via the fuel supply passage 23. The pump 22 supplies a fuel of a high pressure to the injectors 21 via the passage 23. The injectors 23 are electrically connected to the interface 85 of the unit 80.

The unit 80 gives to the injectors 21 a command signal for making the injectors 21 inject the fuel. The pump 22 is electrically connected to the interface 85 of the unit 80. The unit 80 gives to the pump 22 a control signal for controlling an operation of the pump 22 such that a pressure of the fuel supplied from the pump 22 to the injectors 21 is maintained at a predetermined pressure.

The injectors 21 are arranged on the body 20 of the engine such that fuel injection holes thereof are exposed in the combustion chamber. Therefore, when the command signal is given from the unit 80 to the injectors 21, the injectors 21 injects the fuel directly into the combustion chamber.

The intake manifold 31 is divided into a plurality of pipes at its one end and these divided pipes are connected to intake ports (not shown) formed corresponding to the combustion chambers of the body 20 of the engine. The intake manifold 31 is connected to the intake pipe 32 at its other end.

The exhaust manifold 41 is divided into a plurality of pipes at its one end and the divided pipes are connected to exhaust ports (not shown) formed corresponding to the combustion chambers of the body 20 of the engine. The exhaust manifold 41 is connected to the exhaust pipe 42 at its other end.

The throttle valve 33 is arranged in the intake pipe 32. When an opening degree of the throttle valve 33 (hereinafter, this degree may be referred to as —throttle valve opening degree—) is changed, a flow area in the intake pipe 32 at the area where the throttle valve 33 is arranged changes. Thereby, an amount of an air passing through the throttle valve 33 and thus, an amount of the air suctioned into the combustion chamber.

An actuator 33A for changing an operation state of the throttle valve 33 (i.e. the throttle valve opening degree) is connected to the throttle valve 33 (hereinafter, this actuator may be referred to as —throttle valve actuator—). The actuator 33A is electrically connected to the interface 85 of the unit 80. The unit 80 gives to the actuator 33A a control signal for driving the actuator 33A to operate the throttle valve 33.

The intercooler 34 is arranged in the intake pipe 32 upstream of the throttle valve 33. The intercooler 34 cools the air which flows thereinto.

The air flow meter 35 is arranged in the intake pipe 32 upstream of the intercooler 34. The meter 35 is electrically connected to the interface 85 of the unit 80. The meter 35 outputs an output value corresponding to the amount of the air which passes therethrough. This output value is input to the unit 80. On the basis of this output value, the unit 80 calculates the amount of the air which passes through the meter 35 and thus, calculates the amount of the air suctioned into the combustion chamber.

The supercharging pressure sensor 37 is arranged on the intake passage 30 downstream of the throttle valve 33 (particularly, the intake manifold 31).

The sensor 37 is electrically connected to the interface 85 of the unit 80. The sensor 37 outputs an output value corresponding to a pressure of a gas surrounding the sensor (i.e a pressure of a gas in the intake manifold 31 and suctioned into the combustion chamber). On this output value, the unit 80 calculates the pressure of the gas surrounding the sensor 37, that is, the pressure of the gas suctioned into the combustion chamber (hereinafter, this pressure may be referred to as —supercharging pressure—).

The acceleration pedal depression amount sensor 71 is connected to the acceleration pedal 70. The sensor 71 is electrically connected to the interface 85 of the unit 80. The sensor 71 outputs an output value corresponding to the depression amount of the acceleration pedal 70. This output value is input to the unit 80. On the basis of this output value, the unit 80 calculates the depression amount of the pedal 70 and thus, a torque required for the engine.

The crank position sensor 72 is arranged near a crank shaft (not shown) of the engine. The sensor 72 is electrically connected to the interface 85 of the unit 80. The sensor 72 outputs an output value corresponding to a rotation phase of the crank shaft. This output value is input to the unit 80. On the basis of the engine speed, the unit 80 calculates the engine speed.

The supercharger 60 has a compressor 60C and an exhaust turbine 60T. The supercharger 60 can compress the gas suctioned into the combustion chamber to increase the pressure of the gas. The compressor 60C is arranged in the intake passage 30 (particularly, in the intake pipe 32) upstream of the intercooler 34. The turbine 60T is arranged in the exhaust passage 40 (particularly, in the exhaust pipe 42).

Figure 2:
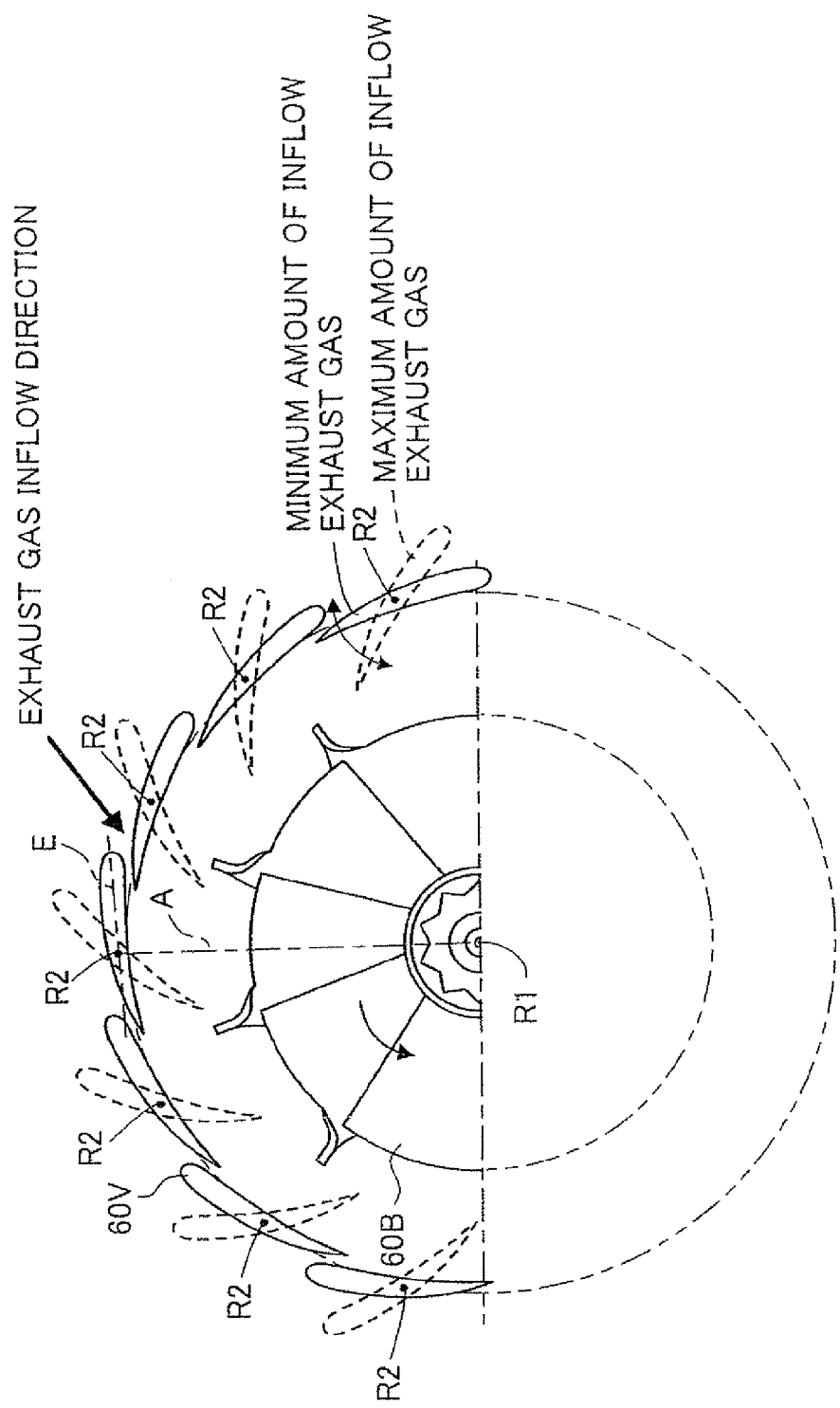
FIG. 2 shows an exhaust turbine of a supercharger of the engine shown in FIG. 1.

As shown in FIG. 2, the turbine 60T has an exhaust turbine body 60B and a plurality of wing-shaped vanes 60V.

The compressor 60 and the turbine 60T (particularly, the exhaust turbine body 60B) are connected to each other by a shaft (not shown) and when the turbine is rotated by the exhaust gas, the rotation of the turbine is transmitted to the compressor 60C via the shaft and thereby, the compressor 60C is rotated.

The rotated compressor 60C compresses the gas in the intake passage 30 downstream of the compressor to increase the pressure of the gas.

On the other hand, the vane 60V are positioned radially at a constant angular interval about a rotation center axis R1 of the exhaust turbine body to surround the exhaust turbine body 60B. Each vane 60V is positioned so as to rotate around a corresponding axis shown by symbol R2 in FIG. 2.

Referring to an extension direction of each vane 60V (i.e. the direction shown by symbol E in FIG. 2) as —extension direction— and referring to a line which connects the axis R1 of the turbine body 60B and the axis R2 of the vane 60V to each other (i.e. the line shown by symbol A in FIG. 2) as —base line—, each vane 60V rotates such that the angle between the extension direction E and the corresponding base line A is the same regarding all vanes 60V.

When each vane 60V rotates such that the angle between the extension direction E and the corresponding base line A decreases, that is, the flow area between the adjacent vanes 60V decreases, the pressure in the exhaust passage 40 upstream of the turbine body 60B (hereinafter, this pressure may be referred to as —exhaust pressure—) increases and thus, the flow rate of the exhaust gas supplied to the turbine body 60B increases.

Thus, the rotation speed of the turbine body 60B increases and thus, the rotation speed of the compressor 60C increases and thus, the gas flowing in the intake passage 30 is considerably compressed by the compressor 60C. Thus, as the angle between the extension direction E of each vane 60V and the corresponding base line (hereinafter, this angle may be referred to as —vane opening degree—) decreases, the degree of the compression of the gas flowing in the intake passage 30 by the compressor 30C increases (i.e. the supercharging pressure increases).

The EGR device 50 has an exhaust gas recirculation passage (hereinafter, this passage may be referred to as —EGR passage—) 51, an exhaust gas recirculation control valve (hereinafter, this valve may be referred to as —EGR control valve—) 52 and an exhaust gas recirculation cooler (hereinafter, this cooler may be referred to as —EGR cooler—) 53. The device 50 can introduce the exhaust gas, which is discharged from the combustion chamber to the exhaust passage 40, into the intake passage 30 via the EGR passage 51.

The passage 51 is connected to the exhaust passage 40 (particularly, the exhaust manifold 41) at its one end and is connected to the intake passage 30 (particularly, the intake manifold 31) at its other end. That is, the passage 51 connects the exhaust passage 40 to the intake passage 30.

The EGR control valve 52 is arranged in the EGR passage 51. When the opening degree of the valve 52 (hereinafter, this degree may be referred to as —EGR control valve opening degree—) changes, the amount of the exhaust gas passing through the valve 52 changes and thus, the amount of the exhaust gas introduced into the intake passage 30 changes. The valve 52 includes an actuator for changing its operation state (i.e. the EGR control valve opening degree) therein (hereinafter, this actuator may be referred to as —FOR control valve actuator—).

The EGR control valve actuator is electrically connected to the interface 85 of the unit 80. The unit 80 gives to the EGR control valve actuator a control signal for driving the EGR control valve actuator to operate the EGR control valve 52.

The control of the fuel injector of the first embodiment will be explained. In the following explanation, "fuel injection amount" means —an amount of the fuel injected from the fuel injector—.

In the first embodiment, the command signal for making the injector inject the fuel of the amount corresponding to the target value of the fuel injection amount set depending on the acceleration pedal depression amount (hereinafter, this target value may be referred to as —target fuel injection amount—) is calculated by the electronic control unit and then, is given from the unit to the injector and thereby, the injector is operated.

The target fuel injection amount of the first embodiment will be explained. According to the first embodiment, in the engine of FIG. 1, appropriate fuel injection amounts depending on the acceleration pedal depression amount are previously obtained by an experiment, etc.

Figure 3:
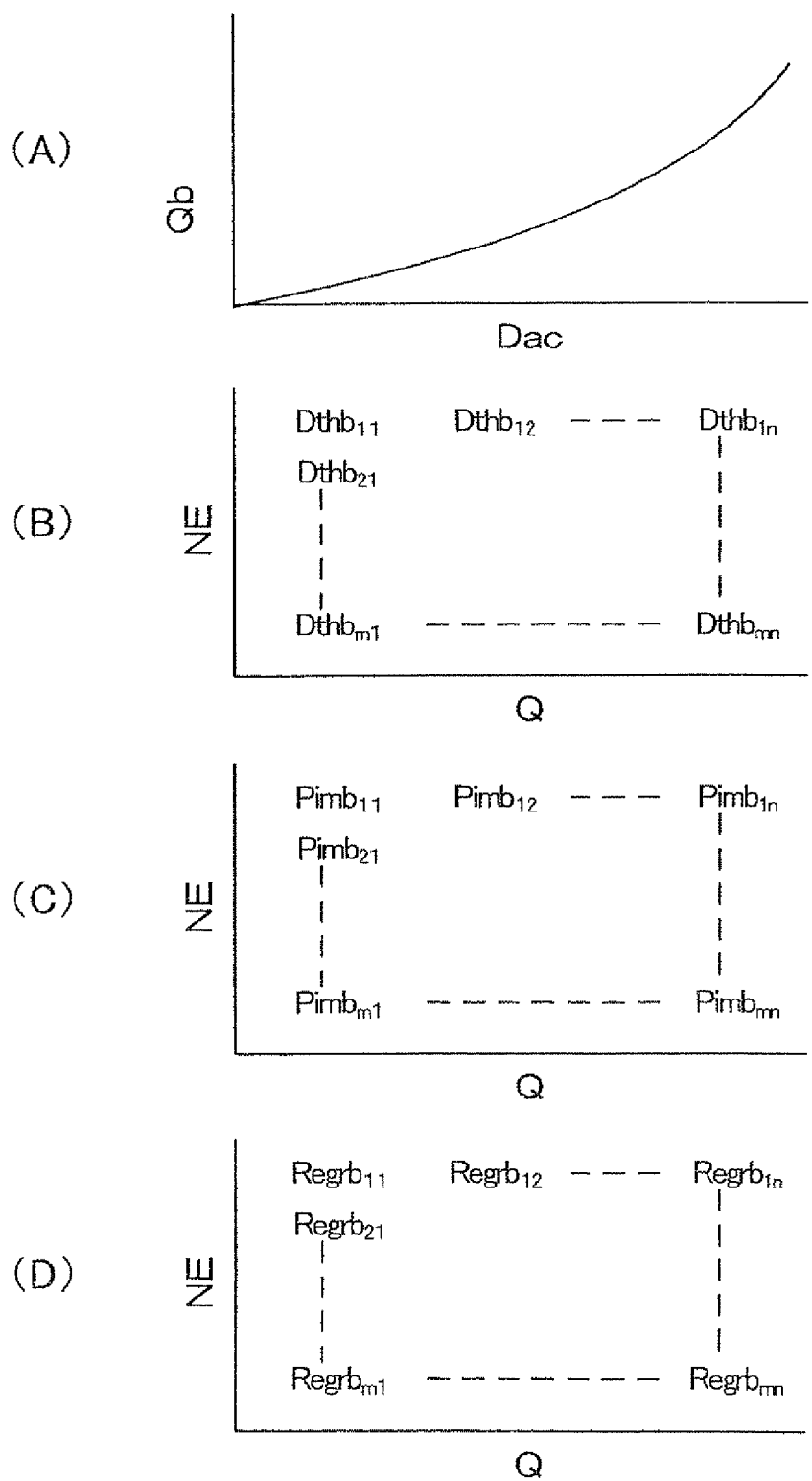
FIG. 3(A) shows a map used for acquiring a base fuel injection amount.
FIG. 3(B) shows a map used for acquiring a base throttle valve opening degree.
FIG. 3(C) shows a map used for acquiring a base supercharging pressure and FIG. 3(D) shows a map used for acquiring a base EGR rate.

These obtained amounts are memorized in the electronic control unit as base fuel injection amounts Qb in the form of a map as a function of the acceleration pedal depression amount Dac as shown in FIG. 3(A).

During the engine operation, the base fuel injection amount Qb corresponding to the current acceleration pedal depression amount Dac is acquired from the map of FIG. 3(A) and then, this acquired amount Qb is set as the target fuel injection amount. As shown in FIG. 3(A), the base fuel injection amount Qb increases as the acceleration pedal depression amount Dac increases.

The control of the throttle valve of the first embodiment will be explained. In the following explanation, "throttle valve opening degree" means —opening degree of the throttle valve—.

In the first embodiment, the control signal for driving the throttle valve actuator to drive the throttle valve is calculated by the electronic control unit to accomplish the throttle valve opening degree corresponding to the target value of the throttle valve opening degree set depending on the engine operation state (hereinafter, this target value may be referred to as —target throttle valve opening degree—) and then, is given from the electronic control unit to the throttle valve actuator to thereby operate the throttle valve.

The target throttle valve opening degree of the first embodiment will be explained. In the first embodiment, as the engine operation state used for the setting of the target throttle valve opening degree, the fuel injection amount and the engine speed are employed.

In the engine of FIG. 1, appropriate throttle valve opening degrees depending on the fuel injection amount and the engine speed are previously obtained by an experiment, etc.

These obtained throttle valve opening degrees are memorized in the electronic control unit as base throttle valve opening degrees Dthb in the form of a map as a function of the fuel injection amount Q and the engine speed N as shown in FIG. 3(B).

During the engine operation, the base throttle valve opening degree Dthb corresponding to the current fuel injection amount Q and the current engine speed N is acquired from the map of FIG. 3(B) and then, this acquired base degree Dthb is set as the target degree.

In the map of FIG. 3(B), as the fuel injection amount Q increases, the base degree Dthb increases and as the engine speed N increases, the base degree Dthb increases.

In the first embodiment, as the fuel injection amount used for acquiring the base degree from the map of FIG. 3(B), the fuel injection amount corresponding to the target fuel injection amount is employed.

The control of the vane of the first embodiment will be explained. In the first embodiment, the compressor of the supercharger can compress the gas flowing in the intake passage.

The pressure of the gas compressed by the compressor (hereinafter, this pressure may be referred to as —supercharging pressure—) can be controlled by controlling the rotation position of the vane of the exhaust turbine (i.e. the vane opening degree) and if the condition other than the vane opening degree is constant, as the vane opening degree decreases, the supercharging pressure increases and on the other hand, as the vane opening degree increases, the supercharging pressure decreases.

In the first embodiment, the vane is controlled to accomplish the target value of the supercharging pressure set depending on the engine operation state (hereinafter, this target value may be referred to as —target supercharging pressure— and the detail thereof will be explained later).

In detail, when the target supercharging pressure is set, a deviation of the actual supercharging pressure relative to the set target supercharging pressure (hereinafter, this deviation may be referred to as —supercharging pressure deviation—) is calculated and then, this deviation is converted according to a predetermined conversion rule (in other words, predetermined control rule) to produce a control signal.

This produced control signal is given to the vanes to make the vane actuator operate the vanes.

The predetermined conversion rule (hereinafter, this rule may be referred to as —supercharging pressure deviation conversion rule—) converts the supercharging pressure deviation to the control signal to make the vane actuator operate the vanes such that the supercharging pressure deviation decreases.

When the control signal produced by converting the supercharger pressure deviation by the supercharging pressure deviation conversion rule (hereinafter, this signal may be referred to as —vane control signal—) is given to the vane actuator, this actuator operates the vanes according to the vane control signal.

That is, the vane actuator inputs a manipulation amount depending on the vane control signal (hereinafter, this amount may be referred to as —vane manipulation amount—) to the vane.

When the supercharging pressure deviation is positive (i.e. when the actual supercharging pressure is lower than the target pressure), the vane actuator operates the vanes such that the vane opening degree decreases. Thereby, the actual supercharging pressure increases to approach the target pressure.

On the other hand, when the supercharging pressure deviation is negative (i.e. when the actual supercharging pressure is higher than the target pressure), the vane actuator operates the vanes such that the vane opening degree increases. Thereby, the actual supercharging pressure decreases to approach the target pressure.

It can be understood from the above explanation that the vane control of the first embodiment is a feedback control on the basis of the supercharging pressure deviation and in other words, is a closed-loop control on the basis of the supercharging pressure deviation.

The control of the EGR control valve of the first embodiment will be explained. In the first embodiment, the exhaust gas can be introduced into the intake passage (particularly, into the intake pipe) by the EGR device.

The amount of the EGR gas (hereinafter, this amount may be referred to as —EGR gas amount—) can be controlled by the control of the EGR control valve opening degree (i.e. the opening degree of the EGR control valve) and if the condition other than the EGR control valve opening degree is constant, as the EGR control valve opening degree increases, the EGR gas amount increases and on the other hand, as the EGR control valve opening degree decreases, the EGR gas amount decreases.

In the first embodiment, as a parameter representing the EGR gas amount, a rate of the EGR gas amount relative to the total gas amount suctioned into the combustion chamber (hereinafter, this rate may be referred to as —EGR rate—) is employed and the EGR control valve is controlled to accomplish a target value of the EGR rate set depending on the engine operation state (hereinafter, this target value may be referred to as —target EGR rate— and the detail thereof will be explained later).

In detail, when the target EGR rate is set, a deviation of the actual EGR rate (the detail of this rate will be explained later) relative to the set target EGR rate (hereinafter, this deviation may be referred to as —EGR rate deviation—) is calculated and then, this EGR rate deviation is converted according to a predetermined conversion rule (in other words, a predetermined control rule) to produce a control signal.

The produced control signal is given to the EGR control valve actuator to make this actuator operate the EGR control valve.

The aforementioned conversion rule (hereinafter, this rule may be referred to as —EGR rate deviation conversion rule—) converts the EGR rate deviation to the control signal for making the EGR control valve actuator operate the EGR control valve such that the EGR rate deviation decreases.

When the control signal produced by the conversion of the EGR rate deviation by the EGR rate deviation conversion rule (hereinafter, this signal may be referred to as —EGR control valve control signal—) is given to the EGR control valve actuator, this actuator operates the EGR control valve according to the EGR control valve control signal.

That is, the EGR control valve actuator inputs a manipulation amount depending on the EGR control valve control signal (hereinafter, this amount may be referred to as —EGR control valve manipulation amount—) to the EGR control valve.

When the EGR rate deviation is positive (i.e. when the actual EGR rate is smaller than the target rate), the EGR control valve actuator operates the EGR control valve such that the EGR control valve opening degree increases. Thereby, the actual EGR rate increases to approach the target EGR rate.

On the other hand, when the EGR rate deviation is negative (i.e. the actual EGR rate is larger than the target rate), the EGR control valve actuator operates the EGR control valve such that the EGR control valve opening degree decreases. Thereby, the actual EGR rate decreases to approach the target EGR rate.

It can be understood from the above explanation that the control of the EGR control valve of the first embodiment is a feedback control on the basis of the EGR rate deviation, in other words, is a closed-loop control on the basis of the EGR rate.

The target supercharging pressure of the first embodiment will be explained. In the first embodiment, as the engine operation state used for the setting of the target supercharging pressure, the engine speed and the fuel injection amount are employed.

In the engine of FIG. 1, appropriate supercharging pressures depending on the engine speed and the fuel injection amount are previously obtained by an experiment and these obtained supercharging pressures are memorized in the electronic control unit as base supercharging pressures Pimb in the form of a map as a function of the engine speed NE and the fuel injection amount Q as shown in FIG. 3(C).

During the engine operation, the base supercharging pressure Pimb corresponding to the current engine speed NE and the current fuel injection amount Q is acquired from the map of FIG. 3(C).

The acquired base supercharging pressure Pimb is corrected by a predetermined process (the detail of this process will be explained later) and then, this corrected base supercharging pressure is set as the target supercharging pressure.

In the first embodiment, as the fuel injection amount used for acquiring the base supercharging pressure from the map of FIG. (3), the fuel injection amount corresponding to the target fuel injection amount is employed.

The target EGR rate of the first embodiment will be explained.

In the first embodiment, as the engine operation state used for the setting of the target EGR rate, the engine speed and the fuel injection amount are employed.

In the engine of the FIG. 1, appropriate EGR rates depending on the engine speed and the fuel injection amount are previously obtained by an experiment, etc. and these obtained EGR rates are memorized in the electronic control unit as base EGR rates Regrb in the form of a map as a function of the engine speed NE and the fuel injection amount Q as shown in FIG. 3(D).

During the engine operation, the base EGR rate Regrb corresponding to the current engine speed NE and the current fuel injection amount Q is acquired from the map of FIG. 3(D). This acquired base EGR rate Regrb is corrected by a predetermined process (the detail of this process will be explained later) and this corrected base EGR rate is set as the target EGR rate.

In the first embodiment, as the fuel injection amount used for acquiring the base EGR rate from the map of FIG. 3(D), the fuel injection amount corresponding to the target fuel injection amount is employed.

The calculation of the EGR rate of the first embodiment will be explained. In the first embodiment, the actual EGR rate Regr is calculated according to the following formula 1.

In the formula 1, "Gc" is —total amount of the gas suctioned into the combustion chamber at one intake stroke— and "Ga" is —amount of the air supplied to the combustion chamber at one intake stroke—.

The total amount of the gas suctioned into the combustion chamber at one intake stroke can be calculated, for example, from parameters such as the engine speed, the intake pressure, etc. and the amount of the air suctioned into the combustion chamber at one intake stroke can be calculated, for example, from the amount of the air detected by the air flow meter.

$$Regr = (Gc - Ga)/Gc \quad (1)$$

The aforementioned predetermined processes relating to the base supercharging pressure and the base EGR rate of the first embodiment will be explained.

As the setting of the target supercharging pressure, there is a concept of setting the base supercharging pressure itself acquired from the map of FIG. 3(C) as the target supercharging pressure and then, controlling the vanes according to this set target supercharging pressure.

However, when the base supercharging pressure itself acquired form the map of FIG. 3(C) is used for the control of the vanes as the target supercharging pressure, several problems occurs.

For example, when the actual supercharging pressure is lower than the target pressure, the vane control signal for decreasing the vane opening degree is produced depending on the supercharging pressure deviation (i.e. the deviation of the actual supercharging pressure relative to the target pressure).

This produced signal is given to the vane actuator and then, according to this given signal, the vane actuator operates the vanes.

In this regard, depending on the engine operation state including the EGR rate, etc., during the control of the supercharging pressure to the target pressure, the supercharging pressure may exceed the target pressure considerably.

Particularly, when the actual supercharging pressure is considerably lower than the target pressure, the vane actuator operates the vane to a large extent and therefore, the possibility that the supercharging pressure exceeds the target pressure considerably increases.

However, the fact that the supercharging pressure exceeds the target pressure considerably should be avoided.

That is, even when the supercharging pressure exceeds the target pressure under the condition that the supercharging pressure is controlled to the target pressure, the supercharging pressure should be limited such that the degree of the supercharging pressure exceeding the target pressure is restricted within a permitted range.

Further, in order to avoid a misfire in the combustion chamber, for example, an oxygen concentration of the gas suctioned into the combustion chamber should be maintained at a concentration larger than a certain concentration or more.

The oxygen concentration of the gas suctioned into the combustion chamber changes depending on the EGR rate and the EGR rate changes depending on the supercharging pressure.

Therefore, when the supercharging pressure is controlled at the target pressure, the supercharging pressure should be limited such that the oxygen concentration of the gas suctioned into the combustion chamber is maintained at a concentration larger than the certain concentration or more.

As explained above, a constrain relating to the supercharging pressure is imposed on the supercharging pressure control.

Further, the range of the vane operation (i.e the range of the vane rotation) has a limit in terms of its structure. Thus, when the vane operation state reaches to the limit of the vane operation range while the vane actuator operates the vane such that the vane opening degree decreases, the actuator cannot operate the vane any more.

Nevertheless, if the actuator operates the vane, the deterioration of the vane may occur.

Further, in order to surely avoid the vane deterioration, the vane operation should be limited to within a range narrower than the vane operation range.

That is, when the supercharging pressure is controlled to the target pressure, the vane operation should be limited to within a permitted range determined from various points of view.

As explained above, a constraint relating to the vane operation state is imposed on the supercharging pressure control.

Further, the operation range of the vane actuator has a limit in terms of its structure. Thus, if the vane actuator reaches to the limit of its operation range, the actuator cannot operate the vane any more.

Nevertheless, if the actuator operates the vane, the deterioration of the vane actuator may occur.

Further, in order to surely avoid the vane actuator malfunction, the vane actuator operation should be limited to within a range narrower than the vane actuator operation range.

That is, when the supercharging pressure is controlled to the target pressure, the vane actuator operation should be limited to within a permitted range determined from various points of view.

As explained above, a constraint relating to the vane actuator operation state is imposed on the supercharger pressure control.

Further, as the vane manipulation amount (i.e. the manipulation amount input to the vanes from the vane actuator), there is an appropriate manipulation amount in terms of the properties of the vane actuator and the vane.

That is, when the supercharging pressure is controlled to the target pressure, the vane manipulation amount should be limited to within a permitted range determined from various points of view.

As explained above, a constraint relating to the vane manipulation amount is imposed on the supercharging pressure control.

The above-explained matter is equally applied to the case that the vane actuator operates the vane when the actual supercharging pressure higher than the target pressure is controlled to the target pressure.

As explained above, the supercharging-pressure-related constraint for limiting the supercharging pressure to a permitted range, the vane-operation-state-related constraint for limiting the vane operation to a permitted range, the vane-actuator-operation-state-related constraint for limiting the vane actuator operation to a permitted range and the vane-manipulation-amount-related constraint for limiting the vane manipulation amount to a permitted range are imposed on the supercharging pressure control.

Therefore, in the case that the base supercharging pressure itself acquired from the map of FIG. 3(C) is used for the control of the supercharging pressure as the target pressure, when it is predicted that the aforementioned constraints are not satisfied, the base supercharging pressure should be corrected to satisfy the constraints, this corrected base supercharging pressure should be set as the target supercharging pressure and this set target pressure should be used for the control of the supercharging pressure.

This matter is equally applied to the EGR rate control. That is, regarding the setting of the target EGR rate, there is a concept of setting the base EGR rate itself acquired from the map of FIG. 3(D) as the target EGR rate and then, controlling the EGR control valve according to this set target EGR rate.

However, if the base EGR rate itself acquired from the map of FIG. 3(D) is used for the control of the EGR control valve as the target EGR rate, several problems occurs.

For example, when the actual EGR rate is smaller than the target rate, an EGR control valve control signal for increasing the EGR control valve opening degree depending on the EGR rate deviation (i.e. the deviation of the actual EGR rate relative to the target rate) is produced.

This produced signal is given to the EGR control valve actuator and then, according to this given signal, the EGR control valve actuator operates the EGR control valve.

In this regards, depending on the engine operation state including the supercharging pressure, etc., during the control of the EGR rate to the target rate, EGR rate may exceed the target rate considerably.

Particularly, when the actual EGR rate is considerably smaller than the target rate, the EGR control valve actuator operates the EGR control valve to a large extent and therefore, the possibility that the EGR rate exceeds the target rate considerably increases.

However, the matter that the EGR rate exceeds the target rate considerably should be avoided.

That is, even if the EGR rate exceeds the target rate in the case that the EGR rate is controlled to the target rate, the EGR rate should be limited such that the degree of the EGR rate exceeding the target rate is restricted within a permitted range.

In order to avoid a misfire in the combustion chamber, for example, the oxygen concentration of the gas suctioned into the combustion chamber should be maintained larger than a certain concentration or more.

The oxygen concentration of the gas suctioned into the combustion chamber changes depending on the EGR rate.

Therefore, when the EGR rate is controlled to the target rate, the EGR rate should be limited such that the oxygen concentration of the gas suctioned into the combustion chamber is maintained larger than the certain concentration.

As explained above, a constraint relating to the EGR rate is imposed on the EGR rate control.

Further, the operation range of the EGR control valve has a limit in terms of its structure. Thus, when the EGR control valve actuator operates the EGR control valve to increase the EGR control valve opening degree and then, the operation state of the EGR control valve reaches to the limit of its operation range, the actuator cannot operate the EGR control valve any more.

Nevertheless, if the actuator operates the EGR control valve, the deterioration of the EGR control valve may occur.

Further, in order to surely avoid the deterioration of the EGR control valve, the EGR control valve operation should be limited to a range narrower than its operation range.

That is, when the EGR rate is controlled to the target rate, the EGR control valve operation should be limited to a permitted range determined from various points of view.

As explained above, a constraint relating to the operation state of the EGR control valve is imposed on the EGR rate control.

Further, the operation range of the EGR control valve actuator has a limit in terms of its structure. Thus, when the EGR control valve actuator operates the EGR control valve to increase the EGR control valve opening degree and then, reaches to the limit of its operation range, the actuator cannot operate the EGR control valve any more.

Nevertheless, if the actuator operates the EGR control valve, the deterioration of the actuator may occur.

In order to surely avoid the malfunction of the actuator, the actuator operation should be limited to a range narrower than the actuator operation range.

That is, when the EGR rate is controlled to the target rate, the actuator operation should be limited to a permitted range determined from various points of view.

As explained above, a constraint relating to the EGR control valve actuator operation state is imposed on the EGR rate control.

Further, as the EGR control valve manipulation amount (i.e. the manipulation amount input to the EGR control valve from the EGR control valve actuator), there is an appropriate amount in consideration of the properties of the EGR control valve actuator and the EGR control valve.

That is, when the EGR rate is controlled to the target rate, the EGR control valve manipulation amount should be limited to a permitted range determined from various points of view.

As explained above, a constraint relating to the EGR control valve manipulation amount is imposed on the EGR rate control.

The above-explained matter is equally applied to the case that the EGR control valve actuator operates the EGR control valve to control the EGR rate to the target rate when the actual EGR rate is larger than the target rate.

As explained above, the EGR-rate-related constraint for limiting the EGR rate to the permitted range, the EGR-control-valve-operation-state related constraint for limiting the EGR control valve operation to the permitted range, the EGR-control-valve-actuator-operation-state related constraint for limiting the EGR control valve actuator operation to the permitted range and the EGR-control-valve-manipulation-amount-related constraint for limiting the EGR control valve manipulation amount to the permitted range are imposed on the EGR rate control.

Therefore, in the case that the base EGR rate itself acquired from the map of FIG. 3(D) is used for the control of the EGR rate control as the target EGR rate, when it is predicted that the aforementioned constraints are not satisfied, the base EGR rate should be corrected to satisfy the constraints, this corrected base EGR rate should be set as the target EGR rate and this set target EGR rate should be used for the control of the EGR rate.

Further, even when the EGR control valve opening degree is constant, if the vane opening degree changes, the supercharging pressure changes. Therefore, in this case, at least, the EGR gas amount changes and thus, the EGR rate changes. That is, the supercharging pressure control influences the EGR rate.

On the other hand, even when the vane opening degree is constant, if the EGR control valve opening degree changes, the EGR gas amount changes. Therefore, in this case, the pressure in the intake branch pipe changes and thus, the supercharging pressure changes. That is, the EGR rate control influences the supercharging pressure.

As explained above, the supercharging pressure and EGR rate controls interfere each other.

Therefore, when the supercharging pressure is controlled to the target pressure, the pressure should be controlled under the condition where the EGR-rate-related, EGR-control-valve-operation-state-related, EGR-control-valve-actuator-operation-state-related and EGR-control-valve-manipulation-amount-related constraint conditions are satisfied.

On the other hand, when the EGR rate is controlled to the target rate, the EGR rate should be controlled under the condition where the supercharging-pressure-related, vane-operation-state-related, vane-actuator-operation-state-related and vane-manipulation-amount-related constraints are satisfied.

That is, when the supercharging pressure and EGR rate controls are performed, the supercharging pressure and EGR rate should be controlled under the condition where the all constraints are satisfied.

In the first embodiment, the base supercharing pressure acquired from the map of FIG. 3(C) and the base EGR rate acquired from the map of FIG. 3(D) are corrected such that the supercharging-pressure-related, vane-operation-state-related, vane-actuator-operation-state-related, vane-manipulation-amount-related, EGR-rate-related, EGR-control-valve-operation-state-related, EGR-control-valve-actuator-operation-state-related and EGR-control-valve-manipulation-amount-related constraints are satisfied, then these corrected base supercharging pressure and base EGR rate are set as the target supercharging pressure and the target EGR rate, respectively, and then these set target supercharging pressure and target EGR rate are used for the controls of the supercharging pressure and the EGR rate, respectively.

The setting of the target supercharging pressure and the target EGR rate according to the first embodiment will be concretely explained.

The vane control signal is input to the vane actuator and therefore, hereinafter, may be referred to as vane control input. The vane actuator operation state is the state of the vane actuator depending on the vane control signal and therefore, this signal represents this state. Hereinafter, the vane control input represents the vane actuator operation state.

The vane manipulation amount is the manipulation amount derived depending on the vane control signal and therefore, this signal represents this amount. Hereinafter, the vane control input represents the vane manipulation amount.

The vane operation state is the state of the vane depending on the vane manipulation amount and therefore, this signal represents this state. Hereinafter, the vane control input represents the vane operation state.

The EGR control valve control signal is input to the EGR control valve actuator and therefore, hereinafter, may be referred to as EGR control valve control input.

The EGR control actuator operation state is the state of the EGR control valve actuator depending on the EGR control valve control signal and therefore, this signal represents this state. Hereinafter, the EGR control valve control input represents the EGR control valve actuator operation state.

The EGR control valve manipulation amount is the manipulation amount derived depending on the EGR control valve control signal and therefore, this signal represents this amount. Hereinafter, the EGR control valve control input represents the EGR control valve manipulation amount.

The EGR control valve operation state is the state of the EGR control valve depending on the EGR control valve manipulation amount and therefore, this signal represents this state. Hereinafter, the EGR control valve control input represents the EGR control valve operation state.

The supercharging pressure occurs as a result of the gas compression by the supercharger and therefore, referring to the vane control signal as vane control input, the supercharging pressure can be referred to as controlled output of the supercharger.

The EGR rate occurs as a result of the introduction of the exhaust gas into the intake passage by the EGR device and therefore, referring to the EGR control valve control signal as EGR control valve control input, the EGR rate can be referred to as controlled output of the EGR device.

In the first embodiment, the base supercharging pressure Pimb depending on the engine speed NE and the fuel injection amount Q from the map of FIG. 3(C) and the base EGR rate Regrb depending on the engine speed NE and the fuel injection amount Q from the map of FIG. 3(D) are acquired.

Then, these base supercharging pressure and EGR rate are set as target supercharging pressure and EGR rate, respectively and then, the supercharging pressure, the vane control input, the EGR rate and the EGR control valve control input in the case that the vane and the EGR control valve are controlled according to these target supercharging pressure and EGR rate are predicted.

That is, the predicted supercharging pressure, vane control input, EGR rate and EGR control valve control input after a predetermined time period in the case that the base supercharging pressure and EGR rate are set as the target supercharging pressure and EGR rate, respectively are calculated.

The aforementioned time period may be a predetermined constant time period or may be appropriately set depending on the engine operation state.

Then, it is judged if these calculated predicted charging pressure (hereinafter, this pressure may be referred to as —primary predicted supercharging pressure—), vane control input (hereinafter, this input may be referred to as —primary predicted vane control input—), EGR rate (hereinafter, this rate may be referred to as —primary predicted EGR rate—) and EGR control valve control input (hereinafter, this input may be referred to as —primary predicted EGR control valve control input—) satisfy the supercharging-pressure-related, vane-control-input-related, EGR-rate-related and EGR-control-valve-control-input-related constraints, respectively.

That is, it is judged if the constraint condition where the primary predicted supercharging pressure is within a permitted range (hereinafter, this condition may be referred to as —supercharging pressure constraint condition—), the constraint condition where the primary predicted vane control input is within a permitted range (hereinafter, this condition may be referred to as —vane control input constraint condition—), the constraint condition where the primary predicted EGR rate is within a permitted range (hereinafter, this condition may be referred to as —EGR rate constraint condition—) and the constraint condition where the primary predicted EGR control valve control input is within a permitted range (hereinafter, this condition may be referred to as —EGR control valve control input constraint condition) are satisfied.

When the constraint conditions are satisfied, the base supercharging pressure itself acquired from the map of FIG. 3(C) and the base EGR rate itself acquired from the map of FIG. 3(D) are set as the target supercharging pressure for the supercharging pressure control and the target EGR rate for the EGR rate control, respectively.

On the other hand, when the constraint condition are not satisfied, the base supercharging pressure acquired from the map of FIG. 3(C) and the base EGR rate acquired from the map of FIG. 3(D) are corrected according to a predetermined rule.

Then, these corrected base supercharging pressure (hereinafter, this pressure may be referred to as —primary corrected base supercharging pressure—) and base EGR rate (hereinafter, this rate may be referred to as —primary corrected base EGR rate—) are set as the target supercharging pressure and EGR rate, respectively and then, the supercharging pressure, the vane control input, the EGR rate and the EGR control valve control input in the case that the vane and the EGR control valve are controlled according to these target supercharging pressure and EGR rate are predicted.

That is, the predicted supercharging pressure, vane control input, EGR rate and EGR control valve control input after a predetermined time period in the case that the primary corrected base supercharging pressure and EGR rate are set as the target supercharging pressure and EGR rate, respectively are calculated.

Then, it is judged if these calculated predicted supercharging pressure (hereinafter, this pressure may be referred to as —secondary predicted supercharging pressure—), vane control input (hereinafter, this input may be referred to as —secondary predicted vane control input—), EGR rate (hereinafter, this rate may be referred to as —secondary predicted EGR rate—) and EGR control valve control input (hereinafter, this input may be referred to as —secondary predicted EGR control valve control input—) satisfies the supercharging pressure, vane control input, EGR rate and EGR control valve control input constraint conditions, respectively.

When these constraint conditions are satisfied, the primary corrected base supercharging pressure and EGR rate are set as the target supercharging pressure for the supercharging pressure control and the target EGR rate for the EGR rate control, respectively.

On the other hand, when these constraint conditions are not satisfied, the primary corrected base supercharging pressure and EGR rate are corrected again according to the predetermined rule.

Then, using these corrected primary corrected base supercharging pressure and EGR rate as new primary corrected base supercharging pressure and EGR rate, respectively, these new primary corrected base supercharging pressure and EGR rate are set as the target supercharging pressure and EGR rate, respectively and the supercharging pressure, the vane control input, the EGR rate and the EGR control valve control input in the case that the vane and the EGR control valve are controlled according to the target supercharging pressure and EGR rate are predicted.

That is, the predicted supercharging pressure, vane control input, EGR rate and EGR control valve control input after the predetermined time period in the case that the new primary corrected base supercharging pressure and EGR rate are set as the target supercharging pressure and EGR rate, respectively are calculated as new secondary predicted supercharging pressure, vane control input, EGR rate and EGR control valve control input, respectively.

Then, until it is judged that the calculated new secondary predicted supercharging pressure, vane control input, EGR rate and EGR control valve control input satisfy the supercharging pressure, vane control input, EGR rate and EGR control valve control input constraint conditions, respectively, the aforementioned calculation of the new primary corrected base supercharging pressure and EGR rate and the aforementioned calculation of the new secondary predicted supercharging pressure, vane control input, EGR rate and EGR control valve control input are performed repeatedly.

According to the first embodiment, the supercharging and the EGR rate are controlled under the condition where the supercharging pressure, vane control input, EGR rate and EGR control valve control input constraint conditions are satisfied.

Thus, the target supercharging pressure and EGR rate suitable for the controls of the supercharging pressure and the EGR rate, the determinations of the vane control signal and the EGR control valve control signal, and the controls of the vane actuator and EGR control valve actuator operations, the determinations of the vane and EGR control valve manipulation amounts and the controls of the vane and EGR control valve operations are set.

Further, according to the first embodiment, the supercharging pressure and the EGR rate are controlled such that the vane-manipulation-amount-related and EGR-control-valve-manipulation-amount-related constraint conditions are satisfied and therefore, an untiwindup effect can be obtained.

Thus, during the control of the supercharging pressure and the EGR rate to the target pressure and rate, respectively (i.e. during the transient state), the control responsiveness of the supercharging pressure and the EGR rate is improved.

Further, according to the first embodiment, the supercharging pressure and the EGR rate are controlled under the condition where the vane-related, EGR-control-valve-related, vane-actuator-related and EGR-control-valve-actuator-related constraint conditions are satisfied. Thus, the control stability and robustness of the supercharging and the EGR rate are high.

Further, according to the first embodiment, the supercharging pressure and the EGR rate are controlled under the condition where all of the aforementioned constraint conditions are satisfied.

Therefore, during the control of the supercharging pressure and the EGR rate to the target pressure and rate, respectively, an impermissible change of the supercharging pressure beyond or below the target pressure and an impermissible change of the EGR rate beyond or below the target rate are restricted and the deteriorations of the vane, the vane actuator, the EGR control valve and the EGR control valve actuator are restricted.

In the first embodiment, the supercharging pressure constraint condition is the condition where the supercharging pressure is within the permissible range and the vane control input constraint condition is the condition where the vane control input is within the permissible range.

In this regards, in consideration of the controls of the supercharging pressure, the EGR rate, the vane operation and the EGR control valve operation, the determinations of the vane control signal, the EGR control valve control signal, the vane manipulation amount and the EGR control valve manipulation amount and the controls of the vane actuator operation and the EGR control valve actuator operation (hereinafter, these controls and determinations may be referred to as —various controls and determinations—), when the constraint condition other than the aforementioned supercharging pressure constraint condition should be imposed on the supercharging pressure, this condition may be employed in addition to or in place of the aforementioned supercharging pressure constraint condition or when the constraint condition other than the aforementioned vane control input constraint condition should be imposed on the vane control input, this condition may be employed in addition to or in place of the aforementioned vane control input constraint condition.

Similarly, in the first embodiment, the EGR rate constraint condition is the condition where the EGR rate is within the permissible range and the EGR control valve control input constraint condition is the condition where the EGR control valve control input is within the permissible range.

In this regards, in consideration of the various controls and determinations, when the constraint condition other than the aforementioned EGR rate constraint condition should be imposed on the EGR rate, this condition may be employed in addition to or in place of the aforementioned EGR rate constraint condition or when the constraint condition other than the aforementioned EGR control valve control input constraint condition should be imposed on the EGR control valve control input, this condition may be employed in addition to or in place of the aforementioned EGR control valve control input constraint condition.

Further, in the first embodiment, the constraint conditions are the supercharging-pressure-related, vane-control-input-related, EGR-rate-related and EGR-control-valve-control-input-related constraint conditions.

In this regard, when the constraint condition other than the aforementioned constraint conditions should be imposed, this condition may be employed in addition to or in place of the aforementioned constraint conditions.

If any of the aforementioned constraint conditions is not needed to be considered for the setting of the target supercharging pressure and EGR rate, this condition may not be considered for the setting of the target supercharging pressure and EGR rate.

Further, in the control device of the aforementioned embodiment, the target supercharging pressure and EGR rate used for the controls of the supercharging pressure and the EGR rate may be ones which satisfies all of the aforementioned constraint conditions when the actual supercharging pressure and EGR rate are controlled on the basis of the target supercharging pressure and EGR rate.

In this regards, the base supercharging pressure and EGR rate acquired from the maps of FIGS. 3(C) and 3(D), respectively are obtained as values suitable for the engine operation state and therefore, the state that the target supercharging pressure and EGR rate used for the supercharging pressure and EGR rate controls are considerably different from the base supercharging pressure and EGR rate is not preferred for the engine operation state since the large change of the output torque (i.e the torque shock) or the decrease of the drivability may occur.

Therefore, from this point of view, in the first embodiment, when there are a plurality of the target supercharging pressure and EGR rate which satisfies all of the aforementioned constraint conditions, it is preferred that the target supercharging pressure and EGR rate nearest the base supercharging pressure and EGR rate among the aforementioned constraint conditions are employed.

In the first embodiment, the logic on the basis of a model relating to the engine including the supercharger and the EGR device (hereinafter, this logic may be referred to as —target value setting logic—) is used for the correction of the aforementioned base supercharging pressure and EGR rate, the calculation of the predicted supercharging pressure, vane control input, EGR rate and EGR control valve control input, etc. for the setting of the target supercharging pressure and EGR rate.

This logic includes a plurality of coefficients identified such that the intended target supercharging pressure and EGR rate are set (hereinafter, these coefficients may be referred to as —logic coefficients—).

In this regards, according to the first embodiment, during the engine operation, the logic coefficients are corrected as follows.

That is, when it is necessary to correct the logic coefficients, a fuel injection amount delay control is performed.

This delay control is one using the target fuel injection amount set when the delay control starts (hereinafter, this may be referred to as —delay control starting time—) when the delay control ends (hereinafter, this may be referred to as —delay control ending time), not at the delay control starting time, for the fuel injector control.

Therefore, when this delay control is performed, the base fuel injection amount is acquired from the map of FIG. 3(A) on the basis of the acceleration pedal depression amount at the starting time of this control (i.e. at the delay control starting time) and then, this acquired base amount is set as the target fuel injection amount, however, this set target amount is not used at once for the fuel injector control, while the target fuel injection amount used for the fuel injector control at the delay control starting time is continuously used for the fuel injector control during the time period until the delay control ends (hereinafter, this period may be referred to as —delay control period—).

Then, the target fuel injection amount set at the delay control starting time is used for the fuel injector control at the delay control ending time.

On the other hand, in the first embodiment, a logic (hereinafter, this logic may be referred to as —look-ahead logic—) is prepared for calculating the predicted supercharging pressure, EGR rate, vane control input and EGR control valve control input at the delay control ending time in the case that the target supercharging pressure and EGR rate at the delay control ending time are set by the target value setting logic assuming that the fuel injection amount and the engine speed do not change during the delay control period when the fuel injection amount delay control starts.

As explained above, when it is necessary to correct the logic coefficients of the target value setting logic and the fuel injection amount delay control starts, the look-ahead logic calculates the predicted supercharging pressure at the delay control ending time (hereinafter, this pressure may be referred to as —look-ahead predicted supercharging pressure—), the predicted EGR rate at the delay control ending time (hereinafter, this rate may be —look-ahead predicted EGR rate—), the predicted vane control input at the delay control ending time (hereinafter, this input may be referred to as —look-ahead predicted vane control input—) and the predicted EGR control valve control input at the delay control ending time (hereinafter, this input may be referred to as —look-ahead predicted EGR control valve control input—).

Then, at the delay control ending time, the fuel injector control is performed using the target fuel injection amount set at the delay control starting time and then, the vanes and the EGR control valve are controlled according to the target supercharging pressure and EGR rate set by the target value setting logic on the basis of the fuel injection amount and the engine speed obtained as a result of the fuel injector control.

Then, the actual supercharging pressure, EGR rate, vane control input and EGR control valve control input at this time are acquired.

Then, these acquired actual supercharging pressure (hereinafter, this pressure may be referred to as —actual supercharging pressure—), EGR rate (hereinafter, this rate may be referred to as —actual EGR rate—), vane control input (hereinafter, this input may be referred to as —actual vane control vane—) and EGR control valve control input (hereafter, this input may be referred to as —actual EGR control valve control input—) are compared with the look-ahead predicted supercharging pressure, EGR rate, vane control input and EGR control valve control input, respectively.

When there is a deviation between the actual supercharging pressure and the look-ahead predicted supercharging pressure or between the actual EGR rate and the look-ahead predicted EGR rate or between the actual vane control input and the look-ahead predicted vane control input or between the actual EGR control valve control input and the look-ahead predicted EGR control valve control input, the logic coefficients of the target value setting logic are corrected such that the deviation decreases.

This has an advantage that the target value setting logic can be corrected with a small calculation burden.

That is, when the look-ahead logic calculates the look-ahead predicted supercharging pressure, EGR rate, vane control input and EGR control valve control input (hereinafter, these may be collectively referred to as —look-ahead values—), the look-ahead logic calculates the look-ahead values at least using the engine speed.

When there is a possibility that the engine speed changes during a predetermined time period, the look-ahead logic must calculate the look-ahead values assuming that the engine speed changes during the predetermined time period.

In this case, the calculation burden necessary for the look-ahead values calculation is larger than that assuming that the engine speed does not change during the predetermined time period.

However, in the first embodiment, when it is necessary to correct the logic coefficients of the target value setting logic and therefore, to correct the target value setting logic, the fuel injection amount delay control is performed.

During the delay control, that is, during the predetermined time period, the target fuel injection amount is maintained at the target fuel injection amount at the delay control starting time and therefore, the engine speed should not change.

Therefore, it is sufficient that the look-ahead logic calculates the look-ahead values assuming that the engine speed does not change (i.e. the fuel injection amount does not change) during the predetermined time period.

That is, the look-ahead logic can calculate the look-ahead values using the data of the engine speed at the delay control starting time as the definitive data. Therefore, the look-ahead logic can calculate the look-ahead values with a small calculation burden.

Then, the logic coefficients of the target value setting logic is corrected using the calculated look-ahead values and as a result, the logic coefficients of the target value setting logic, therefore, the target value setting logic can be corrected with a small calculation burden.

In the first embodiment, when there is a deviation between the actual supercharging pressure and the look-ahead predicted supercharging pressure or between the actual EGR rate and the look-ahead predicted EGR rate or between the actual vane control input and the look-ahead predicted vane control input or between the actual EGR control valve control input and the look-ahead predicted EGR control valve control input, the logic coefficients of the target value setting logic are corrected.

However, when the absolute value of the deviation between the actual supercharging pressure and the look-ahead predicted supercharging pressure or between the actual EGR rate and the look-ahead predicted EGR rate or between the actual vane control input and the look-ahead predicted vane control input or between the actual EGR control valve control input and the look-ahead predicted EGR control valve control input is larger than a permissible value, the logic coefficients of the target value setting logic may be corrected.

Further, in the first embodiment, the deviations between the actual supercharging pressure and the look-ahead predicted supercharging pressure, between the actual EGR rate and the look-ahead predicted EGR rate, between the actual vane control input and the look-ahead predicted vane control input and between the actual EGR control valve control input and the look-ahead predicted EGR control valve control input are used for correcting the logic coefficients of the target value setting logic.

However, an embodiment, which uses one, two or three of these deviations for the correction of the logic coefficients of the target value setting logic, may be employed.

Further, referring to the actual supercharging pressure and EGR rate collectively as —actual controlled output—, referring to the look-ahead predicted supercharging pressure and EGR rate collectively as —look-ahead predicted controlled output—, referring to the actual vane and EGR control valve control inputs collectively as —actual controlled output— and referring to the look-ahead predicted vane and EGR control valve control inputs collectively as —look-ahead predicted control input—, the first embodiment is one which uses the deviations between the actual controlled output and the look-ahead predicted controlled output and between the actual control input and the look-ahead predicted control input for correcting the logic coefficients of the target value setting logic.

However, an embodiment, which uses one of these deviations for the correction of the logic coefficients of the target value setting logic, may be employed.

Figure 4:
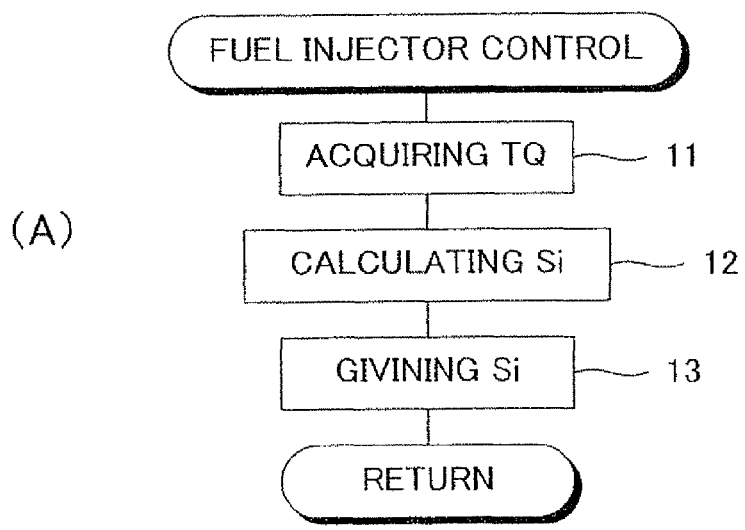
FIG. 4(A) shows an example of a routine for performing a control of fuel injectors of the first embodiment and FIG. 4(B) shows an example of a routine for performing a setting of a target fuel injection amount of the first embodiment.
Figure 4:
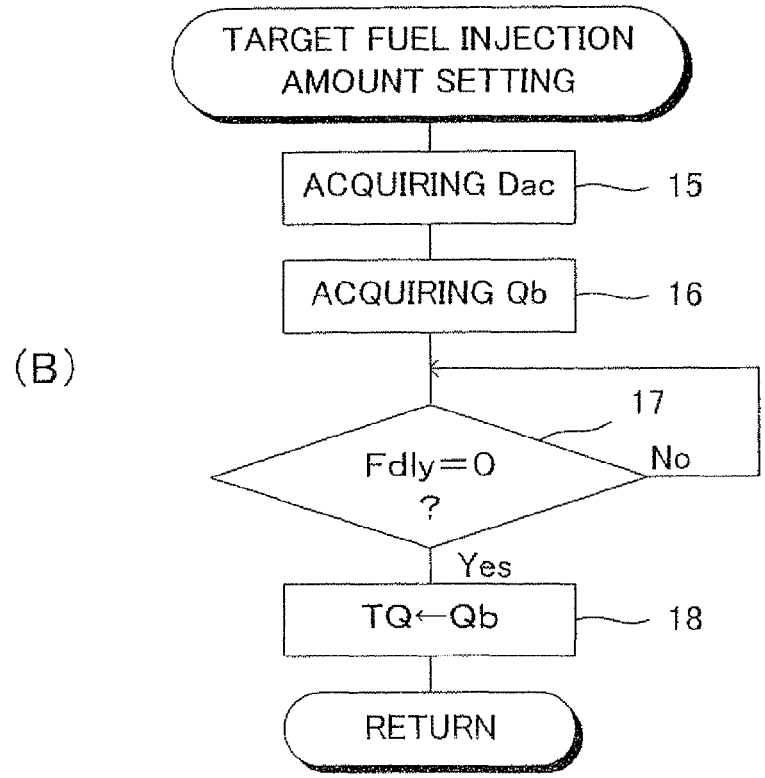

An example of a routine for performing the fuel injector control according to the first embodiment will be explained. This example is shown in FIG. 4(A). This routine is performed every a predetermined crank angle.

When the routine of FIG. 4(A) starts, first, at step 11, a latest target fuel injection amount TQ set in a routine of FIG. 4(B) (the detail of this routine will be explained later) is acquired.

Next, at step 12, a command signal Si given to the fuel injector is calculated on the basis of the target amount TQ acquired at step 11.

Next, at step 13, the signal Si calculated at step 12 is given to the fuel injector and then, the routine ends.

An example of a routine for performing the target fuel injection amount setting according to the first embodiment will be explained. This example is shown in FIG. 4(B). This routine is performed every a predetermined crank angle under the condition where this routine ends.

When the routine of FIG. 4(B) starts, first, at step 15, the acceleration pedal depression amount Dac is acquired.

Next, at step 16, the base fuel injection amount Qb corresponding to the amount Dac acquired at step 15 is acquired from the map of FIG. 3(A).

Next, at step 17, it is judged if a delay control flag Fdly is reset (Fdly=0).

This flag Fdly is set and reset by a routine of FIG. 8 (the detail of this routine will be explained later) and is set when the performance of the fuel injection amount delay control is required and is reset when the performance of the fuel injection amount delay control is not required.

When it is judged that Fdly=0 at step 17, that is, when the performance of the fuel injection amount delay control is not required, the routine proceeds directly to step 18.

At step 18, the base amount Qb acquired at step 16 is set as the target fuel injection amount TQ and then, the routine ends.

In this case, the base amount Qb acquired at step 16 is used at once as the target fuel injection amount TQ in the routine of FIG. 4(A).

On the other hand, when it is not judged that Fdly=0 at step 17, that is, when the performance of the fuel injection amount delay control is required, the routine repeats step 17.

That is, until it is judged that Fdly=0 at step 17, the routine does not proceed to step 18.

In this case, until it is judged that Fdly=0 at step 18, the target amount set at step 18 of the last performance of this routine is used for the target fuel injection amount TQ in the routine of FIG. 4(A). That is, the fuel injection amount delay control is performed.

Thereafter, when it is judged that Fdly=0 at step 17, the routine proceeds to step 18 where the base amount Qb acquired at step 16 is set as the target fuel injection amount TQ and then, the routine ends.

Figure 5:
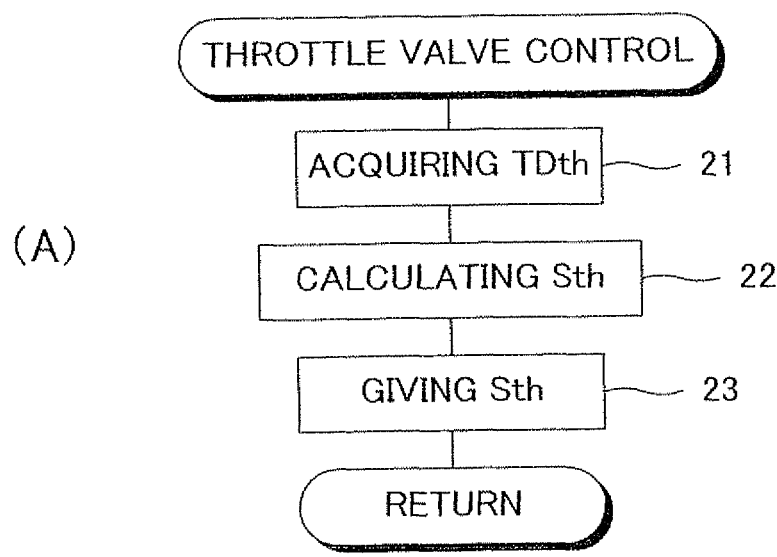
FIG. 5(A) shows an example of a routine for performing a control of a throttle valve of the first embodiment and FIG.
Figure 5:
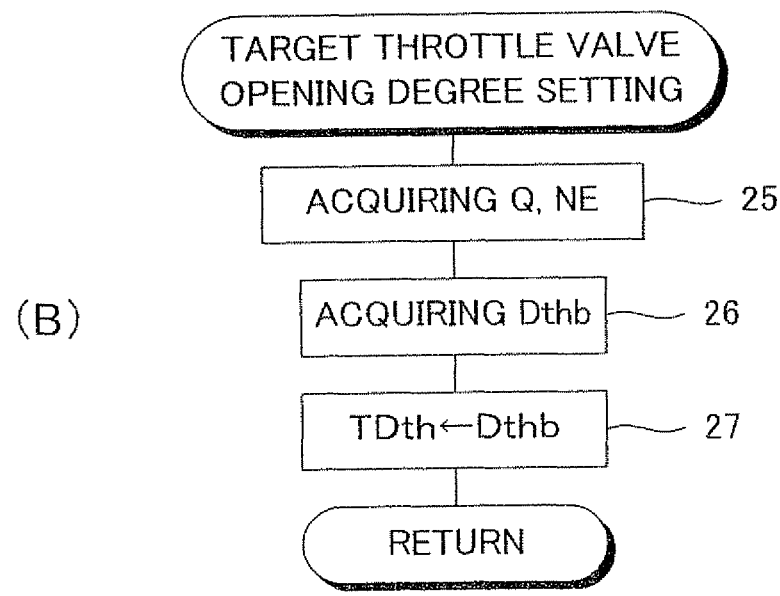

An example of a routine for performing the throttle valve control according to the first embodiment will be explained. This example is shown in FIG. 5(A). This routine is performed every a predetermined crank angle.

When the routine of FIG. 5(A) starts, first, at step 21, a latest target throttle valve opening degree TDth set in a routine of FIG. 5(B) (the detail of this routine will be explained later) is acquired.

Next, at step 22, a control signal Sth to be given to the throttle valve actuator is calculated on the basis of the target degree TDth acquired at step 21.

Next, at step 23, the signal Sth calculated at step 22 is given to the throttle valve and then, the routine ends.

An example of a routine for performing the target throttle valve opening degree setting according to the first embodiment will be explained. This example is shown in FIG. 5(B). This routine is performed every a predetermined crank angle.

When the routine of FIG. 5(B) starts, first, at step 25, the current fuel injection amount Q and the current engine speed NE are acquired. The acquired current fuel injection amount Q corresponds to the latest target fuel injection amount TQ set at step 18 of FIG. 4(B).

Next, at step 26, the base throttle valve opening degree Dthb corresponding to the amount Q and the speed NE acquired at step 25 is acquired from the map of FIG. 3(B).

Next, at step 27, the base degree Dthb acquired at step 26 is set as the target throttle valve opening degree TDth and then, the routine ends.

An example of a routine for performing the vane control according to the first embodiment will be explained. This example is shown in FIG. 6(A). This routine is performed every a predetermined crank angle.

When the routine of FIG. 6(A), first, at step 31, the current supercharging pressure Pim and the latest target supercharging pressure TPim set in the routine of FIG. 7 (the detail of this routine will be explained later) are acquired.

Next, at step 32, the deviation ΔPim of the current supercharging pressure relative to the target supercharging pressure acquired at step 31 (=TPim−Pim) is calculated.

Next, a vane control signal Sv is calculated on the basis of the deviation of the supercharging pressure ΔPim calculated at step 32 is calculated.

Next, at step 34, the signal Sv calculated step 33 is given to the vanes and then, the routine ends.

An example of a routine for performing the EGR control valve control according to the first embodiment will be explained. This example is shown in FIG. 6(B). This routine is performed every a predetermined crank angle.

When the routine of FIG. 6(B) starts, first, at step 35, the current EGR rate Regr and the latest target EGR rate TRegr set in the routine of FIG. 7 (the detail of this routine will be explained later) are acquired.

Next, at step 36, a deviation ΔRegr of the current EGR rate relative to the target EGR rate acquired at step 35 (=TRegr−Regr) is calculated.

Next, at step 37, an EGR control valve control signal Segr is calculated on the basis of the deviation ΔRegr calculated at step 36.

Next, at step 38, the signal Segr calculated at step 37 is given to the EGR control valve and then, the routine ends.

An example of a routine for performing the target supercharging pressure and EGR rate setting according to the first embodiment will be explained. This example is shown in FIG. 7. This routine is performed every a predetermined crank angle.

When the routine of FIG. 7 starts, first, at step 41, the current fuel injection amount Q and the current engine speed NE are acquired. The acquired current fuel injection amount Q corresponds to the latest target fuel injection amount TQ set at step 18 of FIG. 4(B).

Next, at step 42, the base supercharging pressure Pimb and the base EGR rate Regrb corresponding to the current fuel injection amount Q and the current engine speed NE acquired at step 41 are acquired from the maps of FIGS. 3(C) and 3(D), respectively.

Next, at step 43, the predicted supercharging pressure (i.e. the primary predicted supercharging pressure) Pime1, the predicted EGR rate (i.e. the primary predicted EGR rate) Regre1, the predicted vane control input (i.e. the primary predicted vane control input) Sve1 and the predicted EGR control valve control input (i.e. the primary predicted EGR control valve control input) Segre1 are calculated on the basis of the base pressure Pimb and the base rate Regrb acquired at step 42.

Next, at step 44, it is judged that the predicted values Pime1, Regre1, Sve1 and Segre1 calculated at step 43 satisfy the corresponding constraint conditions, respectively.

When it is judged that these predicted values satisfy the constraint conditions, the routine proceeds to step 52.

On the other hand, when it is judged that these predicted values do not satisfy the constraint conditions, the routine proceeds to step 45.

When it is judged that each predicted value satisfies each constraint condition at step 44 and then, the routine proceeds to step 52, the base supercharging pressure Pimb and the base EGR rate Regrb acquired at step 42 are set as the target supercharging pressure TPim and the target EGR rate TRegr, respectively and then, the routine ends.

When it is judged that each predicted value does not satisfy each constraint condition at step 44 and then, the routine proceeds to step 45, the base supercharging pressure Pimb and EGR rate Regrb acquired at step 42 are corrected according to the predetermined rule to calculate the primary corrected base supercharging pressure and EGR rate.

Next, at step 46, the predicted supercharging pressure (i.e. the secondary predicted supercharging pressure) Pime2, the predicted EGR rate (i.e. the secondary predicted EGR rate) Regre2, the predicted vane control input (i.e. the secondary predicted vane control input) Sve2 and the predicted EGR control valve control input (i.e. the secondary predicted EGR control valve control input) Segre2 are calculated on the basis of the primary corrected base supercharging pressure and EGR rate calculated at step 45.

Next, at step 47, it is judged if the predicted values Pime2, Regre2, Sve2 and Segre2 calculated at step 46 satisfy the corresponding constraint conditions, respectively.

When it is judged that these predicted values satisfy the constraint conditions, the routine proceeds to step 53.

On the other hand, when it is judged that these predicted values do not satisfy the constraint conditions, the routine proceeds to step 48.

When it is judged that each predicted value satisfies each constraint condition at step 47 and then, the routine proceeds to step 53, the primary corrected base supercharging pressure Pimba1 and EGR rate Regrba1 calculated at step 45 are set as the target supercharging pressure TPim and EGR rate TRegr, respectively and then, the routine ends.

When it is judged that each predicted value does not satisfy each constraint condition at step 47 and then, the routine proceeds to step 48, the primary corrected base supercharging pressure Pimba1 calculated at step 45 is further corrected to calculate a new primary corrected base supercharging pressure, while the primary corrected base EGR rate Regrba1 calculated at step 45 is further corrected to calculate a new primary corrected base EGR rate.

Next, at step 49, the predicted supercharging pressure (i.e. a new secondary predicted supercharging pressure) Pime2, the predicted EGR rate (i.e. a new secondary predicted EGR rate) Regre2, the predicted vane control input (i.e. a new secondary predicted vane control input) Sve2 and the predicted EGR control valve control input (i.e. a new secondary predicted EGR control valve control input) Segre2 are calculated on the basis of the new primary base supercharging pressure and EGR rate calculated at step 48.

Next, at step 50, it is judged if the predicted values Pime2, Regre2, Sve2 and Segre2 calculated at step 49 satisfy the corresponding constraint conditions, respectively.

When it is judged that these predicted values satisfy the constraint conditions, the routine proceeds to step 51.

In this case, at step 51, the primary corrected base supercharging pressure Pimba1 and EGR rate Regrba1 calculated at step 48 are set as the target supercharging pressure TPim and EGR rate TRegr, respectively and then, the routine ends.

On the other hand, when it is judged that the predicted values do not satisfy the constraint conditions at step 50, the routine returns to step 48.

In this case, until it is judged that the predicted values satisfy the constraint conditions at step 50, the calculation of the new primary corrected base supercharging pressure and EGR rate by the correction of the primary corrected base supercharging pressure and EGR rate at step 48 and the calculation of the new secondary predicted supercharging pressure, EGR rate, vane control input and EGR control valve control input at step 49 are performed repeatedly.

An example of a routine for performing the target value setting logic correction according to the first embodiment will be explained. This example is shown in FIGS. 8 and 9. This routine is performed every a predetermined crank angle.

When the routine of FIG. 8 starts, first, at step 101, it is judged that the correction of the target value setting logic is needed.

When it is judged that the correction of the target value setting logic is needed, the routine proceeds to step 102.

On the other hand, when it is judged that the correction of the target value setting logic is not needed, the routine ends directly.

When it is judged that the correction of the target value setting logic is needed at step 101 and then, the routine proceeds to step 102, the delay control flag is set (Fdly←1). Thereby, the fuel injection amount delay control starts.

Next, at step 103, the count up of a delay counter Cdly starts.

This counter Cdly represents the time elapsing from the set of the delay control flag at step 102, that is, the time elapsing from the start of the fuel injection amount delay control.

Next, at step 104, a routine of FIG. 9 is performed.

When the routine of FIG. 9 starts, at step 141 to 144, the same processes as those of step 41 to 44 of FIG. 7 are performed.

Then, when it is judged that each predicted value calculated at step 143 satisfies each constraint condition at step 144 and then, the routine proceeds to step 152, the primary predicted supercharging pressure Pime1, EGR rate Regre1, vane control input Sve1 and EGR control valve control input Segre1 calculated at step 143 are memorized as the look-ahead predicted supercharging pressure Pime, EGR rate Regre, vane control input Sve and EGR control valve control input, respectively and then, the routine proceeds to step 105 of FIG. 8.

When it is judged that each predicted value calculated at step 143 does not satisfy each constraint condition at step 144, the routine proceeds to step 145 and at step 145 to 147, the same processes as step 45 to 47 of FIG. 7 are performed.

When it is judged that each predicted value calculated at step 146 satisfies each constraint condition at step 147 and then, the routine proceeds to step 153, the secondary predicted supercharging pressure Pime2, EGR rate Regre2, vane control input Sve2 and EGR control valve control input Segre2 calculated at step 146 are memorized as the look-ahead predicted supercharging pressure Pime, EGR rate Regre, vane control input Sve and EGR control valve control input Segre, respectively and then, the routine proceeds to step 105 of FIG. 8.

When it is judged that each predicted value calculated at step 146 does not satisfy each constraint condition at step 147, the routine proceeds to step 148 and at step 148 to 150, the same processes as step 48 to 50 of FIG. 7 are performed.

When it is judged that each predicted value calculated at step 149 satisfies each constraint condition at step 150 and then, the routine proceeds to step 151, the secondary predicted supercharging pressure Pime2, EGR rate Regre2, vane control input Sve2 and EGR control valve control input Segre2 calculated at step 149 are memorized as the look-ahead predicted supercharging pressure Pime, EGR rate Regre, vane control input Sve and EGR control valve control input Segre, respectively and then, the routine proceeds to step 105 of FIG. 8.

At step 105 of FIG. 8, it is judged if the delay counter Cdly is larger than a predetermined value Cdlyth or more (Cdly≥Cdlyth).

When it is judged that Cdly≥Cdlyth, the routine proceeds to step 106. On the other hand, when it is not judged that Cdly≥Cdlyth, the routine returns to step 105. That is, in this routine, the routine does not proceed to step 106 until it is judged that Cdly≥Cdlyth at step 105.

The predetermined value Cdlyth is set to correspond to the time period during which the fuel injection amount delay control should be performed.

When it is judged that Cdly≥Cdlyth at step 105 and then, the routine proceeds to step 106, the delay control flag Fdly is reset. Thereby, the fuel injection amount delay control is terminated.

Next, at step 107, the count up of the delay counter Cdly is terminated and cleared.

Next, at step 108, the supercharging pressure Pim, the EGR rate Regr, the vane control input Sv and the EGR control valve control input Segr at this time (i.e. at the delay control ending time) are acquired.

Next, at step 109, the deviation ΔPim of the look-ahead predicted supercharging pressure memorized at step 152 or 151 or 153 relative to the supercharging pressure acquired at step 108, the deviation ΔRegr of the look-ahead predicted EGR rate memorized at step 152 or 151 or 153 relative to the EGR rate acquired at step 108, the deviation ΔSv of the look-ahead predicted vane control input memorized at step 152 or 151 or 153 relative to the vane control input acquired at step 108 and the deviation ΔSegr of the look-ahead predicted EGR control valve control input memorized at step 152 or 151 or 153 relative to the EGR control vale control input acquired at step 108 are calculated.

Next, at step 110, correction values K1, K2 . . . Kn relating to the logic coefficients of the target value setting logic are calculated on the basis of the deviations ΔPim, ΔRegr, ΔSv and ΔSegr calculated at step 109.

Next, at step 111, the logic coefficients are corrected by the correction values K1, K2 . . . Kn calculated at step 110 and then, the routine ends.

The first embodiment is one which the invention is applied to the control device for controlling the vanes and the EGR control valve to accomplish the target supercharging pressure and the target EGR rate in the engine comprising the supercharger and the EGR device.

In this regards, the invention can be applied to the control device for controlling the vanes to accomplish the target supercharging pressure in the engine comprising the supercharger without the EGR device and can be applied to the control device for controlling the EGR control valve to accomplish the target EGR rate in the engine comprising the EGR device without the supercharger.

An embodiment which the invention is applied to the control device of the engine comprising the supercharger without the EGR device (hereinafter, this embodiment may be referred to as —second embodiment—) will be explained.

The constitution of the second embodiment not explained below is the same as that of the first embodiment or can be obviously derived from the constitution of the first embodiment in consideration of the constitution of the second embodiment.

The engine which the control device of the second embodiment is applied is shown in FIG. 10. Except that the engine does not comprise the EGR device, the constitution of the engine of FIG. 10 is the same as that of FIG. 1. The controls of the fuel injector, the throttle valve and the vanes of the second embodiment are the same as those of the first embodiment.

The target fuel injection amount of the second embodiment will be explained. In the second embodiment, in the engine of FIG. 10, appropriate fuel injection amounts depending on the acceleration pedal depression amount are previously obtained by an experiment, etc.

These obtained fuel injection amounts are memorized in the electronic control unit as base fuel injection amounts Qb in the form of a map as a function of the acceleration pedal depression amount Dac as shown in FIG. 11(A).

During the engine operation, the base fuel injection amount Qb corresponding to the current amount Dac is acquired from the map of FIG. 11(A) and this acquired amount Qb is set as the target fuel injection amount.

As shown in FIG. 11(A), the base amount Qb increases as the amount Dac increases.

The target throttle valve opening degree of the second embodiment will be explained. In the second embodiment, as the engine operation state used for the setting of the target throttle valve opening degree, the fuel injection amount and the engine speed are employed.

In the engine of FIG. 10, appropriate throttle valve opening degrees depending on the fuel injection amount and the engine speed are previously obtained by an experiment, etc.

These obtained throttle valve opening degrees are memorized in the electronic control unit as base throttle valve opening degrees Dthb in the form of a map as a function of the fuel injection amount Q and the engine speed N as shown in FIG. 11(B).

During the engine operation, the base throttle valve opening degree Dthb corresponding to the current fuel injection amount Q and engine speed N is acquired from the map of FIG. 11(B) and then, this acquired degree Dthb is set as the target throttle valve opening degree.

In the map of FIG. 11(B), as the amount Q increases, the base degree Dthb increases and as the speed N increases, the base degree Dthb increases.

In the second embodiment, as the fuel injection amount used for acquiring the base throttle valve opening degree from the map of FIG. 11(B), the fuel injection amount corresponding to the target fuel injection amount is employed.

The target supercharging pressure of the second embodiment will be explained. In the second embodiment, as the engine operation state used for the setting of the target supercharging pressure, the engine speed and the fuel injection amount are employed.

In the engine of FIG. 10, appropriate supercharging pressures depending on the engine speed and the fuel injection amount are previously obtained by an experiment, etc. and these obtained pressures are memorized in the electronic control unit in the form of a map as a function of the engine speed NE and the fuel injection amount Q as shown in FIG. 11(C).

During the engine operation, the base supercharging pressure Pimb corresponding to the current engine speed NE and fuel injection amount is acquired from the map of FIG. 11(C).

This acquired pressure Pimb is corrected by a predetermined process (the detail of this process will be explained) and this corrected pressure is set as the target supercharging pressure.

In the second embodiment, as the fuel injection amount used for acquiring the base supercharging pressure from the map of FIG. 11(C), the fuel injection amount corresponding to the target fuel injection amount is employed.

The aforementioned predetermined process relating to the base supercharging pressure of the second embodiment will be explained.

Regarding the target supercharging pressure setting, there is a concept for setting the base supercharging pressure itself acquired from the map of FIG. 11(C) as the target supercharging pressure and then, controlling the vanes according to this set target supercharging pressure.

However, when the base supercharging pressure itself acquired from the map of FIG. 11(C) is used for the vane control as the target supercharging pressure, as explained relating to the first embodiment, several problems occur.

Similar to the first embodiment, in order to avoid these problems, the supercharging-pressure-related, vane-operation-state-related, vane-actuator-operation-state-related and vane-manipulation-amount-related constraints are imposed on the supercharging pressure control.

Therefore, in the case that the base supercharging pressure itself acquired from the map of FIG. 11(C) is used for the supercharging pressure control as the target supercharging pressure, when it is predicted that these constraints are not satisfied, the base supercharging pressure should be corrected such that these constraints are satisfied, this corrected pressure should be set as the target supercharging pressure and this set target pressure should be used for the supercharging pressure control.

In the second embodiment, the base supercharging pressure acquired from the map of FIG. 11(C) is corrected such that the supercharging-pressure-related, vane-operation-state-related, vane-actuator-operation-state-related and vane-manipulation-amount-related constraints are satisfied, this corrected pressure is set as the target supercharging pressure and this set pressure is used for the supercharging pressure control.

The concrete setting of the target supercharging pressure of the second embodiment will be explained. In the following explanation, the vane control input represents the vane control signal as well as the vane actuator operation state, the vane manipulation amount and the vane operation state.

In the second embodiment, the base supercharging pressure Pimb depending on the engine speed NE and the fuel injection amount Q is acquired from the map of FIG. 11(C).

This base supercharging pressure is set as the target supercharging pressure and then, the supercharging pressure and the vane control input in the case that the vanes are controlled according to this target supercharging pressure are predicted.

That is, the predicted supercharging pressure and vane control input after a predetermined time period in the case that the base supercharging pressure is set as the target supercharging pressure are calculated.

The predetermined time period may be a predetermined constant time period or a time period appropriately set depending on the engine operation state.

Then, it is judged if these calculated predicted supercharging pressure (hereinafter, this pressure may be referred to as —primary predicted supercharging pressure—) and vane control input (hereinafter, this input may be referred to as —primary predicted vane control input—) satisfy the supercharging-pressure-related and vane-control-input-related constraints, respectively.

That is, it is judged if the constraint condition where the primary predicted supercharging pressure is within a permissible range (hereinafter, this condition may be referred to as —supercharging pressure constraint condition—) is satisfied and the constraint condition where the primary predicted vane control input is within a permissible range (hereinafter, this condition may be referred to as —vane control input constraint condition—) is satisfied.

When these constraint conditions are satisfied, the base supercharging pressure itself acquired from the map of FIG. 11(C) is set as the target supercharging pressure for the supercharging pressure control.

On the other hand, when the constraint conditions are not satisfied, the base supercharging pressure acquired from the map of FIG. 11(C) is corrected according to a predetermined rule.

Then, this corrected base supercharging pressure (hereinafter, this pressure may be referred to as —primary corrected base supercharging pressure—) is set as the target supercharging pressure and then, the supercharging pressure and the vane control input in the case that the vanes are controlled according to this target supercharging pressure are predicted.

That is, the predicted supercharging pressure and vane control input after a predetermined time period in the case that the primary corrected base supercharging pressure is set as the target supercharging pressure are calculated.

Then, it is judged that these calculated predicted supercharging pressure (hereinafter, this pressure may be referred to as —secondary predicted supercharging pressure—) and vane control input (hereinafter, this input may be referred to as —secondary predicted vane control input—) satisfy the supercharging pressure and vane control input constraint conditions, respectively.

When these constraint conditions are satisfied, the primary corrected base supercharging pressure is set as the target supercharging pressure for the supercharging pressure control.

On the other hand, when these constraint conditions are not satisfied, the primary corrected base supercharging pressure is corrected again according to a predetermined rule.

Then, using this corrected primary corrected base supercharging pressure as a new primary corrected base supercharging pressure, this new primary corrected base supercharging pressure is set as the target supercharging pressure and then, the supercharging pressure and the vane control input in the case that the vanes are controlled according to this target supercharging pressure are predicted.

That is, the predicted supercharging pressure and vane control input after the predetermined time period in the case that the new primary corrected base supercharging pressure is set as the target supercharging pressure are calculated as a new secondary predicted supercharging pressure and vane control input, respectively.

Then, until it is judged that these calculated new secondary predicted supercharging pressure and vane control input satisfy the supercharging pressure and vane control input constraint conditions, respectively, the calculation of the new primary corrected base supercharging pressure and the calculation of the new secondary predicted supercharging pressure and vane control input are performed repeatedly.

According to the second embodiment, for the same reason as that explained relating to the first embodiment, the target supercharging pressure suitable for the control of the supercharging pressure, the determination of the vane control signal, the control of the vane actuator operation, the determination of the vane manipulation amount and the control of the vane operation are set.

Further, according to the second embodiment, for the same reason as that explained relating to the first embodiment, during the control of the supercharging pressure to the target pressure (i.e. during the transient state), the control responsiveness of the supercharging pressure is improved.

Further, according to the second embodiment, for the same reason as that explained relating to the first embodiment, the control stability and robustness of the supercharging are high.

Further, according to the second embodiment, during the control of the supercharging pressure to the target pressure, respectively, an impermissible change of the supercharging pressure beyond or below the target pressure is restricted and the deteriorations of the vane and the vane actuator are restricted.

In the second embodiment, the logic on the basis of a model relating to the engine including the supercharger (hereinafter, this logic may be referred to as —target value setting logic—) is used for the correction of the aforementioned base supercharging pressure, the calculation of the predicted supercharging pressure and vane control input, etc. for the setting of the target supercharging pressure.

This logic includes a plurality of coefficients identified such that the intended target supercharging pressure is set (hereinafter, these coefficients may be referred to as —logic coefficients—).

In this regards, according to the second embodiment, during the engine operation, the logic coefficients are corrected as follows.

That is, when it is necessary to correct the logic coefficients, the aforementioned fuel injection amount delay control is performed.

When this delay control starts, the base fuel injection amount is acquired from the map of FIG. 11(A) on the basis of the acceleration pedal depression amount at the starting time of this control (i.e. at the delay control starting time) and then, this acquired base amount is set as the target fuel injection amount, however, this set target amount is not used at once for the fuel injector control, while the target amount used for the fuel injector control at the delay control starting time is continuously used for the fuel injector control until the fuel injection amount delay control ends (hereinafter, this may be referred to as —delay control period—).

Then, the target fuel injection amount set at the delay control starting time is used for the fuel injector control when the delay control period has elapsed (i.e. when the fuel injection amount delay control ends and hereinafter, this may be referred to as —delay control ending time—).

On the other hand, in the second embodiment, a logic (hereinafter, this logic may be referred to as —look-ahead logic—) is prepared for calculating the predicted supercharging pressure and vane control input at the delay control ending time in the case that the target supercharging pressure at the delay control ending time is set by the target value setting logic assuming that the fuel injection amount and the engine speed do not change during the delay control period when the fuel injection amount delay control starts.

As explained above, when it is necessary to correct the logic coefficients of the target value setting logic and the fuel injection amount delay control starts, the look-ahead logic calculates the predicted supercharging pressure at the delay control ending time (hereinafter, this pressure may be referred to as —look-ahead predicted supercharging pressure—) and the predicted vane control input at the delay control ending time (hereinafter, this input may be referred to as —look-ahead predicted vane control input—).

Then, at the delay control ending time, the fuel injector control is performed using the target fuel injection amount set at the delay control starting time and then, the vanes are controlled according to the target supercharging pressure set by the target value setting logic on the basis of the fuel injection amount and the engine speed obtained as a result of the fuel injector control.

Then, the actual supercharging pressure and vane control input at this time are acquired.

Then, these acquired actual supercharging pressure (hereinafter, this pressure may be referred to as —actual supercharging pressure—) and vane control input (hereinafter, this input may be referred to as —actual vane control vane—) are compared with the look-ahead predicted supercharging pressure and vane control input, respectively.

When there is a deviation between the actual supercharging pressure and the look-ahead predicted supercharging pressure or between the actual vane control input and the look-ahead predicted vane control input, the logic coefficients of the target value setting logic are corrected such that the deviation decreases.

For the same reason as that explained relating to the first embodiment, this has an advantage that the look-ahead values can be calculated with a small burden and therefore, the target value setting logic can be corrected with a small calculation burden.

An example of a routine for performing the target supercharging pressure setting according to the second embodiment will be explained. This example is shown in FIG. 12. This routine is performed every a predetermined crank angle.

When the routine of FIG. 12 starts, first, at step 61, the current fuel injection amount Q and the current engine speed NE are acquired. The acquired current fuel injection amount Q corresponds to the latest target fuel injection amount TQ set at step 18 of FIG. 4(B).

Next, at step 62, the base supercharging pressure Pimb corresponding to the current fuel injection amount Q and the current engine speed NE acquired at step 61 are acquired from the maps of FIG. 3(C), respectively.

Next, at step 63, the predicted supercharging pressure (i.e. the primary predicted supercharging pressure) Pime1 and the predicted vane control input (i.e. the primary predicted vane control input) Sve1 are calculated on the basis of the base pressure Pimb acquired at step 62.

Next, at step 64, it is judged that the predicted values Pime1 and Sve1 calculated at step 63 satisfy the corresponding constraint conditions, respectively.

When it is judged that these predicted values satisfy the constraint conditions, the routine proceeds to step 72.

On the other hand, when it is judged that these predicted values do not satisfy the constraint conditions, the routine proceeds to step 65.

When it is judged that each predicted value satisfies each constraint condition at step 64 and then, the routine proceeds to step 72, the base supercharging pressure Pimb acquired at step 62 is set as the target supercharging pressure TPim and then, the routine ends.

When it is judged that each predicted value does not satisfy each constraint condition at step 64 and then, the routine proceeds to step 65, the base supercharging pressure Pimb acquired at step 62 is corrected according to the predetermined rule to calculate the primary corrected base supercharging pressure.

Next, at step 66, the predicted supercharging pressure (i.e. the secondary predicted supercharging pressure) Pime2 and the predicted vane control input (i.e. the secondary predicted vane control input) Sve2 are calculated on the basis of the primary corrected base supercharging pressure calculated at step 65.

Next, at step 67, it is judged if the predicted values Pime2 and Sve2 calculated at step 66 satisfy the corresponding constraint conditions, respectively.

When it is judged that these predicted values satisfy the constraint conditions, the routine proceeds to step 73.

On the other hand, when it is judged that these predicted values do not satisfy the constraint conditions, the routine proceeds to step 68.

When it is judged that each predicted value satisfies each constraint condition at step 67 and then, the routine proceeds to step 73, the primary corrected base supercharging pressure Pimba1 calculated at step 65 is set as the target supercharging pressure TPim and then, the routine ends.

When it is judged that each predicted value does not satisfy each constraint condition at step 67 and then, the routine proceeds to step 68, the primary corrected base supercharging pressure Pimba1 calculated at step 65 is further corrected to calculate a new primary corrected base supercharging pressure.

Next, at step 69, the predicted supercharging pressure (i.e. a new secondary predicted supercharging pressure) Pime2 and the predicted vane control input (i.e. a new secondary predicted vane control input) Sve2 are calculated on the basis of the new primary base supercharging pressure calculated at step 68.

Next, at step 70, it is judged if the predicted values Pime2 and Sve2 calculated at step 69 satisfy the corresponding constraint conditions, respectively.

When it is judged that these predicted values satisfy the constraint conditions, the routine proceeds to step 71. In this case, at step 71, the primary corrected base supercharging pressure Pimba1 calculated at step 68 is set as the target supercharging pressure TPim and then, the routine ends.

On the other hand, when it is judged that the predicted values do not satisfy the constraint conditions at step 70, the routine returns to step 68.

In this case, until it is judged that the predicted values satisfy the constraint conditions at step 70, the calculation of the new primary corrected base supercharging pressure by the correction of the primary corrected base supercharging pressure at step 68 and the calculation of the new secondary predicted supercharging pressure and vane control input at step 69 are performed repeatedly.

An example of a routine for performing the target value setting logic correction according to the second embodiment will be explained. This example is shown in FIGS. 13 and 14. This routine is performed every a predetermined crank angle.

When the routine of FIG. 13 starts, first, at step 201, it is judged that the correction of the target value setting logic is needed.

When it is judged that the correction of the target value setting logic is needed, the routine proceeds to step 202.

On the other hand, when it is judged that the correction of the target value setting logic is not needed, the routine ends directly.

When it is judged that the correction of the target value setting logic is needed at step 201 and then, the routine proceeds to step 202, the delay control flag is set (Fdly←1). Thereby, the fuel injection amount delay control starts.

Next, at step 203, the count up of a delay counter Cdly starts. This counter Cdly represents the time elapsing from the setting of the delay control flag at step 202, that is, the time elapsing from the start of the fuel injection amount delay control.

Next, at step 204, a routine of FIG. 14 is performed.

When the routine of FIG. 14 starts, at step 261 to 264, the same processes as those of step 61 to 64 of FIG. 12 are performed.

Then, when it is judged that each predicted value calculated at step 263 satisfies each constraint condition at step 264 and then, the routine proceeds to step 272, the primary predicted supercharging pressure Pime1 and vane control input Sve1 calculated at step 263 are memorized as the look-ahead predicted supercharging pressure Pime and vane control input Sve, respectively and then, the routine proceeds to step 205 of FIG. 13.

When it is judged that each predicted value calculated at step 263 does not satisfy each constraint condition at step 264, the routine proceeds to step 265 and at step 265 to 267, the same processes as step 65 to 67 of FIG. 12 are performed.

When it is judged that each predicted value calculated at step 266 satisfies each constraint condition at step 267 and then, the routine proceeds to step 273, the secondary predicted supercharging pressure Pime2 and vane control input Sve2 calculated at step 266 are memorized as the look-ahead predicted supercharging pressure Pime and vane control input Sve, respectively and then, the routine proceeds to step 205 of FIG. 13.

When it is judged that each predicted value calculated at step 266 does not satisfy each constraint condition at step 267, the routine proceeds to step 268 and at step 268 to 270, the same processes as step 68 to 70 of FIG. 12 are performed.

When it is judged that each predicted value calculated at step 269 satisfies each constraint condition at step 270 and then, the routine proceeds to step 271, the secondary predicted supercharging pressure Pime2 and vane control input Sve2 calculated at step 269 are memorized as the look-ahead predicted supercharging pressure Pime and vane control input Sve, respectively and then, the routine proceeds to step 205 of FIG. 13.

At step 205 of FIG. 13, it is judged if the delay counter Cdly is larger than a predetermined value Cdlyth or more (Cdly≥Cdlyth).

When it is judged that Cdly≥Cdlyth, the routine proceeds to step 206. On the other hand, when it is not judged that Cdly≥Cdlyth, the routine returns to step 205. That is, in this routine, the routine does not proceed to step 206 until it is judged that Cdly≥Cdlyth at step 205.

The predetermined value Cdlyth is set to correspond to the time period during which the fuel injection amount delay control should be performed.

When it is judged that Cdly≥Cdlyth at step 205 and then, the routine proceeds to step 206, the delay control flag Fdly is reset. Thereby, the fuel injection amount delay control is terminated.

Next, at step 207, the count up of the delay counter Cdly is terminated and cleared.

Next, at step 208, the supercharging pressure Pim and the vane control input Sv at this time (i.e. at the delay control ending time) are acquired.

Next, at step 209, the deviation ΔPim of the look-ahead predicted supercharging pressure memorized at step 272 or 271 or 273 relative to the supercharging pressure acquired at step 208 and the deviation ΔSv of the look-ahead predicted vane control input memorized at step 272 or 271 or 273 relative to the vane control input acquired at step 208 are calculated.

Next, at step 210, correction values K1, K2 . . . Kn relating to the logic coefficients of the target value setting logic are calculated on the basis of the deviations ΔPim and ΔSv calculated at step 209.

Next, at step 211, the logic coefficients are corrected by the correction values K1, K2 . . . Kn calculated at step 210 and then, the routine ends.

The second embodiment is one which the invention is applied to the control device for controlling the vanes and the EGR control valve to accomplish the target supercharging pressure and the target EGR rate in the engine comprising the supercharger and the EGR device.

In this regards, the invention can be applied to the control device for controlling the vanes, the EGR control valve and the throttle valve to accomplish the target supercharging pressure and the target EGR rate in the engine comprising the supercharger, the EGR device and the throttle valve.

Further, the invention can be applied to the control device of the engine shown in FIG. 15. Except that the engine comprises an additional exhaust gas recirculation device, the constitution of the engine of FIG. 15 is the same as that of FIG. 1.

The additional exhaust gas recirculation device (hereinafter, this device may be referred to as —EGR device—) 55 has an exhaust gas recirculation passage (hereinafter, this passage may be referred to as —EGR passage—) 56, an exhaust gas recirculation valve (hereinafter, this valve may be referred to as —EGR control valve—) 57 and an exhaust gas recirculation cooler (hereinafter, this cooler may be referred to as —EGR cooler—) 58.

The EGR device 55 can introduce, into the intake passage 30 via the EGR passage 56, the exhaust gas discharged from the combustion chamber to the exhaust passage 40.

The EGR passage 56 is connected to the exhaust passage 40 downstream of the exhaust turbine 60T (particularly, the exhaust pipe 42 downstream of the exhaust turbine 60T) at its one end and is connected to the intake passage 30 upstream of the compressor 60C (particularly, the intake pipe 32 upstream of the compressor 60C) at its other end. That is, the EGR passage 56 connects the exhaust passage 40 to the intake passage 30.

The EGR control valve 57 is arranged in the EGR passage 56.

When the opening degree of the EGR control valve 57 (hereinafter, this degree may be referred to as —EGR control valve opening degree—) is changed, the amount of the exhaust gas passing through the EGR control valve 57 changes and therefore, the amount of the exhaust gas introduced into the intake passage 30 via the EGR passage 56 changes.

The EGR control valve 57 has therein an actuator (hereinafter, this actuator may be referred to as —EGR control valve actuator—) for changing its operation state (i.e. the EGR control valve opening degree). The EGR control valve actuator is electrically connected to the interface 85 of the electronic control unit 80.

The unit 80 gives, to the low pressure EGR control valve actuator, a control signal for driving the EGR control valve actuator to operate the EGR control valve 57.

The EGR device 55 introduces the exhaust gas from the exhaust passage 40 downstream of the turbine 60T to the intake passage upstream of the compressor 60C.

On the other hand, the EGR device 50 introduces the exhaust gas from the exhaust passage 40 upstream of the turbine 60T to the intake passage 30 downstream of the compressor 60C.

The pressure of the exhaust gas in the exhaust passage 40 downstream of the turbine 60T is lower than that upstream of the turbine 60T.

Therefore, in the engine of FIG. 15, the EGR device 50 may be referred to as —high pressure EGR device—, the EGR passage 51 may be referred to as —high pressure EGR passage—, the EGR control valve 52 may be referred to as —high pressure EGR control valve—, the EGR cooler 53 may be referred to as —high pressure EGR cooler—, the EGR device 55 may be referred to as —low pressure EGR device—, the EGR passage 56 may be referred to as —low pressure EGR passage—, the EGR control valve 57 may be referred to as —low pressure EGR control valve 57— and the EGR cooler 58 may be referred to as —low pressure EGR cooler—.

As shown in FIG. 15, the invention can be applied to the control device for controlling the vanes and the high and low pressure EGR control valves to accomplish the target supercharging pressure and the target EGR rate in the engine comprising the supercharger and the high and low pressure EGR devices and similarly, as shown in FIG. 15, the invention can be applied to the control device for controlling the vanes, the high and low pressure EGR control valves and the throttle valve to accomplish the target supercharging pressure and EGR rate in the engine comprising the supercharger, the high and low pressure EGR devices and the throttle valve.

Further, referring to the target amount of the exhaust gas introduced into the intake passage via the high pressure EGR passage as —target high pressure EGR gas amount— and referring to the target amount of the exhaust gas into the intake passage via the low pressure EGR passage as —target low pressure EGR gas amount—, as shown in FIG. 15, the invention can be applied to the control device for controlling the vanes and the high and low pressure EGR control valves to accomplish the target supercharging pressure and the target high and low pressure EGR gas amounts in the engine comprising the supercharger and the high and low pressure EGR devices and similarly, as shown in FIG. 15, the invention can be applied to the control device for controlling the vanes, the high and low pressure EGR control valves and the throttle valve to accomplish the target supercharging pressure and the target high and low pressure EGR gas amounts in the engine comprising the supercharger, the high and low pressure EGR devices and the throttle valve.

The third embodiment will be explained. The constitution of the third embodiment not explained below is the same as that of the first embodiment or can be obviously derived from the constitution of the first embodiment in consideration of the constitution of the third embodiment.

The engine which the control device of the third embodiment is applied is the engine of FIG. 1. The controls of the fuel injector, the throttle valve, the vanes and the EGR control valve of the third embodiment are the same as those of the first embodiment. The settings of the target fuel injection amount, throttle valve opening degree, supercharging pressure and EGR rate of the third embodiment are the same as those of the first embodiment.

According to the third embodiment, during the engine operation, the logic coefficients of the target value setting logic are corrected as follows.

That is, when it is necessary to correct the logic coefficients of the target value setting logic, the aforementioned fuel injection amount delay control is performed.

When this delay control is performed, the base fuel injection amount Qb is acquired from the map of FIG. 3(A) on the basis of the acceleration pedal depression amount Dac at the starting time of this control (hereinafter, this time may be referred to as —delay control starting time) and then, this acquired base amount is set as the target fuel injection amount, however, this set target amount is not used at once for the fuel injector control, while the target fuel injection amount used for the fuel injector control at the delay control starting time is continuously used for the fuel injector control during the time period until the delay control ends (hereinafter, this period may be referred to as —delay control period—).

Then, the target fuel injection amount set at the delay control starting time is used for the fuel injector control at the time when the delay control period has elapsed (i.t. when the delay control ends and hereinafter, this time may be referred to as —delay control ending time—).

On the other hand, also in the third embodiment, the same look-ahead logic as that of the first embodiment is prepared.

As explained above, when it is necessary to correct the logic coefficients of the target value setting logic and the fuel injection amount delay control starts, this look-ahead logic calculates the predicted supercharging pressure, EGR rate, vane control input and EGR control valve control input.

Further, in the third embodiment, a logic (hereinafter, this logic may be referred to as —simple look-ahead logic—) is prepared for calculating the change amounts of the look-ahead predicted supercharging pressure, EGR rate, vane control input and EGR control valve control input due to the change of the engine speed in the case that the engine speed changes during the delay control period on the basis of the change amount of the engine speed.

Then, in the case that the ending speed changes during the delay control period, the simple look-ahead logic calculates the change amounts of the look-ahead predicted supercharging pressure, EGR rate, vane control input and EGR control valve control input (hereinafter, these amounts may be collectively referred to as —look-ahead change amounts—) on the basis of the change amount of the engine speed and then, these calculated look-ahead change amounts are added to the corresponding look-ahead values (obviously, the look-ahead values are already calculated at the delay control starting time) to correct the look-ahead values (hereinafter, the corrected look-ahead value may be referred to as —corrected look-ahead value—).

Then, at the delay control ending time, the fuel injector control is performed using the target fuel injection amount set at the delay control starting time and then, the vanes and the EGR control valve are controlled according to the target supercharging pressure and EGR rate set by the target value setting logic on the basis of the fuel injection amount and the engine speed obtained as a result of the fuel injector control.

Then, the actual supercharging pressure, EGR rate, vane control input and EGR control valve control input at this time are acquired.

Then, these acquired actual supercharging pressure, EGR rate, vane control input and EGR control valve control input are compared with the corresponding corrected look-ahead values, respectively.

When there is a deviation between the actual supercharging pressure and the corrected look-ahead value (i.e. the look-ahead predicted supercharging pressure corrected by the look-ahead change amount) or between the actual EGR rate and the corrected look-ahead value (i.e the look-ahead predicted EGR rate corrected by the look-ahead change amount) or between the actual vane control input and the corrected look-ahead value (i.e. the look-ahead predicted vane control input corrected by the look-ahead change amount) or between the actual EGR control valve control input and the corrected look-ahead value (i.e. the look-ahead predicted EGR control valve control input corrected by the look-ahead change amount), the logic coefficients of the target value setting logic are corrected such that the deviation decreases.

This has an advantage that the target value setting logic can be corrected with a small calculation burden even when the engine speed changes during the delay control period. That is, as explained relating to the first embodiment, the look-ahead logic can calculate the look-ahead values with a small calculation burden.

Further, in the third embodiment, when the engine speed changes during the delay control period, the look-ahead values are not calculated again by the look-ahead logic on the basis of the changed engine speed, however, the change amounts of the look-ahead values due to the change of the engine speed are calculated by the simple look-ahead logic and then, these change amounts are added to the already calculated look-ahead values to calculate the look-ahead values on the basis of the changed engine speed.

That is, when the engine speed changes during the delay control period, the look-ahead values are calculated using the already calculated look-ahead values on the basis of the changed engine speed.

Therefore, the look-ahead values can be calculated on the basis of the changed engine speed with a small calculation burden.

Then, the logic coefficients of the target value setting logic is corrected using the calculated look-ahead values and therefore, as a result, the logic coefficients of the logic, therefore, the target value setting logic can be corrected with a small calculation burden.

An example of a routine for performing the target value setting logic correction according to the second embodiment will be explained. This example is shown in FIGS. 16 to 18. This routine is performed every a predetermined crank angle.

When the routine of FIG. 16 starts, at steps 301 to 307, the same processes as those of steps 101 to 107 of FIG. 8. In step 304, at steps 341 to 353 of FIG. 18, the same processes as those of steps 141 to 153.

Then, at step 307A of FIG. 17 following step 307, the look-ahead change amounts memorized at step 368 of FIG. 19 (i.e. the look-ahead predicted supercharging pressure, EGR rate, vane control input and EGR control valve control input change amounts A Pime, ΔRegre, ΔSve and ΔSegre) are acquired.

Next, at step 307B, the look-ahead change amounts ΔPime, ΔRegre, ΔSve and ΔSegre acquired at step 307A are added to the look-ahead values memorized at step 352 or 351 or 353 (i.e. the look-ahead predicted supercharging pressure, EGR rate, vane control input and EGR control valve control input Pime, Regre, Sve and Segre), respectively to correct the look-ahead values memorized at step 352 or 351 or 353.

Next, at step 308, the supercharging pressure Pim, the EGR rate Regr, the vane control input Sv and the EGR control valve control input Segr at this time (i.e. at the delay control ending time) are acquired.

Next, at step 309, the deviation ΔPim of the look-ahead predicted supercharging pressure corrected at step 307B relative to the supercharging pressure acquired at step 308, the deviation ΔRegr of the look-ahead predicted EGR rate corrected at step 307B relative to the EGR rate acquired at step 308, the deviation ΔSv of the look-ahead predicted vane control input corrected at step 307B relative to the vane control input acquired at step 308 and the deviation ΔSegr of the look-ahead predicted EGR control valve control input corrected at step 307B relative to the EGR control vale control input acquired at step 308 are calculated.

Next, at step 310, correction values K1, K2 . . . Kn relating to the logic coefficients of the target value setting logic are calculated on the basis of the deviations ΔPim, ΔRegr, ΔSv and ΔSegr calculated at step 309.

Next, at step 311, the logic coefficients are corrected by the correction values K1, K2 . . . Kn calculated at step 310 and then, the routine ends.

An example of a routine for performing the look-ahead change amount calculation according to the third embodiment will be explained. This example is shown in FIG. 19. This routine is performed every a predetermined crank angle.

When the routine of FIG. 19 starts, first, at step 361, it is judged if a delay control flag Fdly is set (Fdly=1). This flag Fdly is set at step 302 of FIG. 16 and is reset at step 306 of FIG. 16. That is, this flag Fdly is set when the fuel injection amount delay control is performed and is reset when this control is not performed.

When it is judged that Fdly=1 at step 361, that is, when the fuel injection amount delay control is performed, the routine proceeds to step 362.

On the other hand, when it is not judged that Fdly=1, that is, when the fuel injection amount delay control is not performed, the routine ends directly.

When it is judged that Fdly=1 at step 361 and the routine proceeds to step 362, the current fuel injection amount Q is acquired.

Next, at step 363, the current engine speed NE(k) and the engine speed at the last performance of this routine NE(k−1) are acquired.

Next, at step 364, by subtracting the engine speed at the last performance of this routine acquired at step 363 from the current engine speed acquired at step 363, the change amount $\Delta NE$ (=NE(k)−NE(k−1)) of the engine speed from the last performance of this routine to the present time is calculated.

Next, at step 365, by the simple look-ahead logic, the change amounts of the look-ahead values due to the change of the engine speed from the last performance of this routine to the present time (i.e. the change amounts dPime, dRegre, dSve and dSegre of the look-ahead predicted supercharging pressure, EGR rate, vane control input and EGR control valve control input and hereinafter, these amounts may be collectively referred to as —instant look-ahead change amounts—) are calculated using the fuel injection amount Q acquired at step 362 and the change amount $\Delta NE$ of the engine speed calculated at step 364.

Next, at step 366, by adding the instant look-ahead change amounts dPime, dRegre, dSve and dSegre calculated at step 365 to the look-ahead change amounts calculated at step 366 at the last performance of this routine (i.e. the change amounts $\Delta Pime(k-1)$, $\Delta Regre(k-1)$, $\Delta Sve(k-1)$ and $\Delta Segre(k-1)$ of the look-ahead predicted supercharging pressure, EGR rate, vane control input and EGR control valve control input), new look-ahead change amounts (i.e. new change amounts $\Delta Pime(k)$, $\Delta Regre(k)$, $\Delta Sve(k)$ and $\Delta Segre(k)$ of the look-ahead predicted supercharging pressure, EGR rate, vane control input and EGR control valve input) are calculated.

Next, at step 367, it is judged if the delay control flag Fdly is reset (Fdly=0). When it is judged that Fdly=0, that is, when the fuel injection amount delay control has ended, the routine proceeds to step 368. On the other hand, when it is not judged that Fdly=0, that is, when the fuel injection amount delay control is performed, the routine returns to step 363. That is, in this routine, steps 363 to 367 are performed repeatedly until it is judged that Fdly=0 at step 367.

When it is judged that Fdly=0 at step 367 and the routine proceeds to step 368, the latest look-ahead change amounts $\Delta Pime(k)$, $\Delta Regre(k)$, $\Delta Sve(k)$ and $\Delta Segre(k)$ calculated at step 366 are memorized as the final look-ahead change amounts (i.e. the change amounts $\Delta Pime(k)$, $\Delta Regre$, $\Delta Sve$ and $\Delta Segre$ of the look-ahead predicted supercharging pressure, EGR rate, vane control input and EGR control valve control input) and then, the routine ends.

The third embodiment is one which the invention is applied to the control device for controlling the vanes and the EGR control valve to accomplish the target supercharging pressure and the target EGR rate in the engine comprising the supercharger and the EGR device.

In this regards, the concept of the third embodiment can be applied to the control device for controlling the vanes to accomplish the target supercharging pressure in the engine comprising the supercharger without the EGR device and can be applied to the control device for controlling the EGR control valve to accomplish the target EGR rate in the engine comprising the EGR device without the supercharger.

An embodiment which the concept of the invention in the third embodiment is applied to the control device of the engine comprising the supercharger without the EGR device (hereinafter, this embodiment may be referred to as —fourth embodiment—) will be explained. The constitution of the fourth embodiment not explained below is the same as that of the second embodiment or can be obviously derived from the constitution of the second embodiment in consideration of the constitution of the fourth embodiment.

The engine which the control device of the fourth embodiment is applied is shown in FIG. 10. The controls of the fuel injector, the throttle valve and the vanes of the fourth embodiment are the same as those of the second embodiment. The settings of the target fuel injection amount, throttle valve opening degree and supercharging pressure are the same as those of the second embodiment.

According to the fourth embodiment, during the engine operation, the logic coefficients of the target value setting logic are corrected as follows. That is, when it is necessary to correct the logic coefficients of the logic, the aforementioned fuel injection amount delay control is performed.

When this delay control starts, the base fuel injection amount Qb is acquired from the map of FIG. 11(A) on the basis of the acceleration pedal depression amount Dac at the starting time of this control (hereinafter, this time may be referred to as —delay control starting time—) and then, this acquired base amount is set as the target fuel injection amount, however, this set target amount is not used at once for the fuel injector control, while the target amount used for the fuel injector control at the delay control starting time is continuously used for the fuel injector control until the fuel injection amount delay control ends (hereinafter, this may be referred to as —delay control period—).

Then, the target fuel injection amount set at the delay control starting time is used for the fuel injector control when the delay control period has elapsed (i.e. when the fuel injection amount delay control ends and hereinafter, this may be referred to as —delay control ending time—).

On the other hand, also in the second embodiment, the same logic as that of the second embodiment is prepared.

As explained above, when it is necessary to correct the logic coefficients of the target value setting logic and the fuel injection amount delay control starts, the look-ahead predicted supercharging pressure and vane control input are calculated by the look-ahead logic.

Further, in the fourth embodiment, a logic (hereinafter, this logic may be referred to as —simple look-ahead logic—) is prepared for calculating the change amounts of the look-ahead predicted supercharging pressure and vane control input due to the change of the engine speed in the case that the engine speed changes during the delay control period on the basis of the change amount of the engine speed.

Then, when the engine speed changes during the delay control period, the change amounts of the look-ahead predicted supercharging pressure and vane control input (hereinafter, these change amounts are collectively referred to as —look-ahead change amounts—) are calculated by the simple look-ahead logic on the basis of the change amount of the engine speed and then, these calculated look-ahead change amounts are added to the corresponding look-ahead values (obviously, the look-ahead values are already calculated at the delay control starting time) to correct the look-ahead values (hereinafter, the corrected look-ahead value may be referred to as —corrected look-ahead value—).

Then, at the delay control ending time, the fuel injector control is performed using the target fuel injection amount set at the delay control starting time and then, the vanes are controlled according to the target supercharging pressure set by the target value setting logic on the basis of the fuel injection amount and the engine speed obtained as a result of the fuel injector control.

Then, the actual supercharging pressure and vane control input at this time are acquired.

Then, these acquired actual supercharging pressure and vane control input are compared with the corresponding corrected look-ahead values, respectively.

When there is a deviation between the actual supercharging pressure and the corrected look-ahead value (i.e. the look-ahead predicted supercharging pressure corrected by the look-ahead change amount) or between the actual vane control input and the corrected look-ahead value (i.e. the look-ahead predicted vane control input corrected by the look-ahead change amount), the logic coefficients of the target value setting logic are corrected such that the deviation decreases.

This has an advantage that the target value setting logic can be corrected with a small calculation burden even when the engine speed changes during the delay control period. That is, as explained relating to the second embodiment, the look-ahead logic can calculate the look-ahead values with a small calculation burden.

Further, in the fourth embodiment, when the engine speed changes during the delay control period, the look-ahead values are not calculated again by the look-ahead logic on the basis of the changed engine speed, however, the change amounts of the look-ahead values due to the change of the engine speed are calculated by the simple look-ahead logic and then, these change amounts are added to the already calculated look-ahead values to calculate the look-ahead values on the basis of the changed engine speed.

That is, when the engine speed changes during the delay control period, the look-ahead values are calculated using the already calculated look-ahead values on the basis of the changed engine speed. Therefore, the look-ahead values can be calculated on the basis of the changed engine speed with a small calculation burden.

Then, the logic coefficients of the target value setting logic is corrected using the calculated look-ahead values and therefore, as a result, the logic coefficients of the logic, therefore, the target value setting logic can be corrected with a small calculation burden.

An example of a routine for performing the target value setting logic correction according to the fourth embodiment will be explained. This example is shown in FIGS. 20 to 22. This routine is performed every a predetermined crank angle.

When the routine of FIG. 20 starts, at steps 401 to 407, the same processes as those of steps 201 to 207 of FIG. 13. In step 404, at steps 461 to 473 of FIG. 22, the same processes as those of steps 261 to 273.

Then, at step 407A of FIG. 21 following step 407, the look-ahead change amounts memorized at step 488 of FIG. 23 (i.e. the look-ahead predicted supercharging pressure and vane control input change amounts ΔPime and ΔSve) are acquired.

Next, at step 407B, the look-ahead change amounts ΔPime, and ΔSve acquired at step 407A are added to the look-ahead values memorized at step 472 or 471 or 473 (i.e. the look-ahead predicted supercharging pressure and vane control input Pime and Sve), respectively to correct the look-ahead values memorized at step 472 or 471 or 473.

Next, at step 408, the supercharging pressure Pim and the vane control input Sv at this time (i.e. at the delay control ending time) are acquired.

Next, at step 409, the deviation ΔPim of the look-ahead predicted supercharging pressure corrected at step 407B relative to the supercharging pressure acquired at step 408 and the deviation ΔSv of the look-ahead predicted vane control input corrected at step 407B relative to the vane control input acquired at step 408 are calculated.

Next, at step 410, correction values K1, K2 ... Kn relating to the logic coefficients of the target value setting logic are calculated on the basis of the deviations ΔPim and ΔSv calculated at step 409.

Next, at step 411, the logic coefficients are corrected by the correction values K1, K2 ... Kn calculated at step 410 and then, the routine ends.

An example of a routine for performing the look-ahead change amount calculation according to the fourth embodiment will be explained. This example is shown in FIG. 23. This routine is performed every a predetermined crank angle.

When the routine of FIG. 23 starts, first, at step 481, it is judged if a delay control flag Fdly is set (Fdly=1). This flag Fdly is set at step 402 of FIG. 20 and is reset at step 406 of FIG. 20. That is, this flag Fdly is set when the fuel injection amount delay control is performed and is reset when this control is not performed.

When it is judged that Fdly=1 at step 481, that is, when the fuel injection amount delay control is performed, the routine proceeds to step 482.

On the other hand, when it is not judged that Fdly=1, that is, when the fuel injection amount delay control is not performed, the routine ends directly.

When it is judged that Fdly=1 at step 481 and the routine proceeds to step 482, the current fuel injection amount Q is acquired.

Next, at step 483, the current engine speed NE(k) and the engine speed at the last performance of this routine NE(k−1) are acquired.

Next, at step 484, by subtracting the engine speed at the last performance of this routine acquired at step 483 from the current engine speed acquired at step 483, the change amount ΔNE (=NE(k)−NE(k−1)) of the engine speed from the last performance of this routine to the present time is calculated.

Next, at step 485, by the simple look-ahead logic, the change amounts of the look-ahead values due to the change of the engine speed from the last performance of this routine to the present time (i.e. the change amounts dPime and dSve of the look-ahead predicted supercharging pressure and vane control input and hereinafter, these amounts may be collectively referred to as —instant look-ahead change amounts—) are calculated using the fuel injection amount Q acquired at step 482 and the change amount ΔNE of the engine speed calculated at step 484.

Next, at step 486, by adding the instant look-ahead change amounts dPime and dSve calculated at step 485 to the look-ahead change amounts calculated at step 486 at the last performance of this routine (i.e. the change amounts ΔPime (k−1) and ΔSve(k−1) of the look-ahead predicted supercharging pressure and vane control input), new look-ahead change amounts (i.e. new change amounts ΔPime(k) and ΔSve(k) of the look-ahead predicted supercharging pressure and vane control input) are calculated.

Next, at step 487, it is judged if the delay control flag Fdly is reset (Fdly=0). When it is judged that Fdly=0, that is, when the fuel injection amount delay control has ended, the routine proceeds to step 488. On the other hand, when it is not judged that Fdly=0, that is, when the fuel injection amount delay control is performed, the routine returns to step 483. That is, in this routine, steps 483 to 487 are performed repeatedly until it is judged that Fdly=0 at step 487.

When it is judged that Fdly=0 at step 487 and the routine proceeds to step 488, the latest look-ahead change amounts ΔPime(k) and ΔSve(k) calculated at step 486 are memorized as the final look-ahead change amounts (i.e. the change amounts ΔPime(k) and ΔSve of the look-ahead predicted supercharging pressure and vane control input) and then, the routine ends.

Next, one of the concrete examples of the target value setting logic of the first embodiment will be explained.

The concrete example explained below relates to the target value setting logic of the first embodiment, however, can be used as the concrete example of the target value setting logic of the second to fourth embodiments by adding the correction obviously derived in consideration of the functions of the target value setting logics of the second to fourth embodiments to the concrete example explained below.

The concrete example explained below is premised on the target value follow control architecture shown in FIG. 24.

In FIG. 24, the term "W" is a vector representing the fuel injection amount and the engine speed and hereinafter, this may be referred to as —parameter vector—.

The term "r" is a vector representing the base supercharging pressure and EGR rate and hereinafter, this may be referred to as base value vector.

The term "g" is a vector representing the target supercharging and EGR rate and hereinafter, this may be referred to as target value vector.

The term "e" is a vector representing the supercharging pressure and EGR rate deviations and hereinafter, this may be referred to as —deviation vector—.

The term "u" is a vector representing the vane and EGR control valve control inputs, that is, the vane and EGR control valve manipulation amounts and hereinafter, this may be referred to as control input vector.

The term "x" is a vector representing the controlled outputs of the supercharger and the EGR device, that is, the actual supercharging pressure and EGR rate and hereinafter, this may be referred to as internal state vector.

The term "y" is a vector representing the controlled outputs of the supercharger and the EGR device, that is, the actual supercharging pressure and EGR rate and hereinafter, this may be referred to as —controlled output vector—.

The term "z" is a vector representing the constraint signals relating to the control input and output and hereinafter, this may be referred to as —constraint signal vector—.

In the architecture of FIG. 24, the fuel injection amount and the engine speed are input to a base value acquisition part. The vector representing these input fuel injection amount and engine speed is the parameter vector W.

In the base value acquisition part, the base supercharging pressure and EGR rate are acquired on the basis of the input fuel injection amount and engine speed and then, these base supercharging pressure and EGR rate are output from the base value acquisition part. The vector representing these output base supercharging pressure and EGR rate is the base value vector r.

The base supercharging pressure and EGR rate output from the base value acquisition part are input to a target value setting part.

In the target value setting part, the input base supercharging pressure and EGR rate are corrected by the target value setting logic to set the target supercharging pressure and EGR rate and then, these target supercharging pressure and EGR rate are output from the target value setting part. The vector representing these output target supercharging pressure and EGR rate is the target value vector g.

Then, the deviation between the target supercharging pressure output from the target value setting part and the actual supercharging pressure (i.e. the supercharging pressure deviation) and the deviation between the target EGR rate output from the target value setting part and the actual EGR rate (i.e. the EGR rate deviation) are calculated.

The vector representing these calculated supercharging pressure and EGR rate deviations is the deviation vector e and the vector representing the actual supercharging pressure and EGR rate used for the calculation of these supercharging pressure and EGR rate deviations is the internal state vector x.

The calculated supercharging pressure and EGR rate deviations are input to a feedback controller (this controller is indicated as —FB controller— in FIG. 24).

The actual supercharging pressure and EGR rate are input to the feedback controller. The vector representing these actual supercharging pressure and EGR rate input to the controller is the internal state vector x.

In the feedback controller, the vane and EGR control valve manipulation amounts are calculated on the input supercharging pressure and EGR rate deviations and the actual supercharging pressure and EGR rate and then, these manipulation amounts are output from the controller. The vector representing these output manipulation amount is the control input vector u.

The vane and EGR control valve manipulation amounts output from the controller are input to the vane and EGR control valve actuators, respectively.

In FIG. 24, the vane actuator, the vane, the EGR control valve actuator and the EGR control valve are indicated as —controlled object—.

Then, by inputting the vane and EGR control valve manipulation amounts to the controlled objects, the supercharging pressure and the EGR rate as the internal states of the controlled objects occur as the controlled outputs. The vector representing these supercharging pressure and the EGR rate is the internal state and controlled output vectors x and y.

Further, a constraint signal relating to the vane and EGR control valve manipulation amounts output from the feedback controller and a constraint signal relating to the supercharging pressure and the EGR rate as the internal states of the controlled objects are output. The vector representing these constraint signals is the constraint signal vector z.

As can be understood from the above explanation, the portion enclosed by the chain line in FIG. 24 constitutes a closed loop system.

Regarding the closed loop system of FIG. 24, referring to the time when a predetermined time has elapsed from the present time as —one step later time—, indicating the present time and the one step later time as —k— and —k+1—, respectively and indicating the internal state vector representing the internal state of the controlled object at the present time, the internal state vector representing the internal state of the controlled object at the one step later time, the target value vector representing the target value input to the closed loop system at the present time, the controlled output vector representing the controlled output of the controlled object at the present time and the constraint signal vector representing the constraint signal at the present time as —x(k)—, —x(k+1)—, —g(k)—, —y(k)— and —z(k)—, the state equations of the following formulas 2 to 4 hold.

The terms "A" and "B" in the formula 2 and the terms "C" and "D" are coefficient matrixes obtained by the system identification and the linearization technique of the physics model.

[Formula 1]

$$x(k+1)=Ax(k)+Bg(k) \tag{2}$$

$$y(k)=x(k) \tag{3}$$

$$z(k)=Cx(k)+Dg(k) \tag{4}$$

Then, the base value vector having, as elements, the base values acquired on the basis of the fuel injection amount and the engine speed is applied to the target value vector g(k) of the formulas 2 to 4 to calculate the constraint signal vector z(k).

Then, when the calculated constraint signal vector satisfies a constraint relating thereto, the base value constituting the base value vector applied to the target value vector for the calculation of the constraint signal vector is the target value satisfying the constraint.

On the other hand, when the calculated constraint signal vector does not satisfy the constraint relating thereto, the base values are corrected according to a predetermined rule and then, the base value vector having the corrected base values (hereinafter, this value may be referred to as —primary corrected base value—) as elements to the target value vector g(k) of the formulas 2 to 4 to calculate the constraint signal vector z(k).

Then, when this calculated constraint signal vector satisfies the constraint relating thereto, the primary corrected base value constituting the base value vector applied to the target value vector for the calculation of this constraint signal vector is the target value satisfying the constraint.

On the other hand, when this calculated constraint signal vector does not satisfy the constraint relating thereto, the primary corrected base value is corrected again according to the aforementioned predetermined rule and then, the base value vector having this corrected base value (hereinafter, this value may be referred to as —secondary corrected base value—) as elements is applied to the target value vector g(k) of the formula 2 to 4 to calculate the constraint signal vector z(k).

Then, when this calculated constraint signal vector satisfies the constraint relating thereto, the secondary corrected base value constituting the base value vector applied to the target value vector for the calculation of the constraint signal vector is the target value satisfying the constraint condition and on the other hand, when the constraint signal vector does not satisfy the constraint relating thereto, the secondary corrected base value is corrected again according to the aforementioned predetermined rule.

Then, thereafter, the correction of the secondary corrected base value is performed until the constraint signal vector calculated by applying the base value vector having the secondary corrected base value as elements to the target value vector g(k) satisfies the constraint relating thereto and the secondary corrected base value when the constraint signal vector satisfies the constraint relating thereto is the target value for making the constraint signal vector satisfy the constraint relating thereto.

The logic for calculating the base value for making the constraint signal vector satisfy the constraint relating thereto by using the formulas 2 to 4 and then, setting this calculated base value as the target value is the concrete example of the target value setting logic of the first embodiment.

As can be understood from this, this concrete example of the target value setting logic is a logic using a so-called reference governor.

One of the concrete example of the look-ahead logic of the first embodiment will be explained.

The concrete example of the look-ahead logic explained below is the example relating to the look-ahead logic of the first embodiment and can be used as the concrete example of the look-ahead logic of the second to fourth embodiments by adding the correction obviously derived in consideration of the functions of the look-ahead logics of the second to fourth embodiments to the concrete example of the look-ahead logic explained below.

Referring to the vector representing the internal state vectors x(k)–x(k+N−1) from the present time to the N step later time as —X vector— and indicating it as $x_{vec}$, the X vector $x_{vec}$ is expressed by the following formula 5.

Referring to the vector representing the target value vectors g(k)–g(k+N−1) indicating the target values from the present time to the N step later time as —G vector— and indicating it as —$g_{vec}$—, the G vector $g_{vec}$ is expressed by the following formula 6.

Referring to the vector representing the controlled output vectors y(k)–y(k+N−1) indicating the controlled outputs from the present time to the N step later time as —V vector— and indicating it as —$y_{vec}$—, the Y vector $y_{vec}$ is expressed by the following formula 7.

Referring to the vector representing the constraint signal vectors z(k)–z(k+N−1) indicating the constraint signals from the present time to the N step later time as —Z vector— and indicating it as —$Z_{vec}$—, the Z vector $z_{vec}$ is expressed by the following formula 8.

[Formula 2]

$$x_{vec}=[x(k)x(k+1)x(k+2)\ldots x(k+N-1)]^T \tag{5}$$

$$g_{vec}=[g(k)g(k+1)g(k+2)\ldots g(k+N-1)]^T \tag{6}$$

$$y_{vec}=[y(k)y(k+1)y(k+2)\ldots y(k+N-1)]^T \tag{7}$$

$$z_{vec}=[z(k)z(k+1)z(k+2)\ldots z(k+N-1)]^T \tag{8}$$

Then, expressing the X, G, Y and Z vectors $x_{vec}$, $g_{vec}$, $y_{vec}$ and $z_{vec}$ as explained above, the Y and Z vectors $y_{vec}$ and $z_{vec}$ are expressed by the following formulas 9 and 10, respectively using the X and G vectors $x_{vec}$ and $g_{vec}$ on the basis of the formulas 2 to 4.

The terms "F" and "G" in the formula 9 and "H" and "J" in the formula 10 are coefficient matrixes obtained by the system identification or the linearization technique of the physics model, respectively.

[Formula 3]

$$y_{vec}=Fx_{vec}+Gg_{vec} \tag{9}$$

$$z_{vec}=Hx_{vec}+Jg_{vec} \tag{10}$$

Then, regarding the closed loop system of FIG. 24, referring to the vector expressing the look-ahead value of the internal state of the controlled object as —look-ahead internal state vector—, referring to the vector expressing the look-ahead value of the target value input to the closed loop system as —look-ahead target value vector—, referring to the vector expressing the look-ahead value of the controlled output of the controlled object as —look-ahead predicted controlled output vector—, indicating the look-ahead internal state vector expressing the look-ahead value of the internal state of the controlled object at the present time as —$x_{est}(k)$—, indicating the look-ahead internal state vector expressing the look-ahead value of the internal state of the controlled object at the one step later time as —$x_{est}(k+1)$—, indicating the look-ahead target value vector expressing the look-ahead value of the target value at the present time input to the closed loop system as —$g_{est}(k)$— and indicating the look-ahead predicted controlled output vector expressing the look-ahead value of the controlled output of the controlled object at the present time as —$y_{est}(k)$—, similar to the formulas 2 to 4, the following formulas 11 to 13 hold.

The terms "A" and "B" in the formula 11 and "C" and "D" in the formula 13 are the same coefficient matrixes as that A and B of the formula 2 and that C and D of the formula 4, respectively.

[Formula 4]

$$x_{est}(k+1)=Ax_{est}(k)+Bg_{est}(k) \quad (11)$$

$$y_{est}(k)=x_{est}(k) \quad (12)$$

$$z_{est}(k)=Cx_{est}(k)+Dg_{est}(k) \quad (13)$$

Referring to the vector expressing the look-ahead internal state vector $x_{est}(k)$ to $x_{est}(k+N-1)$ from the present time to the N step later time as —look-ahead X vector— and indicating it as —$x_{est-vec}$—, the look-ahead X vector $x_{est-vec}$ is expressed by the following formula 14 similar to the formula 5.

Referring the vector expressing the look-ahead target value vector $g_{est}(k)$ to $g_{est}(k+N-1)$ from the present time to the N step later time as —look-ahead G vector— and indicating it as —$g_{est-vec}$—, the look-ahead G vector $g_{est-vec}$ is expressed by the following formula 15 similar to the formula 6.

Referring the vector expressing the look-ahead predicted controlled output vector $y_{est}(k)$ to $y_{est}(k+N-1)$ from the present time to the N step later time as —look-ahead Y vector— and indicating it as —$y_{est-vec}$—, the look-ahead Y vector $y_{est-vec}$ is expressed by the following formula 16 similar to the formula 7.

Referring to the vector expressing the look-ahead value of the constraint signal as —look-ahead constraint signal vector—, referring to the look-ahead constraint signal vector $z_{est}(k)$ to $z_{est}(k+N-1)$ from the present time to the N step later time as —look-ahead Z vector— and indicating it as —$z_{est-vec}$—, the look-ahead Z vector $z_{est-vec}$ is expressed by the following formula 17, similar to the formula 8.

[Formula 5]

$$x_{est-vec}=[x_{est}(k)x_{est}(k+1)x_{est}(k+2) \ldots x_{est}(k+N-1)]^T \quad (14)$$

$$g_{est-vec}=[g_{est}(k)g_{est}(k+1)g_{est}(k+2) \ldots g_{est}(k+N-1)]^T \quad (15)$$

$$y_{est-vec}=[y_{est}(k)y_{est}(k+1)y_{est}(k+2) \ldots y_{est}(k+N-1)]^T \quad (16)$$

$$z_{est-vec}=[z_{est}(k)z_{est}(k+1)z_{est}(k+2) \ldots z_{est}(k+N-1)]^T \quad (17)$$

Then, expressing the look-ahead X, G, Y and Z vectors $z_{est-vec}$, $g_{est-vec}$, $y_{est-vec}$ and $z_{est-vec}$ as explained above, the look-ahead Y and Z vectors $y_{est-vec}$ and $z_{est-vec}$ are expressed by the following formulas 18 and 19, respectively using the look-ahead X and G vectors $z_{est-vec}$ and $g_{est-vec}$ on the basis of the formulas 11 to 13, similar to the formulas 9 and 20.

The terms "F" and "G" in the formula 18 and "H" and "J" in the formula 19 are the same coefficient matrixes as those F and G in the formula 9 and those H and J in the formula 10.

[Formula 6]

$$y_{est-vec}=Fx_{est-vec}+Gg_{est-vec} \quad (18)$$

$$z_{est-vec}=Hx_{est-vec}+Jg_{est-vec} \quad (19)$$

Then, the look-ahead Y and Z vectors $y_{est-vec}$ and $z_{est-vec}$ can be calculated using the formulas 18 and 19.

The logic for calculating the look-ahead Y and Z vectors using the formulas 18 and 19 as explained above is the concrete example of the look-ahead logic of the first embodiment.

The correction of the logic coefficients of the target value setting logic in the case that the concrete examples of the aforementioned target value setting and look-ahead logics will be explained.

When the fuel injection amount delay control starts, during the delay control period, assuming that the fuel injection amount and the engine speed are maintained at those at the delay control starting time, the look-ahead Y and Z vectors from the delay control starting time to the delay control ending time are calculated by the look-ahead logic using these fuel injection amount and the engine speed.

On the other hand, when the fuel injection amount control ends, the target value vector is calculated by the target value setting logic using the fuel injection amount and the engine speed from the delay control starting time to the delay control ending time and then, the control of the controlled objects is performed according to the target value expressing by the calculated target value vectors.

Then, the Y vector is acquired on the basis of the controlled output when the control of the controlled objects is performed according to these target value (i.e. the controlled output from the delay control ending time to the time after the delay control period has elapsed) and the Z vector is acquired on the basis of the control input when the control of the controlled objects is performed according to the target value (the control input from the delay control ending time to the time after the delay control period) and the controlled output.

Then, when there is a deviation between the acquired Y vector and the calculated look-ahead Y vector or between the acquired Z vector and the calculated look-ahead Z vector, the coefficient matrixes A, B, C and D of the target value setting logic are corrected such that the deviation decreases.

That is, the logic coefficients of the target value setting logic is corrected.

FIG. 25 shows a flow of the correction of the coefficient matrixes of the target value setting logic of the first embodiment in the case that the aforementioned target value setting and look-ahead logics are employed.

In FIG. 25, "$W_{vec}$" is a vector having vectors as elements having parameters for the base value acquisition as elements, "$W_{dly-vec}$" is a vector $W_{vec}$ delayed for the time period corresponding to the delay control period, "$r_{vec}$" is a vector having vectors as elements having the base values as elements, "$g_{vec}$" is a vector having vectors as elements having the target values as elements, "$y_{vec}$" is the Y vector, "$z_{vec}$" is the Z vector, "$y_{est-vec}$" is the look-ahead Y vector, "$z_{est-vec}$" is the look-ahead Z vector, "$y_{dly-est-vec}$" the look-ahead Y vector delayed for the time period corresponding to the delay control period and "$z_{dly-est-vec}$" is the look-ahead Z vector delayed for the time period corresponding to the delay control period.

Further, the Z vector includes the actual control inputs as its elements and the look-ahead Z vector includes the look-ahead predicted control inputs as its elements and therefore, the correction of the coefficient matrixes of the target value setting logic on the basis of the deviation between the acquired Z vector and the calculated look-ahead Z vector can be deemed as that on the basis of the deviation between the actual control input and the look-ahead predicted control input.

Similarly, the Z vector includes the actual controlled outputs as its elements and the look-ahead Z vector includes the look-ahead predicted controlled outputs as its elements and therefore, the correction of the coefficient matrixes of the target value setting logic on the basis of the deviation between the acquired Z vector and the calculated look-ahead Z vector can be deemed as that on the basis of the deviation between the actual controlled output and the look-ahead predicted controlled output.

For example, a technique such as an interactive least squares technique may be used for the correction of the coefficient matrixes of the target value setting logic.

Next, one of the concrete examples of the target value setting logic of the third embodiment will be explained.

The concrete example explained below of the simple look-ahead logic is premised on the employment of the aforementioned target value setting and look-ahead logics as the target value setting and look-ahead logics, respectively.

The concrete example explained below relates to the simple look-ahead logic of the third embodiment, however, can be used as the concrete example of the simple look-ahead logic of the fourth embodiment by adding the correction obviously derived in consideration of the functions of the simple look-ahead logic of the fourth embodiment to the simple look-ahead logic explained below.

Expressing the coefficient matrix having only elements multiplying the engine speed among the elements of the coefficient matrix B of the formula 2 as —Bn—, expressing the coefficient matrix having only elements multiplying the engine speed among the elements of the coefficient matrix D of the formula 4 as —Dn—, expressing the matrix having only engine speed as elements and expressing the transfer function from the engine speed to the controlled output and the constraint signal as —Tn—, the transfer function Tn can be expressed by the following formulas 20 to 22.

[Formula 7]

$$x(k+1)=Ax(k)+BnWn(k) \quad (20)$$

$$y(k)=x(k) \quad (21)$$

$$z(k)=Cx(k)+DnWn(k) \quad (22)$$

In the concrete example of the simple look-ahead logic of the third embodiment, when the fuel injection amount delay control starts, during the delay control period, the change amount of the engine speed is acquired every one step under the condition where a predetermined time period sufficiently shorter than the delay control period is set as one step.

Then, the controlled output vectors corresponding to the change of the engine speed every one step (hereinafter, this controlled output vector may be referred to as —look-ahead predicted controlled output change vector—) are calculated from the formulas 20 to 22 using these acquired change amounts of the engine speed as the engine speed in the transfer function Tn and the constraint signal vectors corresponding to the engine speed change every one step (hereinafter, this constraint signal vector may be referred to as —look-ahead constraint signal change vector—) are calculated.

Then, the vector having the calculated look-ahead predicted controlled output change vectors as elements (hereinafter, this vector may be referred to as —look-ahead Y change vector—) is calculated and the vector having the calculated look-ahead constraint signal change vectors as elements (hereinafter, this vector may be referred to as —look-ahead Z change vector—) is calculated.

This logic for calculating the look-ahead Y and Z change vectors as explained above is the concrete example of the simple look-ahead logic of the third embodiment.

The correction of the logic coefficients of the target value setting logic in the case that the concrete examples of the aforementioned simple look-ahead logic will be explained.

When the fuel injection amount delay control starts, the look-ahead Y and Z change vectors are calculated by the simple look-ahead logic as explained above.

Then, the calculated look-ahead Y change vector is added to the look-ahead Y vector calculated by the aforementioned concrete example of the look-ahead logic when the fuel injection amount delay control starts to correct the look-ahead Y vector (hereinafter, this corrected look-ahead Y vector may be referred to —corrected look-ahead Y vector—) and the calculated look-ahead Z change vector is added to the look-ahead Z vector calculated by the aforementioned concrete example of the look-ahead logic when the fuel injection amount delay control starts to correct the look-ahead Z vector (hereinafter, this corrected look-ahead Z vector may be referred to —corrected look-ahead Z vector—).

Then, when there is a deviation between the Y vector acquired when the fuel injection amount delay control ends and the aforementioned corrected look-ahead Y vector or between the Z vector acquired when the fuel injection amount delay control ends and the aforementioned corrected look-ahead Z vector, the coefficient matrixes A, B, C and D of the target value setting logic are corrected such that the deviation decreases.

FIG. 26 shows a flow of the correction of the coefficient matrixes of the target value setting logic of the third embodiment in the case that the aforementioned target value setting, look-ahead and simple look-ahead logics are employed.

In FIG. 25, "$W_{vec}$" is a vector having vectors as elements having parameters for the base value acquisition as elements, "$W_{dly\text{-}vec}$" is a vector $W_{vec}$ delayed for the time period corresponding to the delay control period, "$r_{vec}$" is a vector having vectors as elements having the base values as elements, "$g_{vec}$" is a vector having vectors as elements having the target values as elements, "$y_{vec}$" is the Y vector, "$z_{vec}$" is the Z vector, "$y_{est\text{-}vec}$" is the look-ahead Y vector, "$z_{est\text{-}vec}$" is the look-ahead Z vector, "$y_{dly\text{-}est\text{-}vec}$" is the look-ahead Y vector delayed for the time period corresponding to the delay control period, "$Z_{dly\text{-}est\text{-}vec}$" is the look-ahead Z vector delayed for the time period corresponding to the delay control period, "$\Delta W$" is the change amount of the parameters for the base value acquisition, "$\Delta W_{0dly}$" is the change amount of the parameters at the delay control starting time, "$\Delta W_{1dly}$" is the change amount of the parameters after one step from the delay control starting time, "$\Delta W_{2dly}$" is the change amount of the parameters after two steps from the delay control starting time, "$\Delta W_{3dly}$" is the change amount of the parameters after three steps from the delay control starting time, "$\Delta W_{(n-1)dly}$" is the change amount of the parameters after N−1 steps from the delay control starting time, "$\Delta y_{0dly\text{-}est}$"

is the change amount of the controlled output vector corresponding to the change amount of the parameter at the delay control starting time, "$\Delta y_{(n-1)dly\text{-}est}$" is the change amount of the control input vector corresponding to the change amount of the parameter after the N−1 steps from the delay control starting time, "$\Delta x_{0dly\text{-}est}$" is the change amount of the constraint signal vector corresponding to the change amount of the parameter at the delay control starting time, "$\Delta z_{(n-1)dly\text{-}est}$" is the change amount of the constraint signal vector corresponding to the change amount of the parameter after the N−1 steps from the delay control starting time, "$\Delta y_{dly\text{-}est\text{-}vec}$" is the vector having the change amounts of the controlled output vectors $\Delta y0_{dly\text{-}est}$ to $\Delta y_{(N-1)dly\text{-}est}$ as elements, "$\Delta z_{dly\text{-}est\text{-}vec}$" is the vector having the change amounts of the constraint signal vectors $\Delta a0_{dly\text{-}est}$ to $\Delta y_{(N-1)dly\text{-}est}$ as elements, "$\Delta y_{est\text{-}vec\text{-}final}$" is the final Y vector obtained by adding the vector $\Delta y_{dly\text{-}est\text{-}vec}$ to Y vector and "$\Delta z_{est\text{-}vec\text{-}final}$" is the final Z vector obtained by adding the vector $\Delta z_{dly\text{-}est\text{-}vec}$ to Z vector.

In the case that the aforementioned concrete example is employed as the target value setting logic of the third embodiment, when the fuel injection amount delay control ends, the target value vector is calculated by the target value setting logic is calculated using the fuel injection amount and the engine speed from the delay control starting time and the delay control ending time and the control of the controlled objects is performed according to the target values expressed by the calculated target value vector.

Therefore, the change of the engine speed during the delay control period is reflected in the Y and Z vectors acquired at this time for the correction of the coefficient matrixes of the target value setting logic.

However, in place of this, the Y and Z vectors may be acquired for the correction of the coefficient matrixes of the target value setting logic as follows.

That is, in the concrete example of the aforementioned target value setting logic, in order to calculate the base value vector having, as elements, the base values for making the constraint signal vector calculated using the formulas 2 to 4 satisfy the constraints relating thereto, the predicted control input and/or output, etc. are calculated.

In this regard, when the fuel injection amount delay control ends, the predicted control input and output are calculated assuming that the fuel injection amount and the engine speed does not change from the delay control starting time to the delay control ending time.

Then, at the same time, the change amount of the control input and/or output corresponding to the change amount of the engine speed during the delay control period.

Then, the target value vector is calculated using, as the predicted control input, the control input obtained by adding the calculated control input change amount to the calculated predicted control input for the calculation of the base value vector and using, as the predicted controlled output, the controlled output obtained by adding the calculated controlled output change amount to the calculated predicted controlled output for the calculation of the base value vector.

Then, when the control of the controlled objects is performed according to the target values expressed by the calculated target value vector, the Y and Z vectors may be acquired for the correction of the coefficient matrixes of the target value setting logic.

The aforementioned embodiments are ones in the case that the invention is applied to the control device of the compression self-ignition internal combustion engine. However, the invention can be applied to the control device of the spark ignition internal combustion engine.

Further, the aforementioned embodiments are ones in the case that the invention is applied to the control device of the engine comprising a function for performing the fuel injection amount delay control.

However, broadly, the invention can be applied to the control device of the engine comprising a function for performing a control wherein the target value set at a certain time is used for the actual control at the time after a predetermined time period from the target value setting time.

Therefore, for example, the invention can be applied to the control device of the spark ignition engine comprising a function for performing an ignition timing delay control wherein the target ignition timing set at a certain time (i.e. the timing for igniting a mixture gas in the combustion chamber by a spark plug) is used for the actual control of the spark plug at a time after a predetermined time from the target ignition timing setting time.

The invention claimed is:

1. A control device applied to an internal combustion engine comprising first and second controlled objects, a first controlled output from the first controlled object and a second controlled output from the second controlled object influencing each other, and the control device controlling operation states of the first and second controlled objects such that the first and second controlled outputs correspond to target first and second controlled outputs, respectively,
referring to the controlled output used as a base for setting the target first controlled output as base first controlled output, referring to the controlled output used as a base for setting the target second controlled output as base second controlled output, referring to a parameter relating to a state of the engine as engine state parameter, referring to the engine state parameter referred for setting the base first controlled output as first reference engine state parameter and referring to the engine state parameter referred for setting the base second controlled output as second reference engine state parameter,
the control device comprising a target controlled output setting architecture having:
a function for calculating as a primary predicted first controlled output, the predicted first controlled output in the case that an operation state of the first controlled object is controlled using the base first controlled output set on the basis of the first reference engine state parameter as the target first controlled output and calculating as a primary predicted second controlled output, the predicted second controlled output in the case that an operation state of the second controlled object is controlled using the base second controlled output set on the basis of the second reference engine state parameter as the target second controlled output;
a function for setting the base first controlled output as the target first controlled output when the primary predicted first controlled output satisfies a first output constraint condition relating thereto and on the other hand, correcting the base first controlled output to calculate a primary corrected base first controlled output when the primary predicted first controlled output does not satisfy the first output constraint condition and then, calculating as a secondary predicted first controlled output, the predicted first controlled output in the case that the operation state of the first controlled object is controlled using the primary corrected base first controlled output as the target first controlled output and for setting the base second controlled output as the target second controlled output when the primary predicted second controlled output satisfies a second output constraint condition relating thereto and on the other hand, correcting the base second controlled output to calculate a primary corrected base second controlled output when the primary predicted second controlled output does not satisfy the second output constraint condition and then, calculating as a secondary predicted second controlled output, the predicted second controlled output in the case that the operation state of the second controlled object is controlled using the primary corrected base second controlled output as the target second controlled output;

a function for setting the primary corrected base first controlled output as the target first controlled output when the secondary predicted first controlled output is calculated and satisfies the first output constraint condition and on the other hand, correcting the primary corrected base first controlled output to calculate a new primary corrected base first controlled output when the secondary predicted first controlled output does not satisfy the first output constraint condition and then, calculating as a new secondary predicted first controlled output, the predicted first controlled output in the case that the operation state of the first controlled object is controlled using the calculated new primary corrected base first controlled output as the target first controlled output and for setting the primary corrected base second controlled output as the target second controlled output when the secondary predicted second controlled output is calculated and satisfies the second output constraint condition and on the other hand, correcting the primary corrected base second controlled output to calculate a new primary corrected base second controlled output when the secondary predicted second controlled output does not satisfy the second output constraint condition and then, calculating as a new secondary predicted second controlled output, the predicted second controlled output in the case that the operation state of the second controlled object is controlled using the calculated new primary corrected base second controlled output as the target second controlled output; and a function for performing the calculation of the new primary corrected base first controlled output by correcting the primary corrected base first controlled output and the calculation of the new secondary predicted first controlled output in the case that the operation state of the first controlled object is controlled using the new primary corrected base first controlled output as the target first controlled output repeatedly until the new secondary predicted first controlled output satisfies the first output constraint condition in the case that the new secondary predicted first controlled output is calculated and for performing the calculation of the new primary corrected base second controlled output by correcting the primary corrected base second controlled output and the calculation of the new secondary predicted second controlled output in the case that the operation state of the second controlled object is controlled using the new primary corrected base second controlled output as the target second controlled output repeatedly until the new secondary predicted second controlled output satisfies the second output constraint condition in the case that the new secondary predicted second controlled output is calculated, wherein referring to one of the first and second reference engine state parameters as a particular reference engine state parameter, when the particular reference engine state parameter is maintained constant during a predetermined time period and it is predicted that the particular reference engine state parameter changes at the predetermined time period having elapsed, the primary or secondary predicted first controlled output which satisfies the first output constraint condition at the predetermined time period having elapsed is calculated as a look-ahead predicted first controlled output assuming that the particular reference engine state parameter does not change during the predetermined time period, the primary or secondary predicted second controlled output which satisfies the second output constraint condition at the predetermined time period having elapsed is calculated as a look-ahead predicted second controlled output assuming that the particular reference engine state parameter does not change during the predetermined time period and a target controlled output setting logic for performing the functions of the target controlled output setting architecture is corrected on the basis of the look-ahead predicted first and second controlled outputs.

2. The device of the engine of claim 1, wherein when the particular reference engine state parameter changes during the predetermined time period, the look-ahead predicted first controlled output is corrected depending on a change amount of the particular engine state parameter during the predetermined time period such that the look-ahead predicted first controlled output corresponds to the predicted first controlled output at the predetermined time period having elapsed in the case that the particular reference engine state parameter changes during the predetermined time period and the look-ahead predicted second controlled output is corrected depending on a change amount of the particular engine state parameter during the predetermined time period such that the look-ahead predicted second controlled output corresponds to the predicted second controlled output at the predetermined time period having elapsed in the case that the particular reference engine state parameter changes during the predetermined time period.

3. The device of the engine of claim 1, wherein the target controlled output setting logic is corrected such that a deviation between the actual first controlled output at the predetermined time period having elapsed and the look-ahead predicted first controlled output decreases and a deviation between the actual second controlled output at the predetermined time period having elapsed and the look-ahead predicted second controlled output decreases.

4. The device of the engine of claim 1, wherein as the function performed by the target controlled output setting logic, the target controlled output setting architecture has:

a function for calculating as a primary predicted first control input, the predicted first control input to the first controlled object in the case that the base first controlled output set on the basis of the first reference engine state parameter is set as the target first controlled output and calculating as a primary predicted second control input, the predicted second control input to the second controlled object in the case that the base second controlled output set on the basis of the second reference engine state parameter is set as the target second controlled output;

a function for setting the base first controlled output as the target first controlled output when the primary predicted first control input satisfies a first input constraint condition relating thereto and on the other hand, correcting the base first controlled output to calculate a primary corrected base first controlled output when the primary predicted first control input does not satisfy the first input constraint condition and then, calculating as a secondary predicted first control input, the predicted first control input in the case that the primary corrected base first controlled output is set as the target first controlled output and for setting the base second controlled output as the target second controlled output when the primary predicted second control input satisfies a second input constraint condition relating thereto and on the other hand, correcting the base second controlled output to calculate a primary corrected base second controlled output when the primary predicted second control input does not satisfy the second input constraint condition and then, calculating as a secondary predicted second control input, the predicted second control input in the case that the primary corrected base second controlled output is set as the target second controlled output;

a function for setting the primary corrected base first controlled output as the target first controlled output when the secondary predicted first control input and satisfies the first input constraint condition and on the other hand, correcting the primary corrected base first controlled output to calculate a new primary corrected base first controlled output when the secondary predicted first control input does not satisfy the first input constraint condition and then, calculating as a new secondary predicted first control input, the predicted first control input in the case that the calculated new primary corrected base first controlled output is set as the target first controlled output and for setting the primary corrected base second controlled output as the target second controlled output when the secondary predicted second control input and satisfies the second input constraint condition and on the other hand, correcting the primary corrected base second controlled output to calculate a new primary corrected base second controlled output when the secondary predicted second control input does not satisfy the second input constraint condition and then, calculating as a new secondary predicted second control input, the predicted second control input in the case that the calculated new primary corrected base second controlled output is set as the target second controlled output; and a function for performing the calculation of the new primary corrected base first controlled output by correcting the primary corrected base first controlled output and the calculation of the new secondary predicted first control input in the case that the new primary corrected base first controlled output is set as the target first controlled output repeatedly until the new secondary predicted first control input satisfies the first input constraint condition in the case that the new secondary predicted first control input is calculated and for performing the calculation of the new primary corrected base second controlled output by correcting the primary corrected base second controlled output and the calculation of the new secondary predicted second control input in the case that the new primary corrected base second controlled output is set as the target second controlled output repeatedly until the new secondary predicted second control input satisfies the second input constraint condition in the case that the new secondary predicted second control input is calculated, wherein referring to one of the first and second reference engine state parameters as a particular reference engine state parameter, when the particular reference engine state parameter is maintained constant during a predetermined time period and it is predicted that the particular reference engine state parameter changes at the predetermined time period having elapsed, the primary or secondary predicted first control input which satisfies the first input constraint condition at the predetermined time period have elapsed assuming that the particular reference engine state parameter does not change during the predetermined time period is calculated as a look-ahead predicted first control input, the primary or secondary predicted second control input which satisfies the second input constraint condition at the predetermined time period have elapsed assuming that the particular reference engine state parameter does not change during the predetermined time period is calculated as a look-ahead predicted second control input and the target controlled output setting logic is corrected on the basis of the look-ahead predicted first and second control inputs.

5. The device of the engine of claim 4, wherein when the particular reference engine state parameter changes during the predetermined time period, the look-ahead predicted first control input is corrected depending on a change amount of the particular engine state parameter during the predetermined time period such that the look-ahead predicted first control input corresponds to the predicted first control input at the predetermined time period having elapsed in the case that the particular reference engine state parameter changes during the predetermined time period and the look-ahead predicted second control input is corrected depending on the change amount of the particular engine state parameter during the predetermined time period such that the look-ahead predicted second control input corresponds to the predicted second control input at the predetermined time period having elapsed in the case that the particular reference engine state parameter changes during the predetermined time period.

6. The device of the engine of claim 4, wherein the target controlled output setting logic is corrected such that a deviation between the actual first control input at the predetermined time period having elapsed and the look-ahead predicted first control input decreases and a deviation between the actual second control input at the predetermined time period having elapsed and the look-ahead predicted second control input decreases.

* * * * *